US012467102B2

United States Patent
Salis et al.

(10) Patent No.: US 12,467,102 B2
(45) Date of Patent: Nov. 11, 2025

(54) MASSIVELY PARALLEL COVID-19 DIAGNOSTIC ASSAY FOR SIMULTANEOUS TESTING OF 19200 PATIENT SAMPLES

(71) Applicant: THE PENN STATE RESEARCH FOUNDATION, University Park, PA (US)

(72) Inventors: Howard Salis, University Park, PA (US); Alexander Reis, University Park, PA (US); Ayaan Hossain, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 195 days.

(21) Appl. No.: 17/698,975

(22) Filed: Mar. 18, 2022

(65) Prior Publication Data

US 2022/0307095 A1    Sep. 29, 2022

Related U.S. Application Data

(60) Provisional application No. 63/321,550, filed on Mar. 18, 2022, provisional application No. 63/162,847, filed on Mar. 18, 2021.

(51) Int. Cl.
*C12Q 1/70* (2006.01)
*C12N 15/10* (2006.01)

(52) U.S. Cl.
CPC .......... *C12Q 1/701* (2013.01); *C12N 15/1065* (2013.01)

(58) Field of Classification Search
CPC .... C12Q 1/701; C12Q 1/70; C12Q 2521/107; C12Q 2531/113; C12Q 2537/143; C12N 15/1065
See application file for complete search history.

(56) References Cited

U.S. PATENT DOCUMENTS

| | | | |
|---|---|---|---|
| 11,274,334 B2 * | 3/2022 | Chenchik | C12N 15/1093 |
| 2010/0323348 A1 * | 12/2010 | Hamady | C12Q 1/6874 536/24.33 |
| 2018/0223348 A1 * | 8/2018 | Link | C12Q 1/6858 |
| 2022/0307095 A1 | 9/2022 | Salis et al. | |

OTHER PUBLICATIONS

Tao Li et al. ("Rapid high throughput whole genome sequencing of SARS-CoV-2 by using one-step RT-PCR amplification with integrated microfluidic system and next-gen sequencing."; BioRxiv server Nov. 5, 2020 ;Journal of Clinical Microbiology. Apr. 2021;59(5):e02784-20; published online Mar. 2, 2021 (Year: 2021).*
Tao Li Supp Table (Year: 2021).*
Pandey et al.("A whole-tissue RNA-seq toolkit for organism-wide studies of gene expression with PME-seq." Nature protocols 15.4 (2020): 1459-1483.) (Year: 2020).*
Petrillo et al.( "A novel multiplex qRT-PCR assay to detect SARS-COV-2 infection: high sensitivity and increased testing capacity." Microorganisms 8.7 (2020): 1064. (Year: 2020).*
Dandan Li et al.( "Primer design for quantitative real-time PCR for the emerging Coronavirus SARS-CoV-2." Theranostics Jun. 2020; 10(16): 7150-7162. (Year: 2020).*
Lowe et al. (Nucleic Acids Research, vol. 18, No. 7, p. 1757-1761, 1990) (Year: 1990).*
Untergasser et al. (Nucleic acids research 35.suppl_2 (2007): W71-W74.) (Year: 2007).*
Rozen et al. (Bioinformatics methods and protocols. Humana Press, Totowa, NJ, 2000. 365-386.) (Year: 2000).*
Nolan et al. (Nature protocols 1.3 (2006): 1559) (Year: 2006).*
Aldridge, Conservative Two-Stage Group Testing in the Linear Regime, arXiv:2005.06617, 2020, pp. 1-21.
Booeshaghi et al., Reliable and Accurate Diagnostics from Highly Multiplexed Sequencing Assays, Scientific Reports, 2020, 10:21759, pp. 1-7.
Dai et al., One-Seq: A Highly Scalable Sequencing-Based Diagnostic for SARS-CoV-2 and Other Single-Stranded Viruses, medRxiv, 2021, pp. 1-21.
Leblanc et al., Look Before Diving into Pooling of SARS-CoV-2 Samples on High Throughput Analyzers, medRxiv, 2020, 26 pages.
Palmieri et al., Rembrandt: A High-Throughput Barcoded Sequencing Approach for COVID-19 Screening, bioRxiv, 2020, 25 pages.
Vonesch et al., McQ—An Open-Source Multiplexed SARS-COV-2 Quantification Platform, medRxiv, 2020, 44 pages.
Wu et al., Insight: A Population-Scale COVID-19 Testing Strategy Combining Point-of-Care Diagnosis with Centralized High-Throughput Sequencing, Science Advances, 2021, 7:eabe5054, pp. 1-13.
Yelagandula et al., Multiplexed Detection of SARS-CoV-2 and Other Respiratory Infections in High Throughput by SARSeq, Nature Communications, 2021, 12:3132, pp. 1-17.
Zhu et al., Noisy Pooled PCR for Virus Testing, arXiv:2004.02689, 2020, pp. 1-5.
Zhuang et al., Unique Barcoded Primer-Assisted Sample-Specific Pooled Testing (Uni-Pool) for Large-Scale Screening of Viral Pathogens, Analytical Chemistry, 2022, 94:4021-4029.

* cited by examiner

*Primary Examiner* — Nancy J Leith
*Assistant Examiner* — Jessica D Parisi
(74) *Attorney, Agent, or Firm* — Quarles & Brady LLP

(57) ABSTRACT

The present disclosure provides methods and systems for the massively-parallel detection of pathogens, such as SARS-CoV-2 virus, in a set of multiple samples via PCR test. Various implementations may provide for barcode/primer sequences that are designed to allow for a large number of samples and/or multiple pathogens to be analyzed in a single test. Included within the scope hereof are methods and systems for performing tests of multiple samples at once, via a one-pot test protocol, as well as methods and systems for designing test parameters (such as barcode/primer sequences) in a manner that allows for parallel testing.

17 Claims, 15 Drawing Sheets
Specification includes a Sequence Listing.

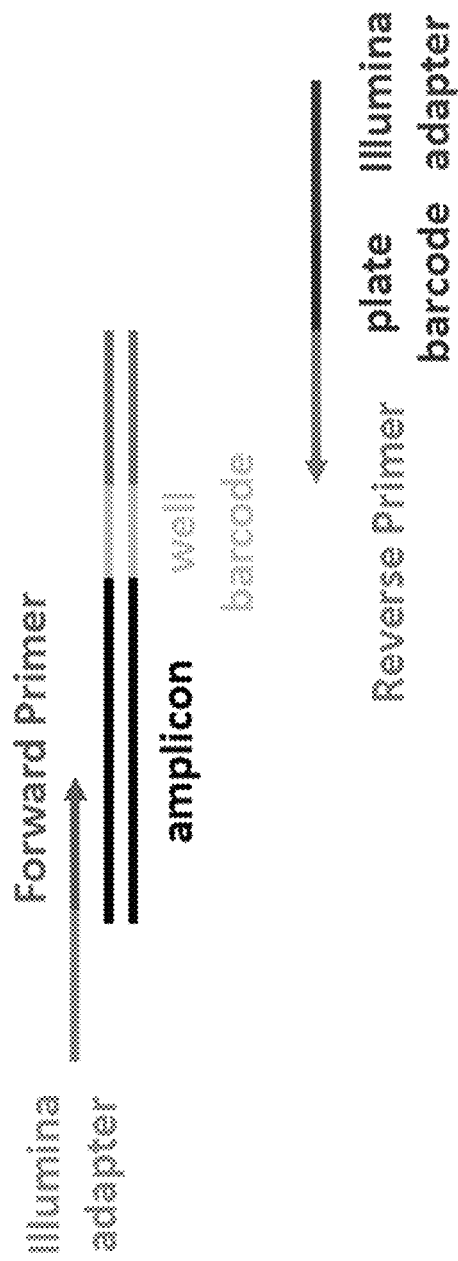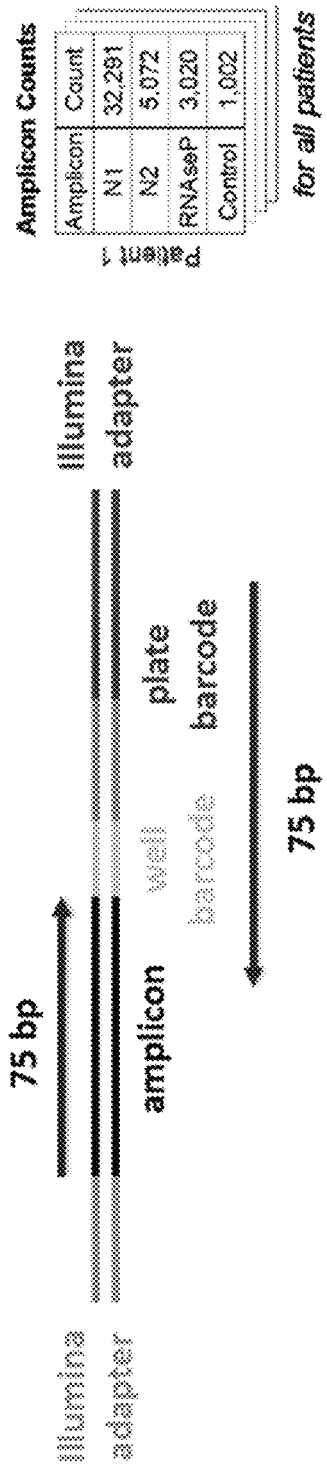
Figure 4A
Figure 4B

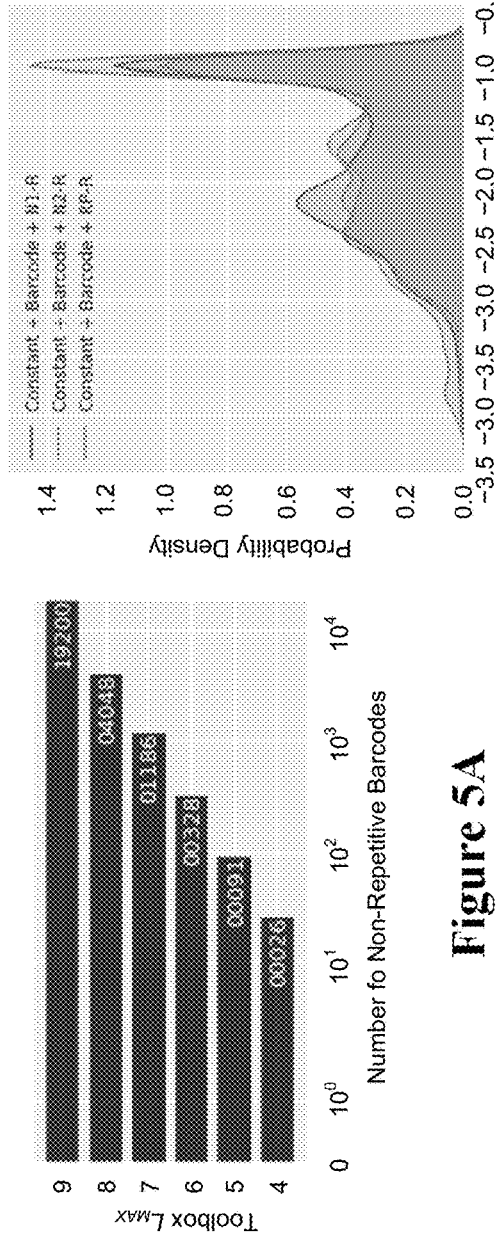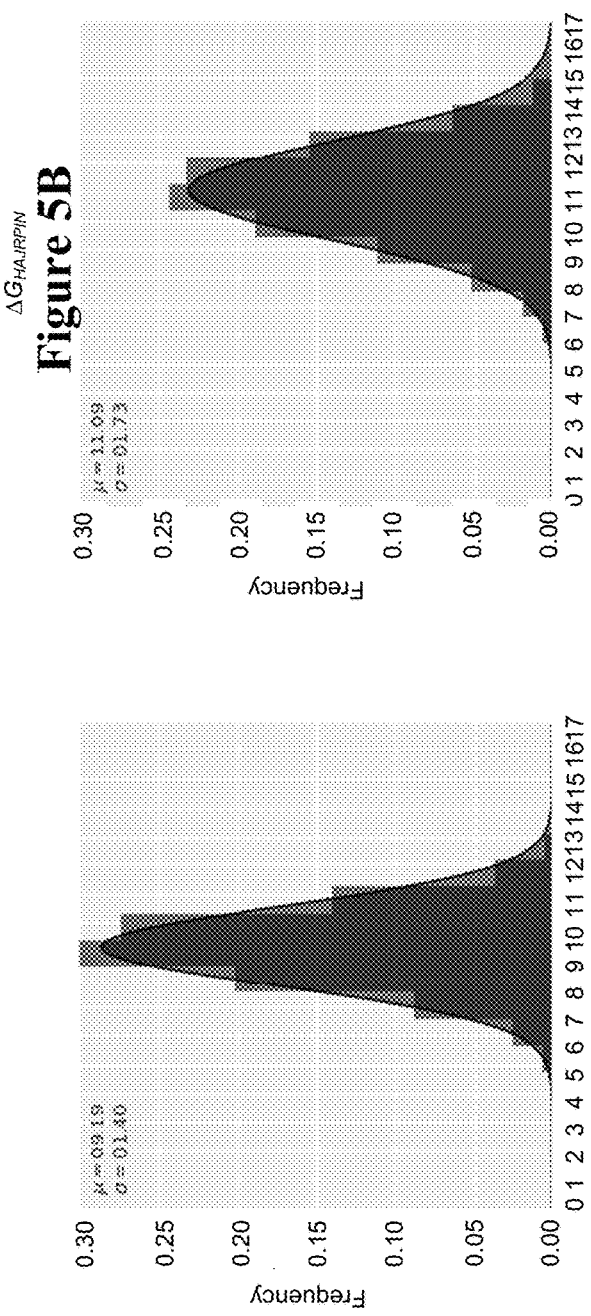
Figure 5A
Figure 5B
Figure 5C
Figure 5D

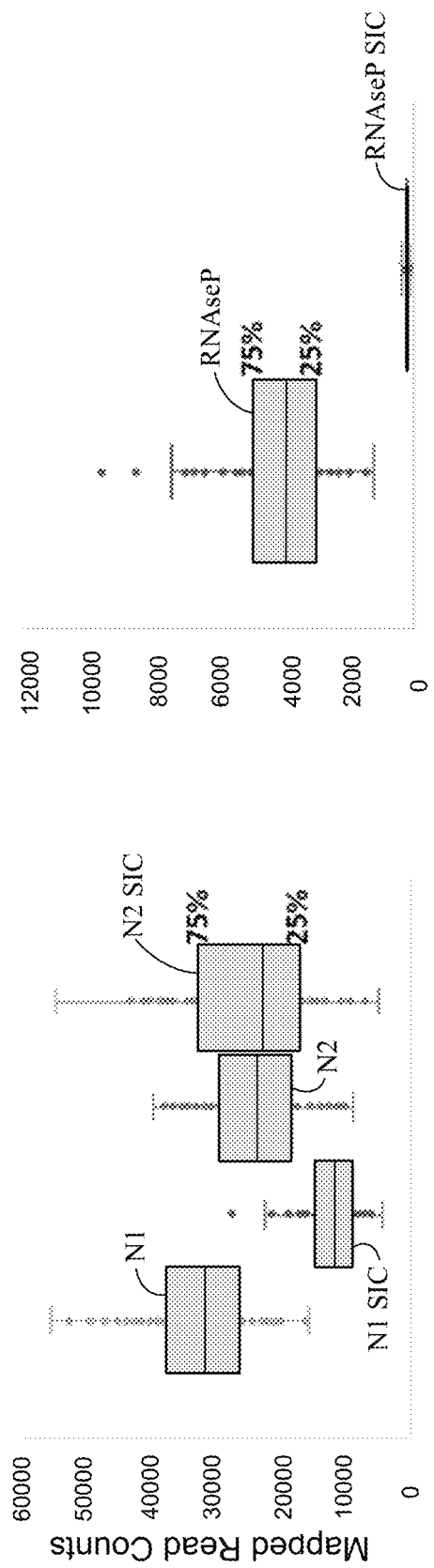
Figure 7A
Figure 7B

MASSIVELY PARALLEL COVID-19 DIAGNOSTIC ASSAY FOR SIMULTANEOUS TESTING OF 19200 PATIENT SAMPLES

CROSS REFERENCE TO RELATED APPLICATION

This application claims the benefit of U.S. Provisional Patent Application Ser. Nos. 63/162,847 filed on Mar. 18, 2021 and 63/321,550 filed on Mar. 18, 2022, the disclosure of which is hereby incorporated by reference in its entirety, including all figures, tables, and drawings.

STATEMENT REGARDING FEDERALLY SPONSORED RESEARCH

This invention was made with government support under Grant No. NI20HMFPXXXXG020 awarded by the United States Department of Agriculture/NIFA. The Government has certain rights in the invention.

SEQUENCE LISTING

A Sequence Listing accompanies this application and is submitted as an ASCII text file of the sequence listing named "900905_00029_ST25.txt" which is 132,163 bytes in size and was created on Mar. 17, 2022. The sequence listing is electronically submitted via EFS-Web with the application and is incorporated herein by reference in its entirety.

BACKGROUND

The COVID-19 pandemic has shocked the United States and other governments, and made evident that existing infrastructure for pathogen testing is inadequate to support sudden, large demand for testing, particularly in the context of ever-changing variations of pathogens. As pathogens like the SARS-CoV-2 virus become more widespread, and evolve into variants, test sensitivity and accuracy become increasingly important as well. Social and economic recovery plans depend on the wider availability of diagnostic testing for COVID-19, and likewise in the event of future pandemics or widespread transmission of other diseases, testing will also be important. Testing throughput needs to be increased by at least 10-fold in order to routinely test military personnel, health care providers, and employees of essential businesses, and ideally by factors much higher than that for the general population. For example, centralized testing facilities at U.S. Government (USG) military sites that have the capacity to perform many thousands of tests per day are needed to test all military personnel on a weekly basis. Accordingly, there remains a need in the art for high-throughput diagnostic assays for the detection of SARS-CoV-2. However, it is not economically feasible or practical for the government, health care facilities, labs, etc. to maintain a large inventory of sequencers and other test equipment to be able to have enough capacity to handle intermittent surges. And, it is also not desirable to continue using the same test protocol (e.g., the same pathogen amplicon) for widespread viruses that are constantly mutating (including the potential for mutation in spike proteins or other components of virus that are often the target amplicon of a test). Accordingly, it would be desirable to be able to make more effective use of existing equipment and allow for parallel testing of multiple target amplicons in a single test.

SUMMARY

The present disclosure provides methods of high-throughput detecting of SARS-CoV-2 in samples.

In one aspect, the disclosure provides a method for parallel detection of a SARS-CoV-2 virus in a set of multiple samples, the method comprising: (a) providing samples comprising RNA; (b) preparing a reverse transcription (RT) reaction mixture for each sample comprising: a portion of the sample, at least one RT primer comprising a sample-specific barcode, dNTPs, and a reverse transcriptase enzyme; (c) performing reverse transcription using the RT reaction mixtures to generate a RT reaction product comprising cDNA with a sample-specific barcode; (d) combining a portion of each RT reaction product of step (c) in a single container to form a combined RT reaction product; (e) purifying nucleic acid molecules from the combined RT reaction product of step (d); (f) preparing a polymerase chain reaction (PCR) reaction mixture comprising the purified nucleic acid molecules of step (e), dNTPs, a PCR primer mix comprising a pool-specific barcode, and a DNA polymerase; (g) performing PCR using the PCR reaction mixture to generate amplified cDNA comprising both a sample-specific barcode and a pool-specific barcode; (h) preparing a sequencing library from the amplified cDNA of step (g); (i) repeating steps (a)-(h) using a different set of multiple samples to generate at least one additional sequencing library; (j) pooling at least two sequencing libraries generated in steps (h) and (i); (k) sequencing the pooled sequencing libraries to generate sequencing reads; (l) demultiplexing the sequencing reads to assign them to a particular sample using the sample-specific barcodes and the pool-specific barcodes; and (m) quantifying the sequencing reads that map to the genome of the RNA virus in each sample to determine whether viral RNA was present in each of the samples. In some aspects, the at least one RT primer used in step (b) is selected from Table 1 or Table 2.

In another aspect, the disclosure provides a system for performing the method described herein in an automated fashion, the system comprising at least one robotic liquid handler, a PCR thermocycler, and a next generation sequencer.

In further aspect, the disclosure provides an apparatus for multiple sample parallel detection, the apparatus comprising: a computer system comprising at least one processor and instructions executable by the at least one processor for preparing a plurality of reverse transcription (RT) primers corresponding to the plurality of samples, wherein each RT primer of the plurality of RT primers comprises a sample-specific barcode; a reaction machine for generating a plurality of RT reaction products corresponding to the plurality of RT primers based on the performed reverse transcription, wherein each RT reaction product of the plurality of RT reaction products comprises a cDNA with a respective sample-specific barcode, the cDNA of each RT reaction product corresponding to a respective sample of the plurality of samples; chamber for combining a portion of each RT reaction product of the plurality of RT reaction products in a single container to form a combined RT reaction product; polymerase chain reaction (PCR) machine based on the combined RT reaction product to generate a plurality sets of amplified cDNAs based on the performed PCR, the plurality sets corresponding to the plurality of RT reaction products, each amplified cDNA of the plurality sets of amplified cDNAs comprising the sample-specific barcode and a pool-specific barcode, the pool-specific barcode corresponding to the combined RT reaction product; a next generation sequencer for sequencing reads based on the plurality sets of amplified cDNAs, the plurality sets of sequencing reads corresponding to the plurality sets of amplified cDNAs; a computer system comprising at least one processor and instructions executable by the at least one processor for determine a diagnostic outcome of each sample of the plurality of samples based on the quantified plurality of sequencing reads.

BRIEF DESCRIPTION OF THE DRAWINGS

FIGS. 4A and 4B show a schematic of the sequencing strategy used in Dx-Seq. In FIG. 4A, forward and reverse primers are used to add Illumina adaptor sequences during PCR amplification, and a barcoded reverse primer is used to add a "plate barcode" (i.e., a pool-specific barcode). In FIG. 4A, paired end sequencing is used to identify amplicon and barcode sequences. The reads are then mapped, and the amplicon sequences are quantified.

FIGS. 5A-5D depict the computational design of RT and PCR primers for the target amplicons using the Non-Repetitive Parts Calculator (Hossain et. al. Nat. Biotech., v38, 2020) with several design constraints (i.e., no inhibitory structures or dimers, highly unique barcode sequences, ability to target 90+ CV strains, no off-target hits on the human transcriptome or common pathogens). In FIG. 5A, a barplot showing the number of non-repetitive barcodes at each maximum consecutive repeat length ($L_{max}$). In FIG. 5B, a probability density plot demonstrating that the primers do not form strong hairpins. In FIGS. 5C and 5D, plots demonstrating that the barcodes are maximally distinguishable after sequencing based on edit distance (FIG. 5C) and Hamming distance (FIG. 5D).

FIGS. 7A and 7B show the results of the first preliminary test of the Dx-Seq end-to-end workflow. 96 "all positive" mock samples containing 10,000 SARS-CoV-2 RNA copies and 1,000 copies of human lung RNAseP were reverse-transcribed and barcoded, PCR amplified, and subjected to sequencing using an Illumina MiSeq Next Generation Sequencer (MiSeqNGS). Reads were mapped and the amplicon and barcode sequences were quantified. In FIG. 7A, mapped read counts of the N1 and N2 SARS-CoV-RNA amplicons and N1 and N2 spike-in control (SIC). In FIG. 7B, mapped read counts of the positive control RNAseP amplicon and RNAseP spike-in control (SIC). Notably, this experiment was performed using manual pipetting so some variation was expected.

In FIG. 8A, mapped reds counts plotted individually for the N1 and N2 SARS-CoV-RNA amplicons and the RNAseP amplicon. In FIG. 8B, mapped reds counts of all three amplicons at across a range of RNA copy numbers. A clear separation in read counts was observed between 24 positive and 8 negative samples. However, the negative controls had non-zero read counts, indicating that there was some level of background.

In FIG. 9A, P-values were calculated using a two-tailed T-test for positive detection and plotted against RNA copy number. The results indicate that the measured limit of detection is about 123 RNA copies per sample (6.2 copies per µl; 10.2 attoMolar) with a p-value of 0.003. In FIG. 9B, log10 mapped read counts for the N1 and N2 SARS-CoV-RNA amplicons from samples containing a range of RNA concentrations.

DETAILED DESCRIPTION

The present disclosure provides methods and systems for the massively parallel detection of infectious agents, such as viruses, including, for example, SARS-CoV-2 virus in a set of multiple samples.

The inventors have developed a system and method for designing, performing, and analyzing massively parallel diagnostic assays for infectious agents (whether one pathogen per test, multiple pathogens per test, etc.), referred to as Dx-Seq. Dx-Seq uses molecular barcoding and next-generation sequencing to carry out thousands of tests per workflow per day. The inventors' innovative approach combines: (1) single-step RNA extractions from saliva or nasopharyngeal swabs; (2) reverse transcription using molecular barcoded transcript-specific primers; (3) pooled PCR amplification using doubly barcoded primers; (4) DNA spike-in controls for internal normalization; (5) next-generation amplicon sequencing; and (6) an optimized bioinformatics pipeline for mapping and counting amplicon variants. The inventors have designed this assay to allow it to be automated using programmable robotic workstations to maintain high-speed operations with a small number of trained technicians.

The current "gold standard" diagnostic test for infectious agents, especially RNA containing agents (e.g., viruses including SARS-CoV-2), is reverse transcription-quantitative polymerase chain reaction (RT-qPCR). This assay has a low limit of detection (i.e., it can detect as little as a single copy of the SARS-CoV-2 genome in a patient sample), but its testing throughput is limited by the large amount of equipment needed (e.g., specialized qPCR thermocyclers). Specifically, to diagnose a single patient sample, current RT-qPCR assays must amplify up to 4 regions in the SARS-CoV-2 genome (4 amplicons) and 2 controls (i.e., one negative control and one positive control). Thus, testing a single patient sample requires up to 6 RT-qPCR reactions. Using a 384-well plate format, only up to 64 patient samples can be tested in each RT-qPCR workflow. It takes about two hours to complete reverse transcription and quantitative PCR on a dedicated qPCR thermocycler. Assuming that the same workflow is performed 10 times each day (i.e., over a 20-hour day, e.g., if two persons each have a 10 hour shift), then this workflow can process 640 tests per day per qPCR thermocycler at most.

Figure 1:
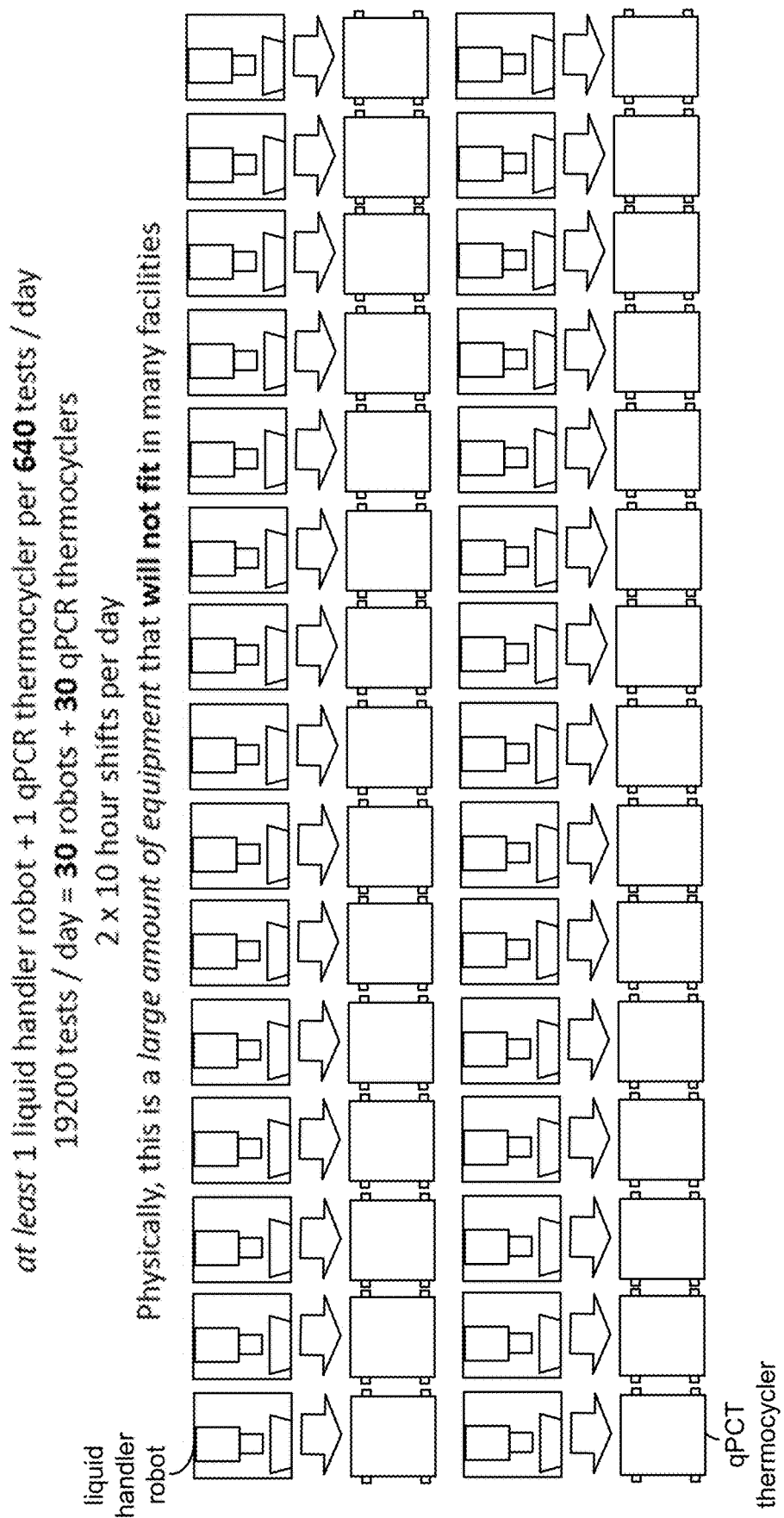
FIG. 1 is an illustration of the 30 liquid handling robots and 30 qPCR thermocyclers that would be required to carry out 19,200 diagnostic tests per day using 30 parallel RT-qPCR workflows.

Scaling up the number of parallel RT-qPCR workflows for COVID-19 testing requires a large amount of equipment and trained technicians. For example, in order to carry out 19,200 diagnostic tests per day, it would be necessary to run at least 30 parallel RT-qPCR workflows. At that scale, the usage of liquid-handling robots would be essential to mixing together the extracted RNA, enzymes, buffer, primers, and probes into each well. Thus, each parallel workflow would require its own liquid handler robot and qPCR thermocycler, such that 30 of each of these large machines would be needed (FIG. 1). These 60 machines would require a large capital expenditure and would take up a considerable amount of bench space. For example, a Roche LightCycler (a high-throughput qPCR thermocycler) has a 0.35 $m^2$ footprint while a Hamilton Microlab STARlet (a small liquid-handling robot) has a 0.15 $m^2$ footprint. Placing one STARlet and one LightCycler adjacent to each other on a bench requires over 1 meter of bench space length-wise. At least eight lab bays would be needed to support 30 of each of these equipment pieces, occupying at least 1,600 square feet with current lab safety zoning standards. This square footage does not include the necessary footprint for the ultra-cold freezers, refrigerators, and sample intake rooms that are essential for a diagnostic testing facility.

Figure 2:
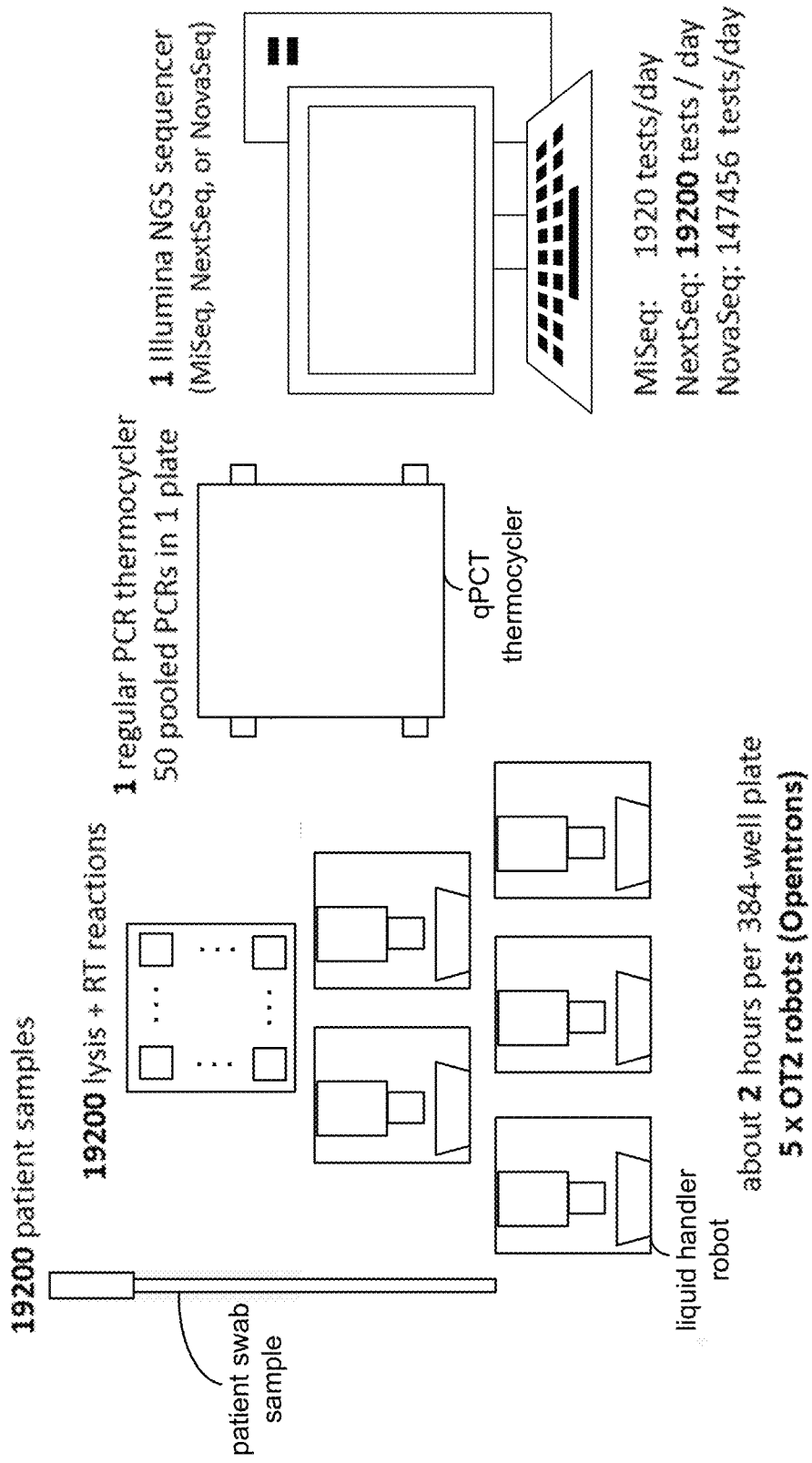
FIG. 2 is an illustration of the five liquid handling robots, one qPCR thermocycler, and one next-generation sequencer required to carry out 19,200 diagnostic tests per day using Dx-Seq.

Importantly, the inventors' system requires 50-fold less equipment and physical space as compared to this scaled up RT-qPCR assay. This is critical for use at USG/military sites where laboratory space is highly limited. Automation of Dx-Seq requires a small number of equipment pieces with a greatly reduced physical footprint. Specifically, to carry out 19,200 diagnostic tests per workflow, five robotic liquid handlers (Opentrons OT2, each 0.36 $m^2$), one PCR thermocycler (0.15 $m^2$), and one Illumina next-generation sequencer (NextSeq 550, 0.34 $m^2$) are needed, which requires about 100 $ft^2$ of bench space (FIG. 2). However, this system can be scaled down or up, depending on the sequencer available. For example, many laboratory and hospital clinics already have a MiSeq sequencer. In this scenario, one OT2 robotic workstation, one thermocycler, and one MiSeq sequencer are sufficient to carry out 1,920 tests per day. Alternatively, with Illumina's highest throughput platform, the NovaSeq 6000, it is possible to carry out up to 147,456 tests each day using this approach using about 40 OT2 robots and one PCR thermocycler. The NovaSeq is widely available in institutional core facilities and large-scale genome sequencing centers.

Figure 3:
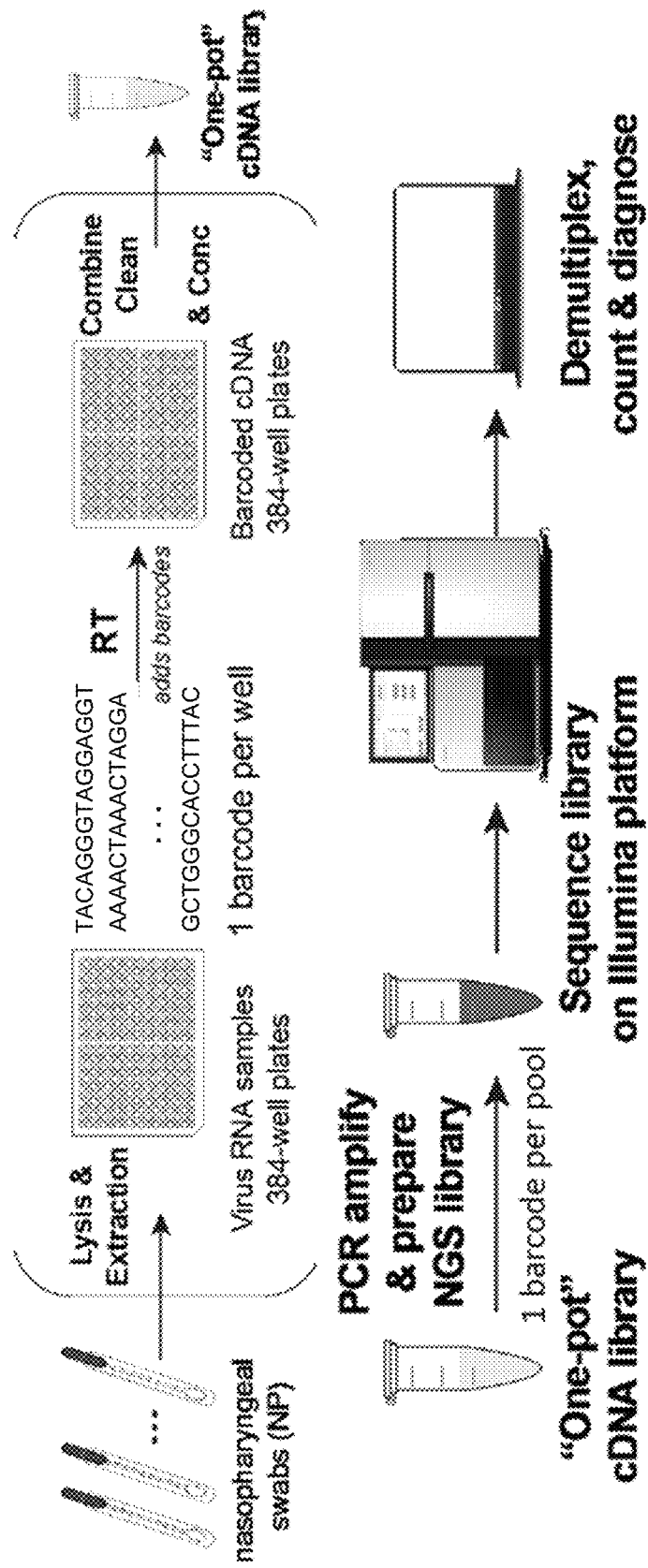
FIG. 3 is a schematic overview of the Dx-Seq assay.
Figure 6:
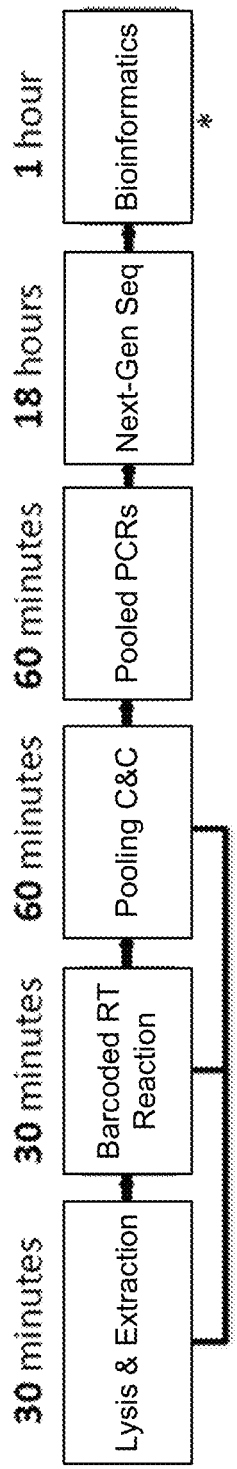
FIG. 6 is a schematic showing the estimated cost per test and turnaround time of the Dx-Seq assay.

DxSeq offers three additional novel aspects (FIG. 3). First, all patient samples are uniquely barcoded using reverse transcription primers comprising a "sample-specific barcode" during a cDNA synthesis step, and each pool of patient samples is barcoded using a polymerase chain reaction (PCR) primer comprising a "pool-specific barcode" during a subsequent PCR amplification step. All of the barcodes designed by the inventors are maximally distinguishable, as demonstrated by large edit distances and Hamming distances between barcodes (FIG. 5), such that up to four sequencing errors do not result in any barcode swapping. Further, all primers were designed to avoid forming any structures or primer dimers that might inhibit either reverse transcription or PCR. The inventors computationally designed enough unique primers to carry out up to 9,216 diagnostic tests (96 sample-specific primers×96 pool-specific primers) within a single workflow.

Second, in this approach, sample-specific, barcoded reverse transcription primers are used to carry out multiple cDNA synthesis reactions at the same time. Thus, cDNA can be produced from multiple infectious agents (e.g., SARS-CoV-2, influenza, RSV, etc.) transcript and from positive/negative control transcripts in a single reaction. Next-generation sequencing is used to detect the sequences generated from each of these transcripts and map them to the expected amplicons.

Third, this barcoding strategy allows up to 384 barcoded cDNA products to be pooled together into a single PCR amplification reaction. As a result, only one standard thermocycler is needed to carry out up to 384 PCR amplifications per day (e.g., 1×384 plate or 4×96 well plates), which greatly reduces the equipment footprint required for massively parallel testing. This method can be applied to any infectious agents that have a DNA or RNA genomes that can be used with the methods and systems described herein.

Methods:

The present disclosure provides methods and systems for determining barcodes that can be used for multiplexing and one-pot screening of large numbers of patient samples, and the methods described herein can be used to test for multiple different infectious agents, or multiple targets per infections agent, in a single pot mixture. The systems are described below for performing these methods.

In one embodiment, the disclosure provides a method for parallel detection of one or more infectious agents, for example, viruses, especially RNA viruses (e.g., SARS-CoV-2 virus, influenza etc.) in a set of multiple samples. The methods comprise: (a) providing samples comprising RNA; (b) preparing a reverse transcription (RT) reaction mixture for each sample comprising: a portion of the sample, at least one RT primer comprising a sample-specific barcode, dNTPs, and reverse transcriptase enzyme; (c) performing reverse transcription using the RT reaction mixtures to generate a RT reaction product comprising cDNA with a sample-specific barcode; (d) combining a portion of each RT reaction product of step (c) in a single container to form a combined RT reaction product; (e) purifying nucleic acid molecules from the combined RT reaction product of step (d); (f) preparing a polymerase chain reaction (PCR) reaction mixture comprising: the purified nucleic acid molecules of step (e), dNTPs, a PCR primer mix comprising a pool-specific barcode, and a DNA polymerase; (g) performing PCR using the PCR reaction mixture to generate amplified cDNA comprising both a sample-specific barcode and a pool-specific barcode; (h) preparing a sequencing library from the amplified cDNA of step (g); (i) repeating steps (a)-(h) using a different set of multiple samples to generate at least one additional sequencing library; (j) pooling at least two sequencing libraries generated in steps (h) and (i); (k) sequencing the pooled sequencing libraries to generate sequencing reads; (l) demultiplexing the sequencing reads to assign them to a particular sample using the sample-specific barcodes and the pool-specific barcodes; (m) quantifying the sequencing reads that map to the genome of the RNA virus in each sample to determine whether viral RNA was present in each of the samples.

The methods of the present disclosure can be designed to detect one or more infectious agents, for example, viruses, bacteria, etc. The system and methods prepare barcodes that can be designed to test multiple samples for one or more infectious agents. For example, Example 1 shows the barcode design to detect severe acute respiratory syndrome coronavirus 2 (SARS-CoV-2), the virus that causes the infection novel coronavirus disease 2019 (COVID-19). The inventors designed the primers disclosed in Table 1 and Table 2 to detect regions in the SARS-CoV-2 nucleocapsid (N) gene (i.e., N1 and N2, respectively) based on the genome sequence of the original L strain of the virus, which appeared in Wuhan in December 2019. In some cases, these primers may be used amplify the N1 and/or N2 region from other strains of SARS-CoV-2. In other cases, the primer sequences may need to be altered slightly to allow for the amplification of more distantly related strains.

In step (a) of one embodiment of the present methods, samples comprising RNA are provided for a first round of library preparation. In some embodiments, the samples are from human subjects. For example, in some embodiments, each sample is from a different patient at risk of having COVID-19 or suspected of having COVID-19. In some embodiments, at least 96 samples are provided for this first round. In some embodiments, at least 384 samples are provided for this first round.

Any patient sample in which SARS-CoV-2 or other viral RNA may be detectable can be used in systems and embodiments of the present methods. For example, it is known that SARS-CoV-2 can be detected in specimens such as bronchoalveolar lavage (BAL), sputum, nasal swabs, bronchoscope brush biopsy, pharyngeal swabs, anal swabs, feces, and blood. Thus, samples used with various embodiments disclosed herein may be prepared by extracting RNA from any such specimen. In some embodiments, the samples are produced by extracting RNA from nasal swabs, oral swabs, or saliva, and some wells/samples may be prepared as duplicates from the same swab/sample.

RNA extraction may be performed using any method known in the art. In some embodiments, the RNA extraction is accomplished using a simple lysis step (i.e., rather than a column-based or bead-based purification). In some embodiments, RNA extraction is accomplished by incubating a patient sample (e.g., saliva or nasopharyngeal swab) in 1% Triton X solution at 70° C. for 5 minutes, and then at 95° C. for 10 minutes.

In step (b) of certain embodiments, a reverse transcription (RT) reaction mixture is prepared for each sample. The RT reaction mixture comprises all of the components necessary to perform reverse transcription. Specifically, the mixture includes a portion of the sample, at least one RT primer comprising a sample-specific barcode, deoxynucleoside triphosphates (dNTPs), and a reverse transcriptase enzyme. In some embodiments, the RT reaction mixture further comprises at least one of the following: dithiothreitol (DTT), an RNase inhibitor, and one or more DNA spike-in controls.

A DNA spike-in control is DNA of a known sequence and quantity that is added to a user's sample to serve as an internal standard for subsequent steps. Spike-in controls provide a means to normalize sequencing data across samples and experiments. A DNA spike-in control may comprise any sequence that is readily distinguishable from the sequences of interest. For example, the DNA used in a spike-in control may be synthetic or from a different organism. In the methods of the present disclosure, a known concentration (e.g., 10 nM) of a DNA spike-in control may be added to the RT reaction and used to normalize the sequencing reads that map to each amplicon.

Reverse transcription is a process whereby a reverse transcriptase catalyzes template-dependent synthesis of complementary DNA (cDNA) from an RNA transcript. In this reaction, the reverse transcriptase extends a primer that is hybridized to the RNA template using dNTPs. The RNA transcript can be converted either to a cDNA/RNA heteroduplex (i.e., first-strand synthesis) or to a duplex cDNA (i.e., second-strand synthesis), as described in Simpson et al. (1988) Biochem. Biophys. Res. Commun., 151: 487-492; Belyaysky et al. (1989) Nucleic Acids Res., 17: 2919-2932, and many other references. Methods for performing reverse transcription are well known in the art, and include those that utilize a commercially available kit.

Reverse transcriptases are RNA-directed DNA polymerases that catalyze the synthesis of a DNA copy (i.e., cDNA) of target RNA molecules using a reverse transcription primer, dNTPs, and $Mg^{2+}$ or $Mn^{2+}$ as a cofactor. Any reverse transcriptase may be used with the present methods including, without limitation, avian myeloblastosis virus (AMV) reverse transcriptase, Moloney murine leukemia virus (M-MuLV) reverse transcriptase, Superscript™ III Reverse Transcriptase (ThermoFisher), and ProtoScript® II Reverse Transcriptase (NEB). In the Examples, the inventors utilized ProtoScript® II Reverse Transcriptase (NEB), which is a recombinant M-MuLV reverse transcriptase with reduced RNase H activity. Thus, in some embodiments, the reverse transcription reaction comprises only first-strand cDNA synthesis. However, the inventors have determined that RNase H activity does not alter the sensitivity of DxSeq (i.e., by adding RNase H to the reverse transcription reaction). Thus, a reverse transcriptase with RNase H activity may also be used in the present methods.

The RT reaction mixture comprises at least one RT primer. As used herein, the term "RT primer" refers to a primer that comprises a sample-specific barcode and that hybridizes to a viral transcript of interest (e.g., the N1 region of the SARS-CoV-2 nucleocapsid protein). Performing reverse transcription using the RT primer generates a barcoded nucleic acid molecule comprising cDNA (i.e., either a cDNA/RNA hybrid or duplex cDNA) from the transcript of interest. A different RT primer, each comprising a unique sample-specific barcode, is added to each RT reaction mixture for each transcript of interest. This ensures that each reaction mixture is uniquely labeled. In some embodiments, at least one RT primer used in step (b) is selected from Table 1, which provides 96 primers that can be used to barcode and reverse transcribe RNAs encoding the N1 region of the SARS-CoV-2 nucleocapsid protein. In some embodiments, at least one RT primer used in step (b) is selected from Table 2, which provides 96 primers that can be used to barcode and reverse transcribe RNAs encoding the N2 region of the SARS-CoV-2 nucleocapsid protein. In some embodiments, the sample-specific barcode(s) are selected from Table 4, which provides the 96 barcode sequences that were used in the RT primers provided in Tables 1-3.

In some embodiments, at least two RT primers are used in step (b). For example, in some embodiments, multiple RT primers are used to detect more than one viral transcript of interest, e.g., both the N1 region and the N2 region of the SARS-CoV-2 nucleocapsid protein. In these embodiments, the same sample-specific barcode is used to label each amplicon within a given sample.

In some embodiments, multiple RT primers are used to detect a control transcript as well as one or more viral transcripts of interest. For example, in some embodiments, at least one RT primer hybridizes with a positive control RNA. In some embodiments, at least one RT primer used in step (b) is selected from Table 3, which provides 96 primers that can be used to barcode and reverse transcribe positive control RNAs encoding human ribonuclease P (RNaseP). However, any housekeeping gene that is expressed in all human cells may be used as a positive control in the present methods.

The methods disclosed herein can be implemented via systems that are designed for massively parallel detection of SARS-CoV-2 or other pathogens in many samples (whether from one or many different patients). Thus, in some embodiments, the RT reaction mixtures are prepared in a multiwell plate in step (b). In some embodiments, the multiwell plate is a 96-well plate. In other embodiments, the multiwell plate is a 384-well plate. In these embodiments, each sample is added to a single well in the multiwell plate, and an RT primer comprising a unique sample-specific barcode is added to each well. Following reverse transcription, each well will contain nucleic acid molecules containing a unique sample-specific barcode. Thus, in these embodiments, the sample-specific barcode may be referred to as a "well-specific barcode". Importantly, the use of a multiwell plate allows the present methods to be automated, i.e., via the use of one or more robotic liquid handler.

In step (c) of certain embodiments of the present methods, reverse transcription is performed using the RT reaction mixtures. Suitable conditions (e.g., reaction temperature, reaction length) will depend on several factors, such as the length of the target RNA, presence of complex RNA secondary structure in the target RNA, and the reverse transcriptase in use, but can be readily determined by one skilled in the art. Different reverse transcriptases exhibit optimal enzyme activity at different temperatures. For example, AMV reverse transcriptase is most active at 42-48° C. In the Examples, the inventors utilized ProtoScript® II Reverse Transcriptase, which is a recombinant M-MuLV reverse transcriptase that is active at temperatures up to 48° C. In some embodiments, the RT reactions mixtures are incubated for at least 20 minutes at 42° C.

In step (d) of certain embodiments of the present methods, a portion of each RT reaction product of step (c) is combined in a single container, forming a combined RT reaction product. Suitable containers include, without limitation, a flask, a beaker, a centrifuge, a microcentrifuge tube, and the like.

In step (e) of certain embodiments of the present methods, nucleic acids are purified from the combined RT reaction product of step (d). Nucleic acids may be isolated using standard methods that are well known in the art, including those that rely on organic extraction, ethanol precipitation, silica-binding chemistry, cellulose-binding chemistry, and ion exchange chemistry. Many reagents and kits are for nucleic acid isolation are commercially available.

In some embodiments, step (e) comprises subjecting the combined RT reaction product of step (d) to both DNA purification and digestion with Exonuclease I. Exonuclease I is a DNA specific exonuclease that can be used to degrade single-stranded DNA. Thus, Exonuclease I may be used to remove unused RT primers from the combined RT reaction product prior to PCR.

In step (f) of certain embodiments of the present methods, a polymerase chain reaction (PCR) reaction mixture is prepared. The PCR reaction mixture comprises the purified nucleic acids of step (e), dNTPs, a PCR primer mix comprising a pool-specific barcode, and a DNA polymerase. Any heat-stable DNA polymerase may be utilized in the step including, for example, Taq DNA polymerase, Pfu DNA polymerase, and Q5® DNA polymerase.

The PCR primer mix comprises at least one forward PCR primer and at least one reverse PCR primer. In the Examples, the inventors utilized a transcript-specific forward primer that hybridizes with each transcript of interest (i.e., SARS-CoV-2 N1 and human RNaseP) and a universal reverse primer than amplifies all the transcripts of interest and comprises a pool-specific barcode. In their design, the barcoded reverse PCR primer binds to a constant region added by the RT primer, such that the pool-specific barcode is added next to the sample-specific barcode. This design allows both of the barcodes to by read by the sequencer in a single read. Alternatively, the pool-specific barcode could be added using a primer that targets the opposite end of the amplicon relative to the RT primer. In this scenario, the pool-specific barcode and the sample-specific barcode would be added to opposite sides of the amplicon and paired-end sequencing would be necessary to detect both barcodes. In some embodiments, the PCR primer mix used in step (f) comprises one reverse primer and at least one forward primer selected from Table 5, which includes the pooled PCR primers that were tested by the inventors in the Examples.

In some embodiments, at least one of the primers used in the PCR primer mix in step (f) comprises a sequencing adapter sequence. Adapter sequences are designed to interact with a specific sequencing platform (e.g., the surface of a flow-cell for Illumina sequencing or beads for Ion Torrent sequencing) to facilitate the sequencing reaction. Thus, the optimal length of the adapter sequences will vary depending on the sequencing platform used. One of ordinary skill will understand that adapter sequences may be as short as 20 nucleotides or substantially longer. For example, an adapter sequence of 58 nucleotides may be used with an Illumina machine. In other embodiments, sequencing adapters are added during the library preparation in step (h).

Reverse transcriptases have different levels of RNase H activity. RNase H activity is necessary to degrade the RNA strand of an RNA/DNA hybrid, generating single-stranded cDNA. Thus, if the reverse transcriptase used in step (b) does not have intrinsic RNase H activity, a separate RNase H enzyme can be added to the PCR reaction mix in step (f).

In step (g) of certain embodiments of the present methods, the PCR is performed using the PCR reaction mixture. Standard PCR conditions and methods of optimizing these conditions are well known in the art.

Step (g) generates amplified cDNA comprising both a sample-specific barcode and a pool-specific barcode. While the cDNA produced from different samples comprise unique sample-specific barcodes, all of the cDNA produced in a given round of library preparation is labeled with the same pool-specific barcode. The purpose of the pool-specific barcode is to distinguish the cDNA produced in this round from that produced in another round when the two sequencing libraries are combined in step (j). Thus, inclusion of the pool-specific barcode allows the same set of sample-specific barcodes to be reused in subsequent rounds of library preparation. In some embodiments, a multiwell plate is used to separate all of the samples prepared in a single round of library preparation. In these embodiments, the pool-specific barcode is sometimes referred to as a "plate-specific barcode" or a "plate barcode."

The process of tagging DNA samples with barcodes is known in the art as "multiplexing." Multiplexing allows large numbers of libraries to be pooled and sequenced simultaneously during a single run on a sequencing instrument. Thus, multiplexing increases the throughput of a single sequencing run, thereby saving time and money in high-throughput applications.

One of the primary advantages that can be achieved via various systems and methods of the present disclosure is that they can be performed using a small number of equipment pieces with a greatly reduced physical footprint as compared to RT-qPCR. Thus, in some embodiments, the PCR amplification of step (g) is carried out using a single PCR thermocycler. This single PCR thermocycler can be used again in subsequent rounds of library preparation, and the libraries can be combined in a single sequencing reaction, as described below.

In step (h) of certain embodiments of the present methods, a sequencing library is prepared from the amplified cDNA of step (g). Library preparation includes a size selection step, in which DNA amplicons of a desired size range are isolated for sequencing. This ensures that the fragments contained in the library are within the optimum size range for the specific sequencing instrument. For example, the optimum range is 200-500 bp for Illumina platforms, but can be up to 700 bp for Roche instruments. Size selection can be accomplished, for example, using a gel-based size selection method or a magnetic bead-based size selection method. Library preparation may also include further amplification of nucleic acid molecules, for example, using PCR or Illumina bridge amplification.

In step (i) of certain embodiments of the present methods, steps (a)-(h) are repeated using a different set of multiple samples to generate at least one additional sequencing library. As noted above, because all of the samples generated in a given round of library preparation (i.e., steps (a)-(h)) are labeled with the same pool-specific barcode, the same set of sample-specific barcodes can be reused in subsequent rounds. Thus, this dual-barcoding approach dramatically increases the number of distinguishable samples that can be generated with a single set of sample-specific barcoded primers, allowing many more samples to be sequenced in a single sequencing reaction (e.g., in a single lane).

In step (j) of certain embodiments of the present methods, at least two sequencing libraries generated in steps (h) and (i) are pooled. Ideally, each library will be normalized prior to pooling. Library normalization is the process of diluting libraries of variable concentration to the same concentration before volumetric pooling, ensuring an even read distribution for all samples. Library normalization is a standard practice in the art, and it can be performed, for example, by following the Illumina NextSeq System Protocol A: Standard Normalization Method, available at support.illumina.com/content/dam/illumina-support/documents/documentation/system_documentation/nextseq/nextseq-denature-dilute-libraries-guide-15048776-09.pdf.

In step (k) of certain embodiments of the present methods, the pooled sequencing libraries are sequenced to generate sequencing reads. Sequencing may be accomplished using any next generation sequencer including, without limitation, Illumina MiSeq, Illumina NextSeq, Illumina HiSeq, and Illumina NovaSeq.

In step (l) of certain embodiments of the present methods, the sequencing reads are demultiplexed to assign them to a particular sample using the sample-specific barcodes and the pool-specific barcodes. Demultiplexing is the process by which sequencing reads are assigned to their sample of origin based on the sequence of their corresponding barcode. Demultiplexing is accomplished using bioinformatics software.

In step (m) of certain embodiments of the present methods, the sequencing reads that map to the genome of the RNA virus in each sample are quantified to determine whether viral RNA was present in each of the samples. Quantification may be accomplished using bioinformatics software. First, the reads are aligned to the reference genome (e.g., the SARS-CoV-2 genome), and then the reads overlapping a region of interest (e.g., the N1 region) are quantified. The inventors have developed a normalizing score metric to convert the raw read counts into a diagnostic outcome, based on the ratio of viral transcript reads to positive control reads. See the section titled "The Dx-Seq method" in the Examples for details.

Systems:

In another aspect, the present disclosure provides systems for performing the methods disclosed herein in an automated fashion. The systems comprise at least one robotic liquid handler, a PCR thermocycler, and a next generation sequencer.

A "robotic liquid handler" or "liquid-handling robot" is a robot that dispenses a selected quantity of liquid (e.g., reagent, sample) into a designated container. Robotic liquid handlers are commonly used to automate workflows in life science laboratories. Any liquid handler that can be used to dispense an allotted volume of liquid can be used to automate the methods disclosed herein. In some embodiments, the liquid handler is the Opentrons OT2 or a Hamilton Microlab STARlet.

The sequencer used with the system may be any next generation sequencer including, without limitation, Illumina MiSeq, Illumina NextSeq, and Illumina NovaSeq.

The inventors designed Dx-Seq such that it could be automated using a relatively small number of equipment pieces as compared to RT-PCR. The inventors have calculated that: (1) 1,920 diagnostic tests can be completed per day using one robotic liquid handler, one PCR thermocycler, and one Illumina MiSeq sequencer; (2) 19,200 tests can be completed per day using five robotic liquid handlers, one PCR thermocycler, and one Illumina NextSeq sequencer; and (3) 147,456 tests can be completed per day using 40 robotic liquid handlers, one PCR thermocycler, and one Illumina NovaSeq 6000 sequencer. Thus, in some embodiments, the system comprises at least one robotic liquid handler and can be used to perform more than 1900 tests in a single day. In other embodiments, the system comprises at least five robotic liquid handlers and can be used to perform more than 19,000 tests in a single day. In other embodiments, the system comprises at least forty robotic liquid handlers and can be used to perform more than 147,000 tests in a single day.

EXAMPLES

The following example describes the inventors' novel massively parallel diagnostic assay for COVID-19, referred to Dx-Seq. This assay utilizes DNA barcoding and next-generation sequencing, and it can be used to carry out up to 19,200 tests each day. Preliminary validation data and primer sequences are also provided.

The Dx-Seq Method:

Reagent List

1. Reverse transcription primers (RTP) solution plate: 288 barcoded RT primers in 96-well format for 3 amplicons (SARS-CoV-2 N1, SARS-CoV-2 N2, human RNAseP). 3 barcoded RT primers per well. 100 µL of 10.0 µM (each primer) solution per 100 tests.

2. PCR Primer Mix containing FP1, FP2, FP3 forward primers with FULL Illumina Adapters at a final concentration of 10 μM each, combined with RP Solution plate(s) containing barcoded RPx primers with FULL Illumina Adapters at a final concentration of 10 μM. See Table 5 for the primer sequences used for pooled PCR. *Note: "FULL" indicates that the adapters include both the universal and the sequencer-specific primers for Illumina, including the i5 and i7 indexes.
3. DNA Spike-in Controls for N1, N2, RNAseP. 100 μL of 5 femtomolar solution per 100 tests.
4. dNTPs. 101 μL of 10 mM solution per 100 tests. NEB N0447L (4 mL=3960 tests).
5. DTT, DL-Dithiothreitol. 200 μL of 100 mM solution per 100 tests. SIGMA 43815 (1 gram=32400 tests).
6. Murine RNAse inhibitor. 20 μL of 40 units/μL solution per 100 tests. NEB M0314L (15000 units=1875 tests).
7. Reverse transcriptase enzyme. 100 μL of NEB Proto-Script II enzyme (200 units per μL) per 100 tests. NEB M0368X (40000 units=200 tests).
8. Reverse transcriptase enzyme buffer. 400 μL of 5×NEB Reverse Transcription Buffer (included with enzyme) per 100 tests. NEB M0368X.
9. Thermolabile Exonuclease I. 10 μL of 20 units/μL per 100 tests. NEB M0568L (15000 units=750 tests).
10. Thermostable RNAse H. 1 μL of 5 units/μL per 100 tests. NEB M0523S (250 units=4800 tests).
11. Qiagen MinElute PCR Purification Kit. Catalog #28006 (250 units=24000 tests).
12. Q5 DNA polymerase enzyme. 0.5 μL of 2 units/μL for 100 tests. NEB M0491L (500 units=96000 tests).
13. Q5 DNA polymerase buffer. 10 μL of 5× buffer for 100 tests. Included with NEB M0480X.

Preliminary Steps:
1. RTP solution plates: Chemically synthesize 288 barcoded RT primers in 96-well format for 3 amplicons (SARS-CoV-2 N1, SARS-CoV-2 N2, human RNAseP). See Table 1, Table 2, and Table 3 for the primer sequences used to reverse transcribe the N1, N2, and RNAseP amplicons, respectively. Dissolve each primer in DNAse-free, RNAse-free ddH20 to a stock concentration of 30 μM. Combine multiples of 33.3 μL of 30 μM primer stock solutions for each of 3 amplicons into a single well. Keep cold.
2. RT master mix reservoir: Prepare a reservoir containing multiples of 100 μL of 10 mM dNTP mixture (NEB N0447L), 400 μL of 5×NEB Reverse Transcription Buffer (included with NEB M0368X), and 200 μL of 0.1 Molar DTT (SIGMA 43815). Keep cold.
3. RT enzyme mix: Prepare a reservoir containing multiples of 20 μL of murine RNAse inhibitor (NEB M0314L, 40 units per μL) and 100 μL of Protoscript II Reverse Transcriptase enzyme (NEB M0368X, 200 units per μL). Keep cold.
4. Prepare stock solutions of the DNA spike-in controls (N1, N2, RNAseP) at a low concentration of 5 femtomolar ($5 \times 10^{15}$ Molar). To do this accurately, initially prepare a 10 μM solution by adding sufficient water to the lyophilized synthetic DNA fragment (e.g., an IDT gBlock). Then perform a 1 to 1000 dilution by adding 5 μL of the 10 μM solution to 4995 μL of DNAse-free, RNAse-free ddH20 to create a 10 nM solution. Then perform another 1 to 1000 dilution by adding 5 μL of the 10 nM solution to 4995 μL of DNAse-free, RNAse-free ddH20 to create a 10 μM solution. Then perform a third 1 to 1000 dilution by adding 5 μL of the 10 μM solution to 9995 μL of DNAse-free, RNAse-free ddH20 to create a 5 femtomolar solution.
5. Control fragment mix: Prepare a reservoir containing all three spike-in DNA controls by combining multiples of 33.3 μL of a 5 femtomolar solution of N1 spike-in DNA control, 33.3 μL of a 5 femtomolar solution of N2 spike-in DNA control, and 33.3 μL of a 5 femtomolar solution of RNase P spike-in DNA control. The final concentration of each spike-in control is 1.66 femtomolar, equivalent to 1000 copies per μL.

Assay:
1. A. If the sample is a patient viral RNA solution (nasopharyngeal/oropharyngeal swab in universal transport media (UTM)/viral transport media (VTM)):
   a. Aliquot 100 μl of patient UTM/VTM into 96 well, PCR safe microplate.
   b. Incubate plate at 70° C. for 5 minutes.
   c. Incubate the plate at 95° C. for 10 minutes.
   B. If the sample is a synthetic RNA control:
   a. Prepare mock sample containing between 0.1 to 100 μl of synthetic SARS-CoV-2 RNA control, (diluted to 100 copies per Twist Biosciences) and 1 μl of human lung total RNA control (diluted to 10,000 copies RNAseP transcript per μl, ThermoFisher).
2. Carry out reverse transcription using patient-specific RT primers.
   a. If using mock samples:
      i. With a new 96 well plate, add into each plate well, dispense 1 μL of the corresponding well from the 10.0 μM RTP solution plates, 9.8 μL of patient viral RNA solution, and 1 μL of control fragment mix.
      ii. Incubate plate at 65° C. for 15 minutes to carry out thermal denaturation of nucleic acids.
      iii. Into each plate well, dispense 7 μL of RT Master Mix and 1.2 μL of RT Enzyme Mix [these can be combined together into a single mixture].
      iv. Incubate the plate for 60 minutes at 42° C. to carry out first-strand cDNA synthesis.
   b. If using patient samples with inactivation protocol,
      i. Thaw RTP solution plates at 55° C. for 10 minutes.
      ii. With a new 96 well plate, add into each plate well in the following order: 7 μL of RT master mix, 1.2 μL of RT enzyme mix, 1 μL of control fragment mix [these 3 components can be pre-combined], 1 μL of the corresponding well from the 10.0 μM RTP solution plates, and 9.8 μL of patient viral RNA solution.
      iii. Incubate the plate for 20 minutes at 42° C. to carry out first-strand cDNA synthesis.

*All Remaining Portions of this Protocol are performed once per 96 well plate.
3. Combine, clean, and concentrate the RT product.
   a. Transfer 20 μL from each plate well in Step 2 into the same container for a total combined volume of 1.92 mL.
   b. Using Qiagen QIAquick mini-elution columns:
      i. Add 10 mL of DNA binding buffer to product from step 4a. Mix for 1 minute.
      ii. Transfer mixture to 4 mini-elution columns; 750 μl each column.
      iii. To bind DNA, apply the sample to the QIAquick column and centrifuge for 30-60 s.
      iv. Discard flow-through.
      v. Transfer 750 μl more of mixture to same mini-elution columns.

vi. To bind DNA, apply the sample to the QIAquick column and centrifuge for 30-60 s.
vii. Discard flow-through.
viii. Transfer 750 µl more of mixture to same mini-elution columns.
ix. To bind DNA, apply the sample to the QIAquick column and centrifuge for 30-60 s.
x. Discard flow-through.
xi. Transfer 750 µl more of mixture to same mini-elution columns.
xii. To bind DNA, apply the sample to the QIAquick column and centrifuge for 30-60 s.
xiii. Discard flow-through.
xiv. Place the QIAquick column back into the same tube.
xv. To wash, add 0.75 ml Buffer PE to each column and centrifuge for 30-60 s.
xvi. Discard flow-through and place the QIAquick column back into the same tube.
xvii. To wash, add 0.75 ml Buffer PE to each column and centrifuge for 30-60 s.
xviii. Discard flow-through and place the QIAquick column back into the same tube.
xix. Centrifuge the column for an additional 1 min.
xx. Place QIAquick column in a clean 1.5 ml microcentrifuge tube.
xxi. To elute DNA, add 9 µl ddH$_2$0 water to the center of each QIAquick membrane, let the column stand for 1 min, and centrifuge the column for 1 min.
xxii. Combined the volumes from all 4 tubes (total of 36 µl). The combined volume is your pooled cDNA product.

4. Exonuclease I digestion of the RT primers.
   a. Combine 32.5 uL cDNA+4 uL Thermolabile Exonuclease I+9 ul 5× Q5 Reaction Buffer. Mix thoroughly by rigorous vortexing or pipetting. Ensure all liquid is pulled to tube bottom with minicentrifuge spin.
   b. Incubate at 37° C. for 30 minutes.
   c. Heat inactivation by incubating at 80° C. for 10 minutes.

5. Perform one-pot PCR amplification of pooled patient-derived cDNA variants.
   a. Combine 45.5 uL product from Step 5 (all volume from Step 5)+1 uL 5×Q5 Reaction Buffer+1 µL of 10 mM dNTPs+1 µL of PCR Primer Mix (for corresponding plate)+0.50 Q5 DNA polymerase+1 µL of Thermostable RNAse H for a total volume of 50 µL.
   b. Place the PCR tube into a PCR thermocycler and run the following program:
      Initial denaturation at 98° C. for 30 seconds.
      35 cycles of the following steps:
         Denaturation: 98° C. for 10 seconds.
         Annealing: 61° C. for 30 seconds.
         Extension: 72° C. for 15 seconds.
      Final extension at 72° C. for 5 minutes.
      Hold at 4° C. This is the pooled PCR product.

6. Optional: Run agarose gel electrophoresis using 5 µL of pooled PCR product.
   a. Expected N1 and N2 amplicons are 290 base pairs long. Expected RP amplicons are 260 bp long.

7. Perform magnetic bead-based size selection.
   a. For each pooled PCR product, add 0.8× volume of KAPA beads (or AMPure XP beads). Follow the manufacturer's protocol to purify double-stranded DNA amplicons within a range of 240 to 340 base pairs. This is purified pooled PCR product.

8. Determine the concentration of the library & combine normalized amounts.
   a. Measure the concentration of each purified pooled PCR product using dsDNA Qubit and convert to nM based on that value. Average library size is 290 bp.

$$\frac{(\text{concentration in ng}/\mu l)}{660 \,\text{g}/\text{mol} \times \text{average libraray size in bp}} \times 10^6 = \text{concentration in nM}$$

b. If the ratio between the highest concentration and lowest concentration is less than 2.0, then add equal volumes of the purified pooled PCR product for a total volume of 450 µL. For example, for 9600 tests (10 plates), combine 4.5 µL of each purified pooled PCR product.
   c. If the ratio between the highest concentration and lowest concentration is greater than 2.0, then add unequal volumes of each purified pooled PCR product using the following directions:
      i. C1, C2, C3 CN is the concentration of the first, second, third, . . . last tube of purified pooled PCR product in nanomolar.
      ii. Sum together C1, C2, C3, CN. Let this number be $C_{sum}$.
      iii. Calculate ratios R1, R2, R3, . . . RN. R1 is $C_{sum}$ divided by C1. R2 is $C_{sum}$ divided by C2. R3 is $C_{sum}$ divided by C3. RN is $C_{sum}$ divided by CN.
      iv. Sum together R1, R2, R3, . . . , RN. Let this number be $R_{sum}$.
      v. For the first tube, multiply R1 by 450 µL and divide this number by $R_{sum}$ [V1=450×R1/$R_{sum}$]. Aliquot this volume V1 in µL into a new tube. For the second tube; multiply R2 by 450 µL and divide this number by $R_{sum}$ [V2=450×R2/$R_{sum}$]. Repeat for all tubes.
      vi. Each purified pooled PCR product will be present at the same concentration in the destination tube. The total volume will be 450 µL.
      vii. Record values of V1, V2, V3, VN for downstream analysis.

9. Denature and dilute libraries.
   a. Follow the Illumina NextSeq System Protocol A: Standard Normalization Method, available at support.illumina.com/content/dam/illumina-support/documents/documentation/system_documentation/nextseq/nextseq-denature-dilute-libraries-guide-15048776-09.pdf.

10. Submit libraries for sequencing.

11. Sequencing data analysis:
    a. Barcode and amplicon indexing: We generate a dictionary containing all possible k-mers from the known barcode and amplicon sequences. The barcodes and amplicon sequences are designed to have unique k-mers (i.e., unique sequences).
    b. Read packing: At maximum I/O speed, we read the fastq files and combine together all non-unique reads, creating a dictionary of read sequences and counts. The benefit here is that packing reduces the total read counts by up to 3-fold, which greatly reduces the computational cost of the next step.
    c. Read mapping and counting: At maximum I/O speed, we read the packed read dictionary, identify the k-mers associated with each indexed barcode and amplicon at or nearby the expected positions, and count their number of occurrences.

d. Analysis of count data: We convert the raw count data for the N1, N2, and RP amplicons into a diagnostic outcome. We've found that N1 read count data and RP read count data are inversely correlated, due to competition during the pooled PCR. So our most informative metric for the diagnostic outcome has been the ratio between N1 and RP read counts [#N1/#RP].

12. Diagnosis:

We developed a normalizing score metric to convert raw read counts for N1 and RP into a diagnostic outcome. It the outcome score is >1, then the diagnostic outcome is positive. If it's <1, then the diagnostic outcome is negative.

We calculate the outcome score (O) using the following equations:

$$N1\_score=(N1-N1\_min)/(N1\_max-N1\_min)$$

$$RP\_score=(RP-RP\_min)/(RP\_max-RP\_min)$$

$$O=N1\_score/RP\_score$$

Wherein:
N1 is the number of N1 mapped reads.
RP is the number of RP mapped reads.
N1_min is the minimum number of N1 mapped reads specific to each barcoded RT primer. This is a constant value for an entire workflow. [We noticed that some RT primers yield slightly more cDNA than others.]
N1_max is the maximum number of N1 mapped reads specific to each barcoded RT primer. This is a constant value for an entire workflow.
RP_min is the minimum number of RP mapped reads specific to each barcoded RT primer. This is a constant value for an entire workflow. [We noticed that some RT primers yield slightly more cDNA than others.]
RP_max is the maximum number of RP mapped reads specific to each barcoded RT primer. This is a constant value for an entire workflow.

Figure 8A:
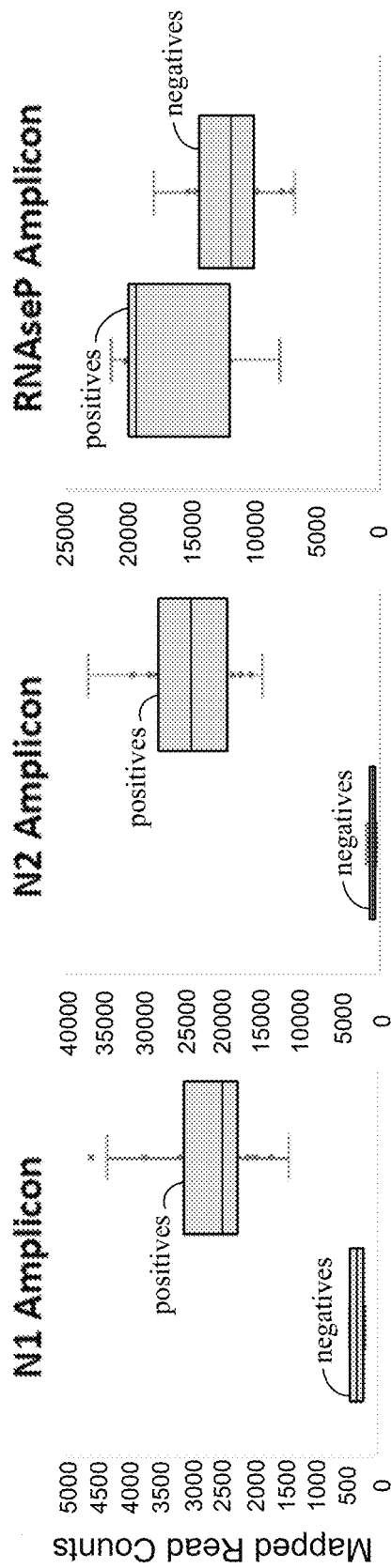
FIGS. 8A and 8B show the results of the second preliminary test of the Dx-Seq end-to-end workflow. The concentration of viral RNA, human RNA, and spike-in controls in 96 mock samples was systematically varied from 4 to 10,000 RNA copies. The samples were again sequenced using MiSeqNGS.
Figure 8B:
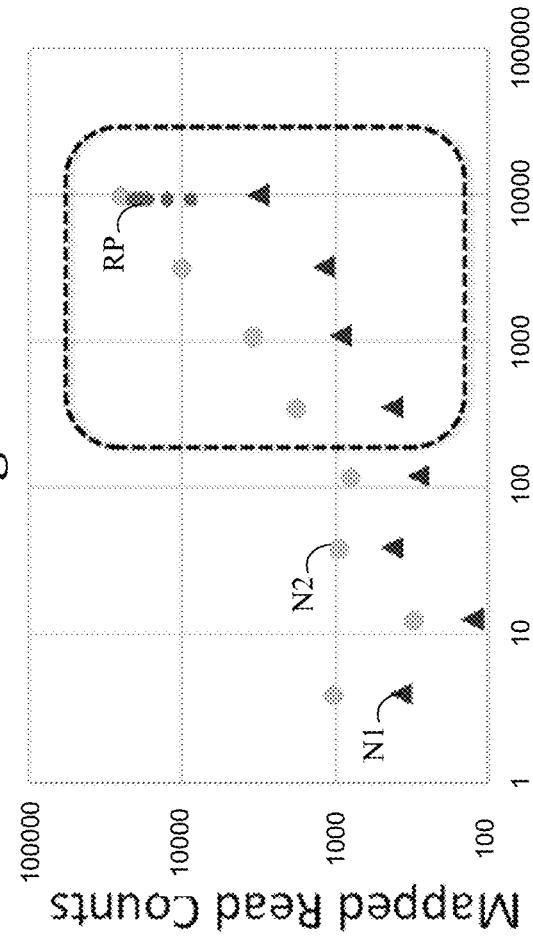
Figure 9A:
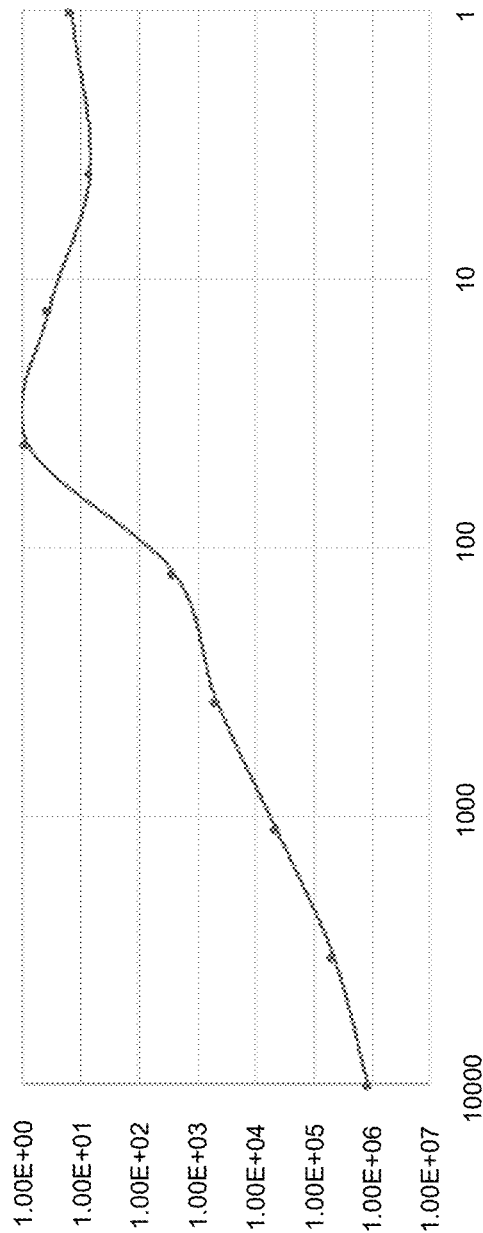
FIGS. 9A and 9B show the results of the third preliminary test of the Dx-Seq end-to-end workflow. The concentration of viral RNA, human RNA, and spike-in controls in 96 mock samples was systematically varied from 0 to 10,000 RNA copies. Eight replicates were tested at each concentration.
Figure 9B:
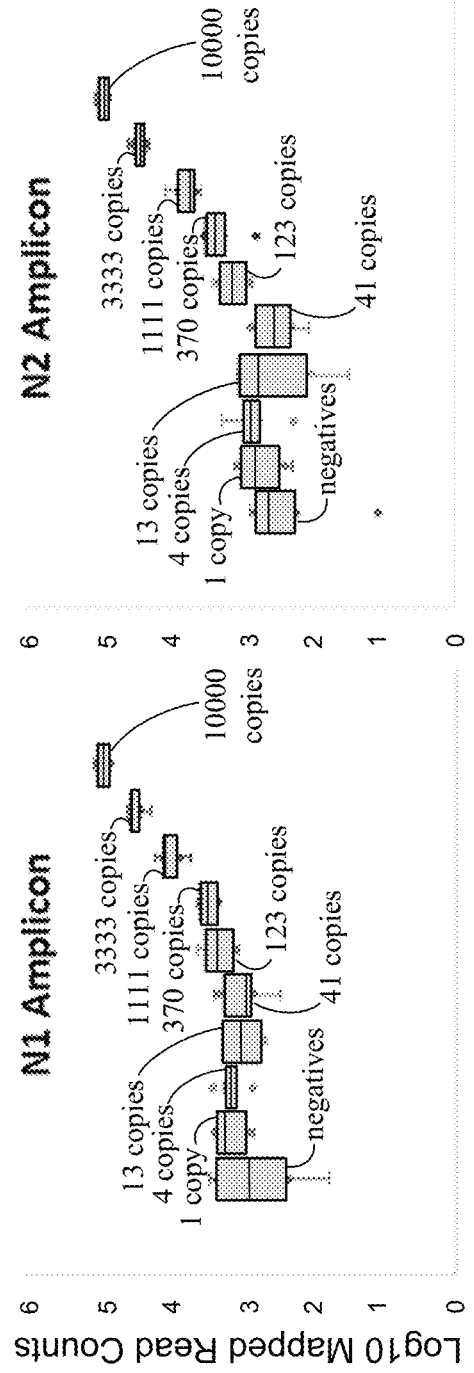

Validation experiments:

We have carried out three end-to-end workflows using our massively parallel approach with the goal of measuring its limit of detection. To do this, we purchased in vitro transcribed SARS-CoV-2 RNA (Twist Biosciences) and combined it with human total lung RNA (Life Technologies) to create non-infectious mock samples. The first workflow successfully detected the presence of SARS-CoV-2 RNA across 96 positive samples, yielding at least 10,000 read counts for each amplicon (FIG. 7). For the second workflow, we ran our assay on another 96 samples while varying assay parameters to find their optimal values (FIG. 8). Specifically, we varied the RT reaction time and the concentration of the mock RNA control. We also tested whether the presence or absence of RNAse H altered the diagnostic sensitivity. For the third workflow, we prepared samples with systematically varied SARS-CoV-2 RNA concentrations/titers with eight replicates of each. We determined that the current version of the assay has a limit of detection of about 123 viral RNA copies (about 6.2 copies per µL of RT reaction, or 10 attoMolar) (FIG. 9). Across all diagnostic tests, this limit of detection is considered excellent. For example, ELISA and serological tests often have limits of detection in the femtomolar range. However, we would need to increase our assay's limit of detection by about 10-fold to achieve the ultra-high sensitivity of the highest quality RT-qPCR diagnostic kits currently on the market. This is readily achievable.

Through a collaboration with a clinical microbiologist and pathologist, we are currently validating Dx-Seq on 288 clinical patient samples and SeraCare control samples. Specifically, we are measuring how well this assay performs when applied to viral samples extracted using nasopharyngeal swabs. We are also assessing how several different types of transport media could influence the activity of the reverse transcription step of the assay. These Dx-Seq assays are being performed using a MiSeq Dx, which is commonly found in hospital laboratories.

Figure 10:
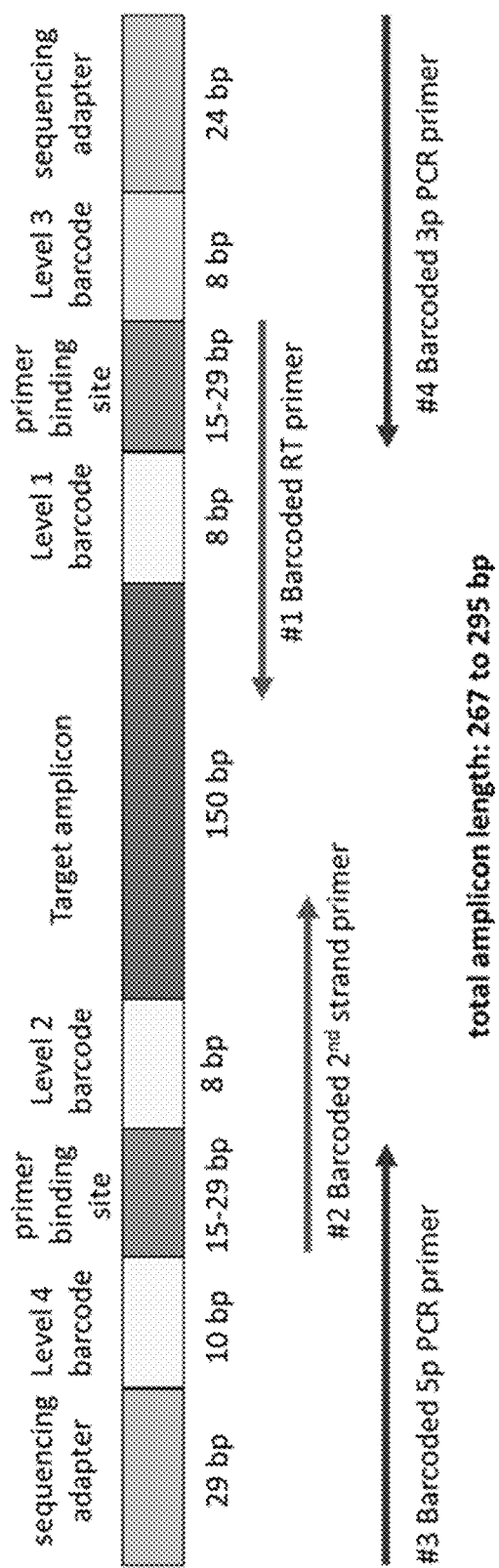
FIG. 10 shows an exemplary architecture of a double-barcoded amplicon in accordance with some aspects of the present disclosure.

FIG. 10 shows an exemplary architecture of a double-barcoded amplicon that can be produced by the systems and methods herein and will allow for differentiation of different samples within the one-pot PCR and next generation sequencing reactions described herein. A system, including associated software and algorithms, is provided to design barcodes that can be used in the reactions described here to produce a double-barcoded amplicon. Multiple double-barcoded amplicon are produced for multiple samples in a single reaction mixture and next generation sequencing and analysis allows for the ability to distinguish initial samples. It should be understood that the teachings of the present disclosure can be adapted (and such adaptations and expressly contemplated) so as to use 1, 2, 3, 4, 5, or more barcoded regions per amplicon, with varying length of each barcode (e.g., different numbers of nucleotides/base pairs). And, it may be desirable to have more than one barcode region be duplicated on the same or opposite sides of the amplicon sequence so as to better overcome error rates of the test/transcription and further improve the ability of the system to demultiplex and accurately identify results of the PCR test.

In some embodiments, the sequencing adapters may be determined by the sequencing manufacturer. The sequencing adapters are added by way of the PCR primers that also may add the level 4 barcode and may be constant across the amplicon library. The primer binding sites for the amplicon may be designed constant regions that satisfy optimal primer binding constraints and are part of the RT primers that add on the level 1 and level 2 barcodes. Level 1, 2, 3, 4 barcodes are each unique 8-bp DNA sequences with pair-wise or barcode-wise Hamming distances greater than 2. (As discussed below, the edit distance or other statistical measure of difference between the barcodes may be increased or decreased to allow for more or fewer possible barcodes per designed test.) The RT-PCR and PCR reactions result in a total double-barcoded amplicon length which may be about 267 to 295 bp. The barcodes that are designed by the system provide a marker to be able to distinguish the sample (e.g., which well, which patient, which plate, etc.) from which the amplicon came. The target amplicon may be disposed at the center of the double-barcoded amplicon product. In some examples, the length of the target amplicon may be 150 bp but will depend of the sequence of the target infectious agent. In some embodiments, more than one type of amplicon may be targeted for a given test. Thus, barcodes and primers may be designed for more than one amplicon, with the multiple target amplicons representing sequences of different parts of the same pathogen, different pathogens, or a combination of the two. For example, where an infectious agent may be expected to mutate, a test could be designed to account for target amplicons corresponding to multiple parts of the agent, such as multiple proteins or multiple parts of the same protein. For example, multiple sequences of a spike protein of a SARS-CoV-2 virus could be target amplicons, in a single combination test that also includes as target amplicons sequences from various influenza viruses, RSV viruses, or other pathogens. In some contemplated embodiments, multiple primer/barcode sequences are designed for a single combination test that will run, in parallel, a massive number of patient samples with results discriminating whether each patient is testing positive for none, one, or multiple target amplicons.

Level 1 and level 2 barcodes, which as shown are sample-specific barcodes with a length of 8 bp, are designed into the primer to be next to the target amplicon. In further examples, a primer with a length of 15 to 29 bp containing the level 1 and level 2 barcodes is capable of adding the barcodes into the amplicon by the first reverse transcription reaction. In even further examples, Level 3 and level 4 barcodes are designed into the PCT primers, which are pool-specific barcodes with a length of 8 to 10 bp and have a primer binding region to the amplicons such that the methods add the barcodes to be added to the amplicon. The level 3 and 4 barcodes thus are situated next to the primer binding sites, respectively. The two sequencing adapters designed into the primers to add to the double-barcoded amplicon and have a length of 24 to 29 bp and further are disposed at the end of the double-barcoded amplicon product which allows for the product to be detected via next generation sequencing. As described herein, however, the numbers of base pairs depicted in the double-barcoded amplicon design of FIG. 10 are for illustration purposes and reflect only one design choice for a single amplicon—the referenced numbers of base pairs are not to be interpreted as limiting of the present disclosure.

Figure 11:
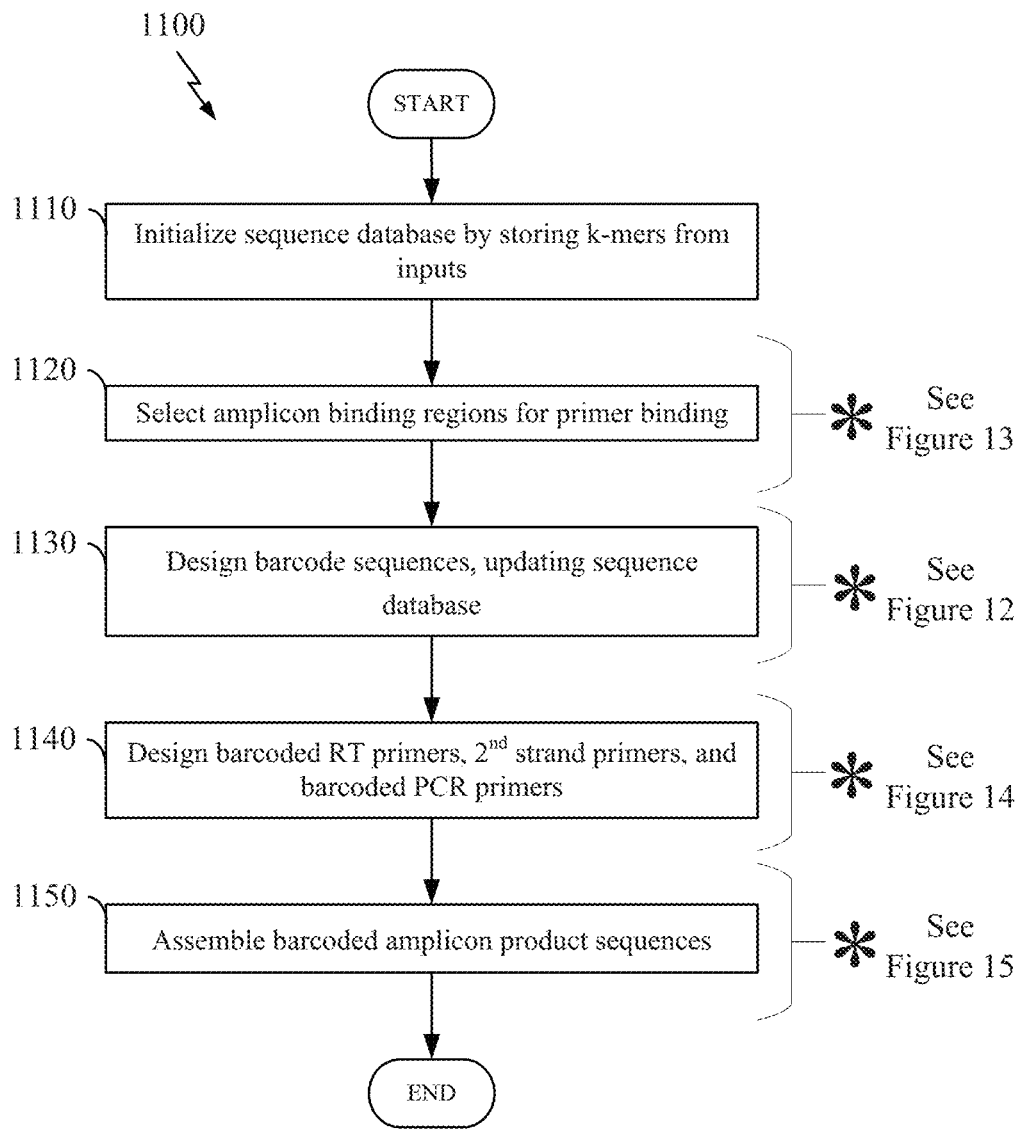
FIG. 11 is a flow chart illustrating an exemplary process for parallel detection of a virus in a set of multiple samples in accordance with some aspects of the present disclosure.

FIG. 11 is a flow chart illustrating an exemplary process for designing test parameters including primers and barcodes) that allow for parallel detection of one or more amplicons associated with one or more infectious agents (e.g., one or more viruses) in a set of multiple samples. As described below, a particular implementation may omit some or all illustrated features and may not require some illustrated features to implement all embodiments. In some examples, any suitable apparatus or means for carrying out the functions or algorithm described below may carry out the process 1100.

In block 1110, an apparatus may initialize sequence database by storing k-mers from inputs.

In block 1120, the apparatus may select amplicon binding regions for primer binding.

Block 1120 may be further described in connection with FIG. 13.

In block 1130, the apparatus may design barcode sequences and update the sequence database. Block 1130 may be further described in connection with FIG. 12.

In block 1140, the apparatus may design barcoded RT primers, 2nd strand primers, and barcoded PCT primers. Block 1140 may be further described in connection with FIG. 14.

In block 1150, the apparatus may assemble barcoded amplicon product sequences. Block 1150 may be further described in connection with FIG. 15.

Figure 12:
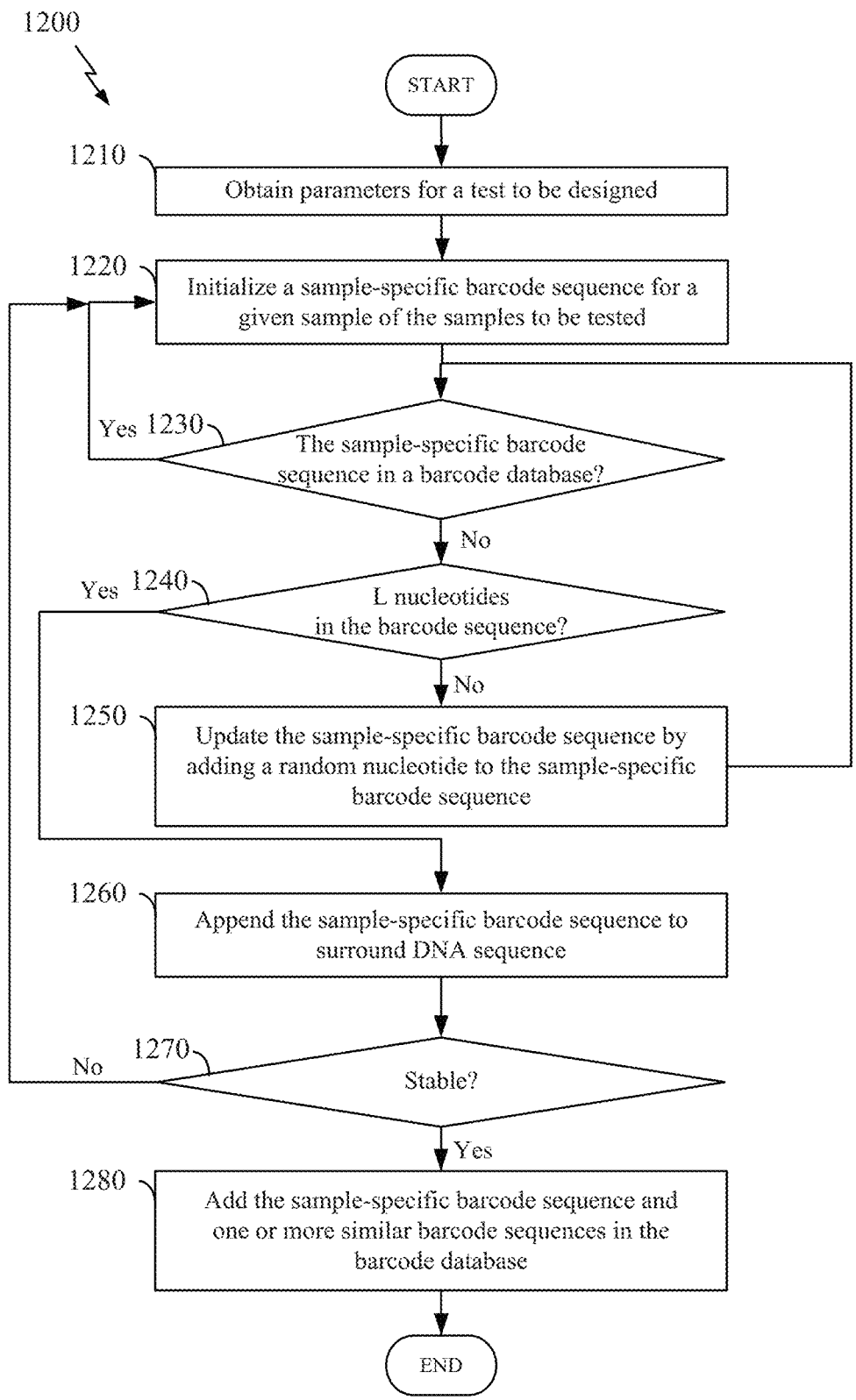
FIG. 12 is a flow chart illustrating an exemplary process for barcode sequence generation in accordance with some aspects of the present disclosure.

FIG. 12 is a flow chart illustrating an exemplary process for barcode sequence generation in accordance with some aspects of the present disclosure. The primer barcodes are used for primers such that they can form a double-barcoded (or single barcoded, or more) amplicon. As described below, a particular implementation may omit some or all illustrated features and may not require some illustrated features to implement all embodiments. In some examples, any suitable apparatus or means for carrying out the functions or algorithm described below may carry out the process 1200.

In block 1210, an apparatus may obtain information concerning desired test parameters, which may include a desired number of samples to be tested in parallel in a single test run, a desired number of amplicons to be tested during each test, the type equipment to run the test (including error rates, etc.), and the type of samples expected. The inventors have determined that the feasible number of samples to be tested in parallel (e.g., in a single pot) may be significantly higher than allowed by existing test protocols, such as: hundreds or thousands (e.g., 19,000) or hundreds of thousands. Thus, more than one amplicon (e.g., testing for the presence of more than one type of pathogen, or more than one attribute/protein/structure of a single pathogen) can be targeted during each test. In some embodiments, the samples may include RNA extracted from any specimen. For examples, a sample may include any patient sample in which a viral RNA (e.g., SARS-COV-2) can be detected in specimens such as bronchoalveolar lavage (BAL), sputum, nasal swabs, bronchoscope brush biopsy, pharyngeal swabs, anal swabs, feces, and blood. In further examples, the sample may be prepared by extracting RNA from any specimen.

When the test is eventually run, each sample will be assigned a well, and each well will be given a sample-specific barcode. (More precisely, the barcode will often be "well-specific," not necessarily "sample-specific," though in other embodiments duplicate samples could be included in more than one well and given the same barcode for redundancy.) In block 1220, the apparatus may determine a sample-specific barcode sequence for a first sample. For example, the apparatus may initialize the sample-specific barcode sequence for a sample of the multiple samples and initialize a barcode k-mer database. In some embodiments, the number of entries in the database (e.g., the k-mers) is defined as the total number of possible sequences given barcode length (L), less all of the sequences that are within a given Hamming distance (H). Each k-mer may also include a surrounding DNA sequence. In some examples, the sample-specific barcode sequence may be initialized by generating one or more random nucleotides. In further examples, the sample-specific barcode sequence may begin with one random nucleotide, then sequentially add random nucleotides. The apparatus may determine the sample-specific barcode sequence with any other suitable method, such as random number generation applied to the set of possible nucleotides. The system may then determine multiple sample-specific barcode sequences corresponding to the multiple samples to be included in a given test to be designed. Thus, in the examples, each sample will have a corresponding barcode sequence.

In block 1230, the apparatus may determine whether the current sample-specific barcode sequence being generated is already in use. The system will identify non-existence of the sample-specific barcode sequence being generated in a barcode database. If the barcode database includes the same barcode sequence as the sample-specific barcode sequence (Yes), the apparatus may determine another sample-specific barcode sequence for the sample again in block 1220. However, if the barcode database does not include the sample-specific barcode sequence (No), the apparatus may perform a process in block 1240. In some embodiments, this step of block 1230 may be reserved until after block 1240 or may be performed after a given number N of random nucleotide values have been generated for a given sequence, or can be performed after every step 1220. For example, in some embodiments, the system may generate a complete nucleotide sequence of L nucleotides at step 1220, which is then analyzed under step 1230 right away.

In other embodiments, the random nucleotide sequence that was generated in block 1240, can be assessed to determine if it is now of a sufficient length, i.e., whether it contains 1' nucleotides in the sample-specific barcode sequence, wherein 1' is determined at the initialization phase. In other words, a user will determine how many samples are desired to be tested together, in parallel, and will identify the equipment to be used, and optionally an acceptable false positive/false negative or error rate. Based on this information, the system can determine the length, of the barcode that will be required to confidently differentiate samples. For example, the system may determine what a Hamming distance should be between given barcodes, given possible error rate, and how many barcodes will be needed. In some embodiments, the system may automatically optimize the value 1' so that a minimum number of nucleotides is used in each barcode in order to be able to confidently differentiate the barcodes after the test has been performed. In other embodiments, the system may instead rely upon a predetermined value for 1' and will prevent users from requesting test parameters that do not fit within the maximum number of differentiate-able barcodes which can be generated given 'L.' E.g., if a user requests a high number of samples to be tested at once, and a negligible error rate, using 1' nucleotides for the barcodes may not be sufficient, and so an error may be returned to the user requesting adjustment of the specified parameters.

At step 1240, if the apparatus finds that 'L' random nucleotides exist in the sample-specific barcode sequence being generated (Yes), the apparatus may perform a process in block 1260. However, if the apparatus does not find that 1' nucleotide yet exist in the sample-specific barcode sequence (No), the apparatus may perform a process in block 1250.

In block 1250, in response to the non-existence of the 1' nucleotide in the sample-specific barcode sequence, the apparatus may update the sample-specific barcode sequence by adding another random nucleotide to the sample-specific barcode sequence. Then, the apparatus may perform processes of blocks 1230 and 1240 with the updated sample-specific barcode sequence. Thus, the apparatus identifies the non-existence of the updated sample-specific barcode sequence in the barcode database in block 1230 and identifies the existence of 'L' nucleotides in the sample-specific barcode sequence in block 1240. In this way, the sample-specific barcode sequence keeps adding random nucleotides until the 1' nucleotide is added in the sample-specific barcode sequence. In various embodiments, the value of 1' may differ. For some desired types of tests, 1' may be 8 such that the barcode will comprise 8 base pairs of nucleotides when in use for testing. Having 8 base pairs will determine the maximum number of possible permutations of nucleotides, and thus, the maximum number of possible samples. Then, other desired test parameters (such as, e.g., the transcription error rate of the equipment to be used, acceptable accuracy thresholds for detection, etc.) may further reduce the maximum number of possible samples. In other embodiments, it may be desirable to increase or decrease the value of 1' for one or more barcode regions to be used in a given test to, for example, improve binding of the primer to a given amplicon, to improve specificity of barcode detection, etc. In some embodiments, duplicate samples may be placed in more than one well to improve specificity; in other embodiments, an increased number of nucleotides may be used in the barcodes and greater distance between barcodes may be imposed to improve specificity of barcode detection and association with a given sample/patient.

In block 1260, in response to the existence of the 1' nucleotide in the sample-specific barcode sequence, the apparatus may append the sample-specific barcode sequence to surround DNA sequence. In some examples, the apparatus may prepare multiple RT primers corresponding to the multiple samples. Each RT primer may include the sample-specific barcode sequence. However, in some scenarios, the RT primer including the sample-specific barcode sequence might not be stable enough.

In block 1270, the apparatus may determine whether the DNA structure including the sample-specific barcode sequence is stable based on the energy level of the DNA structure. For example, the apparatus may identify the DNA structure with the sample-specific barcode sequence having more than a predetermined energy level. In some examples, the predetermined energy level is −2 kcal/mol. However, if the DNA structure with the sample-specific barcode sequence is not stable (e.g., is equal to or less than the predetermined energy level), the apparatus starts the barcode sequence generation process from block 1220 and finds another suitable barcode sequence with the DNA structure, which is stable. If the DNA structure with the sample-specific barcode sequence is stable, the apparatus may perform the process in block 1280. More generally, at block 1270, the system will determine whether the given barcode sequence with the DNA structure will be suitable for use in the desired test—in other words whether the barcoded DNA structure will sufficiently attach to the target amplicon for purposes of test accuracy and sensitivity.

In block 1280, the apparatus may add the sample-specific barcode sequence in the barcode database. In addition, the apparatus adds one or more similar barcode sequences to the sample-specific barcode sequence in the barcode database. In some examples, each similar barcode sequence may have a predetermined hamming distance or a shorter distance than the predetermined hamming distance from the sample-specific barcode sequence. Thus, since a next sample-specific barcode sequence cannot be selected from any barcode sequences in the barcode database as described in block 1230, the next sample-specific barcode sequence cannot be equal to or be similar to the existing sample-specific barcode sequence and is sufficiently distinguishable from existing sample-specific barcode sequences. It is to be understood that other statistical methods of determining "difference" or edit distance between barcode sequences can be used in certain embodiments, depending on the number of base pairs and types of expected errors. For example in some instances Levenshtein distance, Jaccard distance, or similar approaches to determine string difference could be employed. In yet other approaches, a given barcode could be processed using a hash function. For example, each nucleotide could be ascribed a value and that value could be supplemented to account for position within the barcode sequence. A hash function or similar operation could be performed on the barcode sequence which could then be further used to later associate detected barcodes (which may have errors) with the sample specific barcode that was originally assigned to the associated sample.

In further examples, the apparatus may additionally determine a different sample-specific barcode sequence for the same sample of the plurality of samples and append the different sample-specific barcode sequence to the RT primer corresponding to the sample. Thus, in the examples, each RT primer has two different sample-specific barcode sequences next to the target amplicon. As described previously with respect to FIG. 10, more than one barcode could be used per target amplicon, and some of these could be designed to be identical to further reduce the chance of mis-identification due to transcription errors. Thus, the process of FIG. 12 can be re-run as many times as necessary to design the number of needed unique barcodes for a given test.

In other examples, the apparatus may additionally determine a different sample-specific barcode sequence for each sample of multiple second samples to eliminate carryover contamination. Then, the apparatus may append the different sample-specific barcode sequence to each RT primer corresponding to the respective second sample of the multiple samples. In the examples, the apparatus may use two sets of barcoded RT primers. Thus, even if the first set of barcoded RT primers is contaminated, the apparatus may still use the second set of barcoded RT primers.

Once a given set of barcodes and primers has been designed for a given test, these barcodes/primer combinations will be used each time the test is run (or, alternatively two sets of barcodes, or other multiples, can be alternatingly used to reduce the chance of cross-contamination). For example, a technician may assign a given well to each of 100 samples, or 1000 samples, 19,000 samples, or some greater number of samples. Each well may be associated with a given barcode/primer sequence. The samples are then processed using primers having the given barcode/primer sequence, and sequencing is performed. The result of the sequencing will include a number of detections (which may or may not include a detection for each well versus only some wells). And, those detections may include multiple positive hits for any given sample. Further, each detection could potentially bear transcription errors, meaning that a detected barcode could: (i) correctly be identical to the right barcode originally associated with the well/sample (meaning there were no transcription errors); (ii) bear errors that make it non-identical to any barcode, including the originally-assigned barcode; or (iii) contain transcription errors that make it appear similar to the wrong barcode. Thus, a number of steps may be utilized post-processing to associate detections with the right sample.

Because of the way the barcodes were carefully designed, as described above, confidence can be had in sorting out the results of a sequencing and associating results with the right sample—despite numerous samples being run in the same test. First—because a database is used that "reserves" space (e.g., Hamming distance) around each barcode that takes into account error rate of the equipment to be used, all barcodes that are detected that identically match an originally-assigned barcode can be assumed to be accurate. In other words, the design of the barcodes should largely eliminate circumstances in which a barcode contains errors that would make it identical to, or confused for, a different barcode. No barcode is designed to be "close" enough to another barcode in terms of edit distance that the expected number of errors could cause it to be identical to or confused with another barcode. All barcodes that identically match an originally-assigned barcode are then binned. So, for example, the sample from well #1 may show 5 identical/accurate detections for a given amplicon, the sample from well #2 may show 10 identical/accurate detections for a given amplicon, etc.

Second, for detected barcodes that do not identically match an originally-assigned barcode, the system can identify and rank the closest designed barcodes to the detected barcodes. For example, the system may determine that a detected barcode is 90% similar to the originally-assigned barcode for well #1, 60% similar to the originally-assigned barcode for well #2, etc. If the similarity score (or edit distance) for the top/most similar barcode is significantly higher than any other barcode, it can be assumed that the detected barcode is that top/most similar barcode (though with minor errors). For example, if the similarity score of a top/most similar barcode is 10%, 15%, 20%, or higher than the next closest barcode, the system may simply assume the detected barcode is the top/most similar barcode.

To reduce processing load, the system may filter the list of originally-assigned barcodes before calculating edit distance or other similarity score. For example, the system may first prune the list (which could include tens or hundreds of thousands of barcodes, including potentially multiple barcodes per sample) to include only those barcodes that have at least 5 out of 8 identical nucleotides or 7 out of 10 identical nucleotides, or other measure. Then, Hamming distance or other edit distance/similarity score could be calculated for the remaining barcodes.

In some embodiments, e.g., where a high number of samples are run at once or where the imposed edit distance reservations between allowable barcodes are comparably small, there could potentially arise circumstances where a sample bears transcription errors that cause it to be comparably similar to more than one original barcode. In these instances, the system can take a number of alternative actions. Assume a given detected barcode has a comparable similarity to the originally-assigned barcodes for both well 1 and well 2. The system can the examine whether the sample from well 1 or well 2 had other detected results that identically matched the associated barcode. For example, if the sample from well 1 had 10 positive detections for a given amplicon (wherein the correct, identical barcode was read), but the sample from well 2 had no positive detections, then the given barcode could be assumed more likely to be well 1 than well 2, and consequently discarded. In general, the existence of other, accurate positive detections for the possible set of barcodes for a given detected barcode can be used to determine how to utilize a given detected barcode that could be similar to more than one originally-assigned barcode. Alternatively, all detected barcodes that have comparable similarity to more than one originally-assigned barcode could simply be discarded or could be flagged as inconclusive results for all possible wells/samples. And, if a given well/sample had only "inconclusive" detections or a high rate of "inconclusive" detections, the result for that well/sample could be reported as "inconclusive."

Once the barcodes of all detections are read and associated with a well/sample, a report can be run that provides results for all of the samples in parallel. A negative result is associated with those wells/samples for which no identical or similar barcodes were detected. A positive result is associated with those wells/samples for which an identical or statistically similar barcode was detected.

Figure 13:
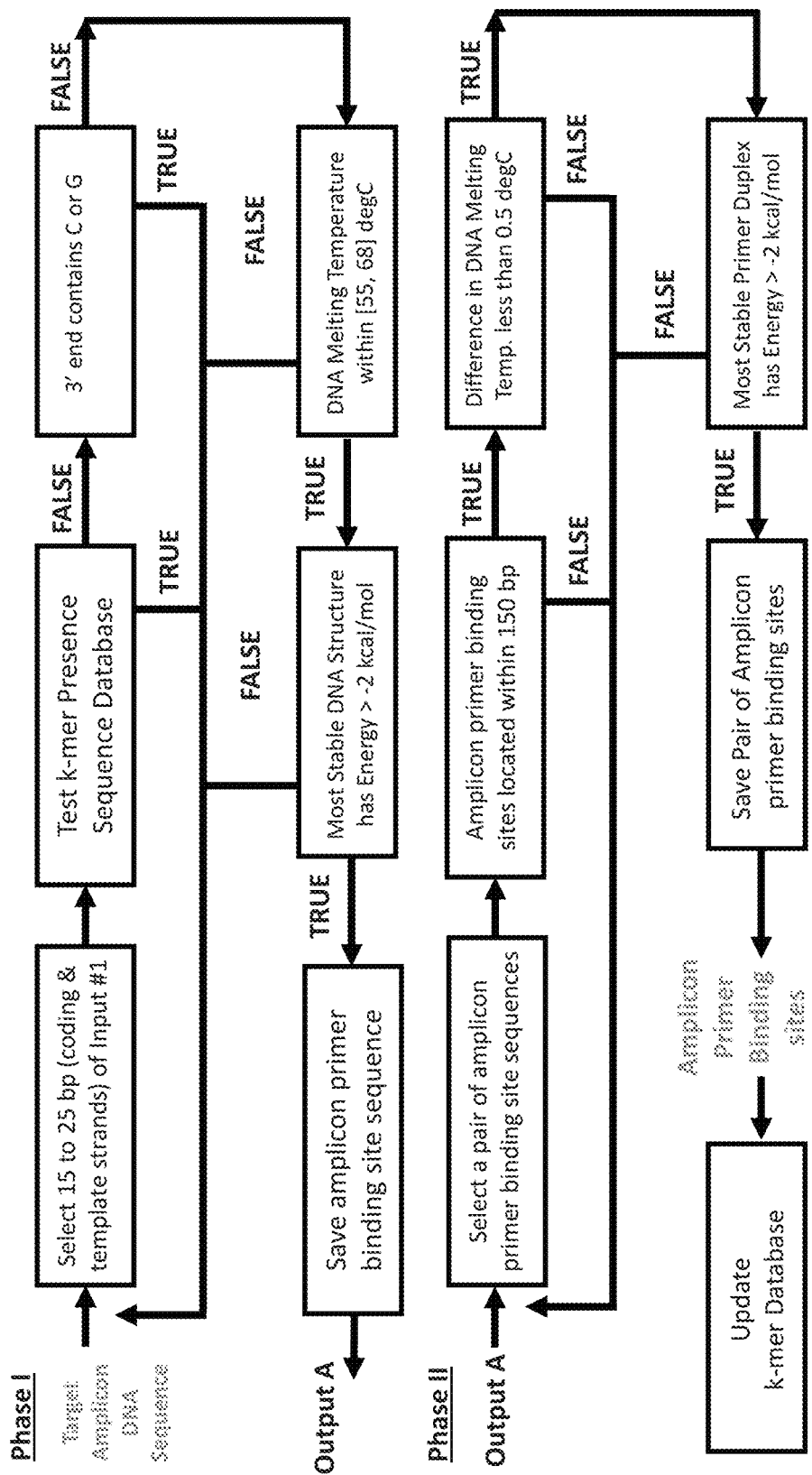
FIG. 13 is a flow chart illustrating an exemplary process for designing amplicon primer binding sites in accordance with some aspects of the present disclosure.

FIG. 13 is a flow chart illustrating an exemplary process for designing amplicon primer binding sites. As described below, a particular implementation may omit some or all illustrated features and may not require some illustrated features to implement all embodiments. In some examples, any suitable apparatus or means for carrying out the functions or algorithm described below may carry out the process 1300.

In some examples, two phases (phase I and phase II) may exist for designing amplicon primer binding sites. In phase I, target amplicon DNA sequence may be given as an input. 15 to 25 bp (coding & template strands) of the target amplicon DNA sequence may be selected. Then, the k-mer presence in the target amplicon DNA sequence may be identified in a sequence database. If the k-mer exists in the sequence database, 15 to 25 bp (coding & template strands) of the target amplicon DNA sequence may be selected again. If the k-mer does not exist in the sequence database, whether 3' end contains 'C' or 'G' can be identified. If 3' end contains 'C' or 'G,' the process begins again by selecting 15 to 25 bp (coding & template strands) of the target amplicon DNA sequence. If 3' end does not contain 'C' or 'G,' whether DNA melting temperature is within [55, 68] degC is identified. If DNA melting temperature is not within [55, 68] degC, the process begins again by selecting 15 to 25 bp (coding & template strands) of the target amplicon DNA sequence. If DNA melting temperature is within [55, 68] degC, whether most stable DNA structure has energy more than −2 kcal/mol is identified. If most stable DNA structure has not energy more than −2 kcal/mol, the process begins again by selecting 15 to 25 bp (coding & template strands) of the target amplicon DNA sequence. If most stable DNA structure has energy more than −2 kcal/mol, the amplicon primer binding site sequence can be saved.

In phase II, based on the amplicon primer binding site sequence, which is an output of phase I, a pair of amplicon primer binding site sequences can be selected. Then, whether the amplicon primer binding sites are located within 150 bp is identified. If the amplicon primer binding sites are not located within 150 bp, the process in phase II begins again by selecting a pair of amplicon primer binding site sequences from the amplicon primer binding site sequence of phase I. If the amplicon primer binding sites are located within 150 bp, whether the difference in DNA melting temperature is less than 0.5 degC is identified. If the difference in DNA melting temperature is not less than 0.5 degC, the process in phase II begins again by selecting a pair of amplicon primer binding site sequences. If the difference in DNA melting temperature is less than 0.5 degC, whether most stable primer duplex has energy more than −2 kcal/mol is identified. If most stable primer duplex does not have energy more than −2 kcal/mol, the process in phase II begins again by selecting a pair of amplicon primer binding site sequences. If most stable primer duplex has energy more than −2 kcal/mol, the pair of amplicon primer binding sites can be saved, and the k-mer database can be updated.

Figure 14:
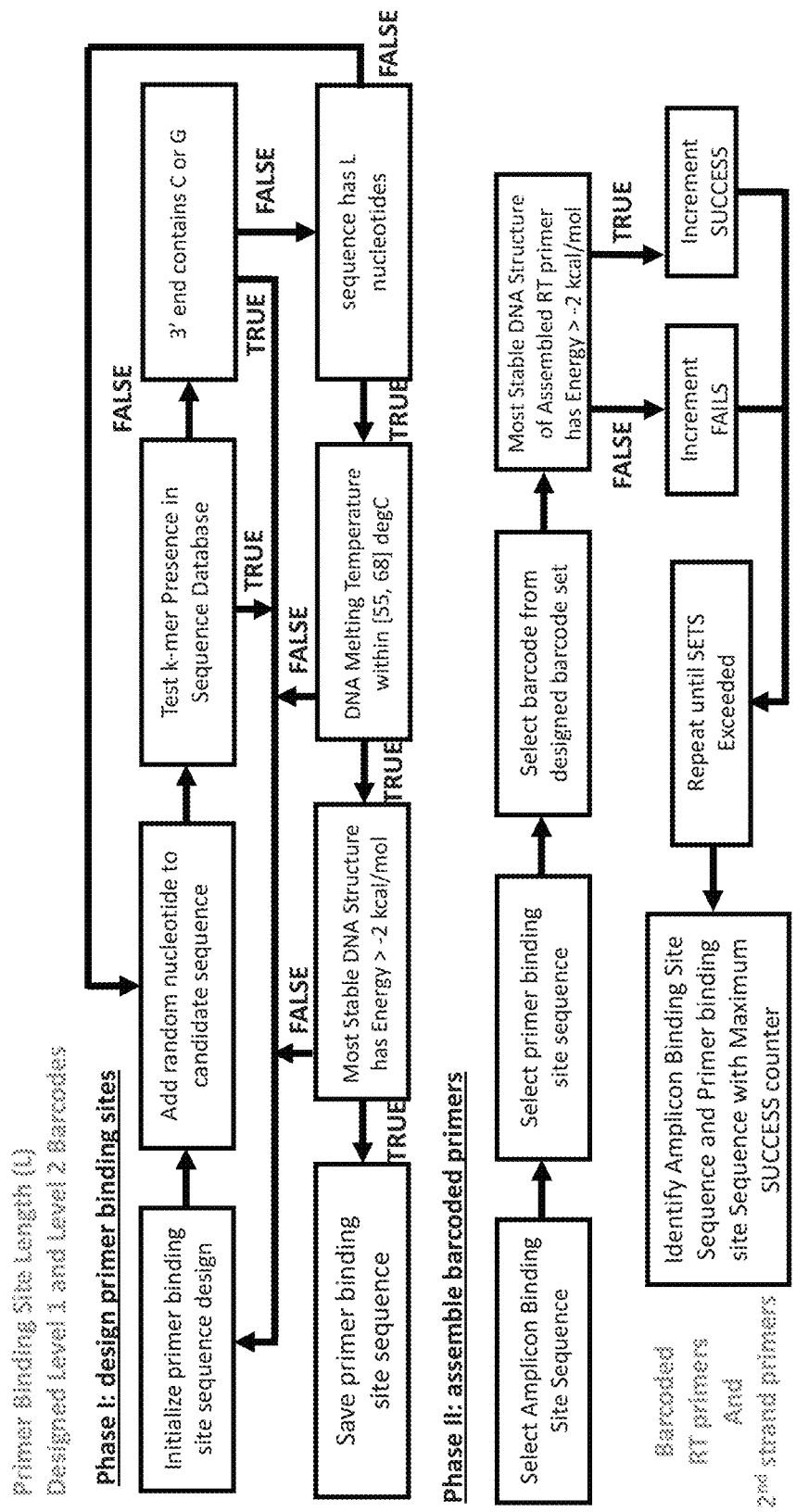
FIG. 14 is a flow chart illustrating an exemplary process for designing barcoded RT primers and second strand primers in accordance with some aspects of the present disclosure.

FIG. 14 is a flow chart illustrating an exemplary process for designing barcoded RT primers and second strand primers. As described below, a particular implementation may omit some or all illustrated features and may not require some illustrated features to implement all embodiments. In some examples, any suitable apparatus or means for carrying out the functions or algorithm described below may carry out the process 1400.

In some examples, two phases (phase I and phase II) may exist for designing barcoded RT primers and second strand primers. Phase I is to design primer binding sites, and phase II is to assemble barcoded primers. In phase I, a primer binding site sequence design may be initialized. Then, random nucleotide can be added to candidate sequence. Then, existence of k-mer in the sequence database may be tested. If k-mer exists in the sequence database, the process in phase I begins again by initializing the primer binding site sequence design. If k-mer does not exist in the sequence database, whether 3' end contains 'C' or 'G' can be identified. If 3' end contains 'C' or 'G,' the process of phase I begins again by initializing the primer binding site sequence design. If 3' end does not contain 'C' or 'G,' whether the sequence has nucleotides is identified. If the sequence does not have nucleotides, the process of phase I begins again by initializing the primer binding site sequence design. If sequence has nucleotides, whether DNA melting temperature is within [55, 68] degC is identified. If DNA melting temperature is not within [55, 68] degC, the process begins again by initializing the primer binding site sequence design. If DNA melting temperature is within [55, 68] degC, whether most stable DNA structure has energy more than −2 kcal/mol is identified. If most stable DNA structure has not energy more than −2 kcal/mol, the process begins again by initializing the primer binding site sequence design. If most stable DNA structure has energy more than −2 kcal/mol, the primer binding site sequence can be saved.

In phase II, based on the primer binding site sequence, which is an output of phase I, an amplicon binding site sequence can be selected. Then, a primer binding site sequence can be selected, and a barcode can be selected from designed barcode set. Then, if most stable DNA structure of assembled RT primer has energy more than −2 kcal/mol, 'success' can be incremented. if most stable DNA structure of assembled RT primer does not have energy more than −2 kcal/mol, 'fails' can be incremented. This process can be repeated until SETS exceeded. The amplicon binding site sequence and primer binding site sequence with maximum success counter. Based on this process, barcoded RT primers and second strand primers can be prepared.

Figure 15:
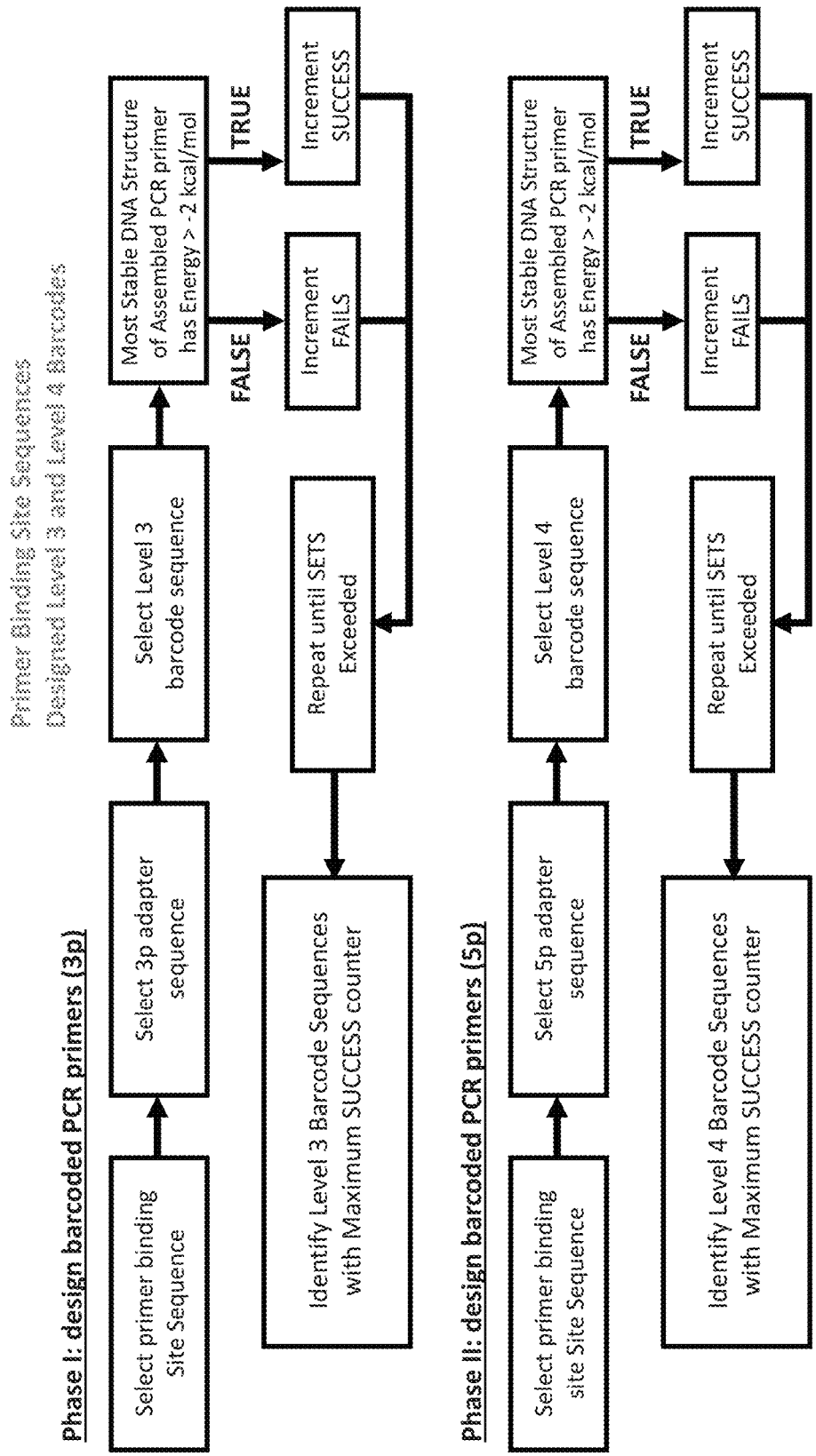
FIG. 15 is a flow chart illustrating an exemplary process for designing barcoded PCR primers in accordance with some aspects of the present disclosure.

FIG. 15 is a flow chart illustrating an exemplary process for designing barcoded PCR primers. As described below, a particular implementation may omit some or all illustrated features and may not require some illustrated features to implement all embodiments. In some examples, any suitable apparatus or means for carrying out the functions or algorithm described below may carry out the process 1500.

In some examples, two phases (phase I and phase II) may exist for designing barcoded PCR primers. Phase I is to design barcoded PCR primers (3P), and phase II is to design barcoded PCR primers (5P). In phase I, a primer binding site sequence, 3p adapter sequence, and level 3 barcode sequence may be selected. Then, if most stable DNA structure of assembled PCR primer has energy more than −2 kcal/mol, 'success' can be incremented. If most stable DNA structure of assembled PCR primer does not have energy more than −2 kcal/mol, 'fails' can be incremented. This process can be repeated until SETS exceeded. Level 3 barcode sequences with maximum 'success' counter can be identified.

In phase II, a primer binding site sequence, 5p adapter sequence, and level 4 barcode sequence may be selected. Then, if most stable DNA structure of assembled PCR primer has energy more than −2 kcal/mol, 'success' can be incremented. if most stable DNA structure of assembled PCR primer does not have energy more than −2 kcal/mol, 'fails' can be incremented. This process can be repeated until SETS exceeded. Level 4 barcode sequences with maximum 'success' counter can be identified.

Example Implementations

In some embodiments, a system may be arranged for providing test parameter design output to users. This system may be set up as a software service, or may comprise a routine running on a local machine or network associated with the test equipment to be used (e.g., within the network of a large-scale testing operation or lab). The system may present a user interface, which prompts a user to input or select certain parameters of a test to be designed. The user may be remote or local to the machine running the software that implements the user interface. The parameters may include: number of desired wells to be combined into the one-pot for testing in parallel; number of patient samples to be run in parallel (which may be the same as or differ from the desired number of wells, due to desired redundancies/duplicative wells); number of pathogens to be tested, including sequence information for the aspects of the pathogens to be the target amplicons; transcription error rate of the machine to be used (which may in some circumstances be an optional parameter if the software is running on the machine or the same network as the machine); the specific sequencing machine and other equipment to be used; desired maximum expected error rate of the output of the test (or, conversely, the desired specificity of reading barcodes and possible rate of "inconclusive results"); the number of independent sets of barcode/primer sequences to be used (e.g., to limit possible cross contamination from test to test); and other parameters such as whether the test must fit within constrains on processing power/time, etc.

In other embodiments, an optimization method is contemplated to increase throughput of a testing lab. A system can track historical test utilization (e.g., numbers of tests for a number of different pathogens per month/week/etc.) and frequency of the tests being needed (e.g., each October, an increase in the number of influenza and RSV tests is needed), and take user input on expected test utilization for the next month/year/quarter. The system could then design test parameters to optimize throughput of tests for each pathogen. Then, using a fitting and optimization technique, the system could design barcode/primer sequences that match the test demand for the lab, which may include optimizing the number of samples that can be run per test and/or combining tests for multiple pathogens into one parallel test. E.g., a set of barcode/primer sequences could be recommended for a given number of SARS-CoV-2 tests to be run in parallel, followed by a separate set of barcode/primer sequences that combine SARS-CoV-2 testing with testing for influenza and RSV in the same one-pot test. Optimizations could be made for the size and complexity of barcodes, such that barcode/primer sequences for larger scale (i.e., more parallel) tests are used when demand is high, and less complex barcodes are used for instances where demand is lower. Then, the organization could procure the appropriate primers for the upcoming month/year/quarter according to expected need.

Further Examples Having a Variety of Features:

The disclosure may be further understood by way of the following examples:

Example 1: A method, apparatus, and non-transitory computer readable medium for parallel detection, comprising: obtaining a plurality of samples; preparing a plurality of reverse transcription (RT) primers corresponding to the plurality of samples, wherein each RT primer of the plurality of RT primers comprises a sample-specific barcode; performing reverse transcription based on the plurality of samples and the plurality of RT primers; generating a plurality of RT reaction products corresponding to the plurality of RT primers based on the performed reverse transcription, wherein each RT reaction product of the plurality of RT reaction products comprises a cDNA with a respective sample-specific barcode, the cDNA of each RT reaction product corresponding to a respective sample of the plurality of samples; combining a portion of each RT reaction product of the plurality of RT reaction products in a single container to form a combined RT reaction product; performing polymerase chain reaction (PCR) based on the combined RT reaction product; generating a plurality sets of amplified cDNAs based on the performed PCR, the plurality sets corresponding to the plurality of RT reaction products, each amplified cDNA of the plurality sets of amplified cDNAs comprising the sample-specific barcode and a pool-specific barcode, the pool-specific barcode corresponding to the combined RT reaction product; obtaining a plurality sets of sequencing reads based on the plurality sets of amplified cDNAs, the plurality sets of sequencing reads corresponding to the plurality sets of amplified cDNAs; quantifying the plurality sets of sequencing reads; and determine a diagnostic outcome of each sample of the plurality of samples based on the quantified plurality of sequencing reads.

Example 2: The method, apparatus, and non-transitory computer readable medium according to Example 1, wherein each sample of the plurality of samples comprises an extracted RNA.

Example 3: The method, apparatus, and non-transitory computer readable medium according to any of Example 1 or 2, wherein an RT primer of the plurality of RT primers is selected from Table 1, Table 2, or Table 3.

Example 4: The method, apparatus, and non-transitory computer readable medium according to any of Examples 1-3, wherein an RT primer of the plurality of RT primers hybridizes with a positive control RNA.

Example 5: The method, apparatus, and non-transitory computer readable medium according to any of Examples 1-4, further comprising: purifying the combined RT reaction product, wherein the performing polymerase chain reaction (PCR) is based on the purified combined RT reaction product.

Example 6: The method, apparatus, and non-transitory computer readable medium according to any of Examples 1-5, wherein the purifying the combined RT reaction product comprises: removing an unused RT primer in the combined RT reaction product.

Example 7: The method, apparatus, and non-transitory computer readable medium according to any of Examples 1-6, wherein a plurality of different sets of amplified cDNAs with a different pool-specific barcode are generated, and wherein each amplified cDNA of the plurality of different sets of amplified cDNAs comprises a different sample-specific barcode and the different pool-specific barcode.

Example 8: The method, apparatus, and non-transitory computer readable medium according to any of Examples 1-7, wherein at least one different sample-specific barcode with the different pool-specific barcode reuses a sample-specific barcode of a RT reaction product of the plurality of RT reaction products.

Example 9: The method, apparatus, and non-transitory computer readable medium according to any of Examples 1-8, further comprising: preparing a first sequencing library from the plurality sets of amplified cDNAs; preparing a second sequencing library from the plurality of different sets of amplified cDNAs; generating a pooled sequencing library by pooling the first sequencing library and the second sequencing library; and obtaining, from a sequencer, a plurality of sequencing reads based on the pooled sequencing library, the plurality of sequencing reads including the sequencing read corresponding based on the first sequencing library and a different sequencing read corresponding to the second sequencing library.

Example 10: The method, apparatus, and non-transitory computer readable medium according to any of Examples 1-9, wherein a Hamming distance between a first sample-specific barcode of a first RT reaction product of the plurality of RT reaction products and a second sample-specific barcode of a second RT reaction product of the plurality of RT reaction products is greater than a predetermined distance.

Example 11: The method, apparatus, and non-transitory computer readable medium according to any of Examples 1-9, wherein the predetermined distance is 2.

Example 12: The method, apparatus, and non-transitory computer readable medium according to any of Examples 1-11, wherein a set of the plurality sets of sequencing reads corresponding to a sample of the plurality of samples comprise a plurality subsets of sequencing reads mapped to a plurality of predetermined genes.

Example 13: The method, apparatus, and non-transitory computer readable medium according to any of Examples 1-12, wherein the plurality subsets of sequencing reads comprise N1 mapped reads and RP mapped reads.

Example 14: The method, apparatus, and non-transitory computer readable medium according to any of Examples 1-13, wherein the diagnostic outcome of each sample of the plurality of samples is based on a N1 score of a respective set of the plurality sets of sequencing reads divided by an RP score of the respective set of the plurality sets of sequencing reads,
wherein the N1 score=(N1−N1 min)/(N1 max−N1 min),
wherein the RP score=(RP−RP min)/(RP max−RP min),
where N1 is a number of the N1 mapped reads, RP is a number of the RP mapped reads, N1 min is a minimum number of the N1 mapped reads specific to a RT primer of the plurality of RT primer corresponding to the respective set of the plurality sets of sequencing reads, N1 max is a maximum number of the N1 mapped reads specific to the RT primer, RP min is a minimum number of the RP mapped reads specific to the RT primer, RP max is a maximum number of the RP mapped reads specific to the RT primer.

Example 15: The method, apparatus, and non-transitory computer readable medium according to any of Examples 1-14, wherein the diagnostic outcome of each sample of the plurality of samples indicates that a viral RNA is present in a respective sample of the plurality of samples when the N1 score of the respective set of the plurality sets of sequencing reads divided by the RP score of the respective set of the plurality sets of sequencing reads is equal to or more than 1.

Example 16: The method, apparatus, and non-transitory computer readable medium according to any of Examples 1-15, wherein in each amplified cDNA of the plurality sets of amplified cDNAs, a primer binding site is disposed between the sample-specific barcode and the pool-specific barcode.

Example 17: A method, apparatus, and non-transitory computer readable medium for barcode sequence design, comprising: determining a sample-specific barcode sequence, the sample-specific barcode sequence comprising random nucleotides; identifying non-existence of the sample-specific barcode sequence in a barcode database; in response to the non-existence of the sample-specific barcode sequence in the barcode database, appending the sample-specific barcode sequence to a surrounding DNA sequence; adding the sample-specific barcode sequence and one or more similar barcode sequences in the barcode database, each similar barcode sequence of the one or more similar barcode sequences having a predetermined distance or a shorter distance than the predetermined distance from the sample-specific barcode sequence; and preparing a reverse transcription (RT) primer with the sample-specific barcode sequence.

Example 18: The method, apparatus, and non-transitory computer readable medium according to Example 17, further comprising: identifying existence of one or more L nucleotides in the sample-specific barcode sequence; in response to non-existence of the one or more L nucleotides in the sample-specific barcode, updating the sample-specific barcode sequence by adding a random nucleotide to the sample-specific barcode sequence, wherein the appending the sample-specific barcode sequence to the surrounding DNA sequence is further in response to the existence of one or more L nucleotides in the sample-specific barcode.

Example 19: The method, apparatus, and non-transitory computer readable medium according to any of Example 17 or 18, further comprising: identifying the appended sample-specific barcode sequence with the surrounding DNA sequence having more than a predetermined energy level, wherein the adding the sample-specific barcode sequence and one or more barcode sequences in the barcode database is in response to the appended sample-specific barcode sequence with the surrounding DNA sequence having more than a predetermined energy level.

Example 20: The method, apparatus, and non-transitory computer readable medium according to any of Examples 17-19, wherein the predetermined energy level is −2 kcal/mol.

Example 21: The method, apparatus, and non-transitory computer readable medium according to any of Examples 17-20, further comprising:
determining a different sample-specific barcode sequence for the RT primer; and
appending the different sample-specific barcode sequence to the RT primer to eliminate carryover contamination.

Example 22: A apparatus for multiple sample parallel detection, the apparatus comprising: a computer system comprising at least one processor and instructions executable by the at least one processor for preparing a plurality of reverse transcription (RT) primers corresponding to the plurality of samples, wherein each RT primer of the plurality of RT primers comprises a sample-specific barcode; a reaction machine for generating a plurality of RT reaction products corresponding to the plurality of RT primers based on the performed reverse transcription, wherein each RT reaction product of the plurality of RT reaction products comprises a cDNA with a respective sample-specific barcode, the cDNA of each RT reaction product corresponding to a respective sample of the plurality of samples; chamber for combining a portion of each RT reaction product of the plurality of RT reaction products in a single container to form a combined RT reaction product; polymerase chain reaction (PCR) machine based on the combined RT reaction product to generate a plurality sets of amplified cDNAs based on the performed PCR, the plurality sets corresponding to the plurality of RT reaction products, each amplified cDNA of the plurality sets of amplified cDNAs comprising the sample-specific barcode and a pool-specific barcode, the pool-specific barcode corresponding to the combined RT reaction product; a next generation sequencer for sequencing reads based on the plurality sets of amplified cDNAs, the plurality sets of sequencing reads corresponding to the plurality sets of amplified cDNAs; a computer system comprising at least one processor and instructions executable by the at least one processor for determine a diagnostic outcome of each sample of the plurality of samples based on the quantified plurality of sequencing reads.

Example 23: A method, apparatus, and non-transitory computer readable medium for parallel detection of a SARS-CoV-2 virus in a set of multiple samples, the method comprising: a) providing samples comprising RNA; b) preparing a reverse transcription (RT) reaction mixture for each sample comprising: a portion of the sample, at least one RT primer comprising a sample-specific barcode, dNTPs, and a reverse transcriptase enzyme; c) performing reverse transcription using the RT reaction mixtures to generate a RT reaction product comprising cDNA with a sample-specific barcode; d) combining a portion of each RT reaction product of step (c) in a single container to form a combined RT reaction product; e) purifying nucleic acid molecules from the combined RT reaction product of step (d); f) preparing a polymerase chain reaction (PCR) reaction mixture comprising the purified nucleic acid molecules of step (e), dNTPs, a PCR primer mix comprising a pool-specific barcode, and a DNA polymerase; g) performing PCR using the PCR reaction mixture to generate amplified cDNA comprising both a sample-specific barcode and a pool-specific barcode; h) preparing a sequencing library from the amplified cDNA of step (g); i) repeating steps (a)-(h) using a different set of multiple samples to generate at least one additional sequencing library; j) pooling at least two sequencing libraries generated in steps (h) and (i); k) sequencing the pooled sequencing libraries to generate sequencing reads; l) demultiplexing the sequencing reads to assign them to a particular sample using the sample-specific barcodes and the pool-specific barcodes; m) quantifying the sequencing reads that map to the genome of the RNA virus in each sample to determine whether viral RNA was present in each of the samples.

Example 24. The method, apparatus, and non-transitory computer readable medium according to Example 23, wherein the samples are from human subjects.

Example 25. The method, apparatus, and non-transitory computer readable medium according to any of Example 23 or 24, wherein the samples were produced by extracting RNA from nasal swabs, oral swabs, or saliva.

Example 26. The method, apparatus, and non-transitory computer readable medium according to any of Examples 23-25, wherein the at least one RT primer used in step (b) is selected from Table 1 or Table 2.

Example 27. The method, apparatus, and non-transitory computer readable medium according to any of Examples 23-26, wherein at least two RT primers are used in step (b).

Example 28. The method, apparatus, and non-transitory computer readable medium according to any of Examples 23-27, wherein at least one RT primer hybridizes with a positive control RNA.

Example 29. The method, apparatus, and non-transitory computer readable medium according to any of Examples 23-28, wherein at least one RT primer used in step (b) is selected from Table 3.

Example 30. The method, apparatus, and non-transitory computer readable medium according to any of Examples 23-29, wherein the RT reaction mixtures are prepared in a 96-well plate or a 384-well plate in step (b).

Example 31. The method, apparatus, and non-transitory computer readable medium according to any of Examples 23-30, wherein the RT reaction mixtures of step (b) further comprises at least one of the following: DTT, an RNase inhibitor, and one or more DNA spike-in controls.

Example 32. The method, apparatus, and non-transitory computer readable medium according to any of Examples 23-31, wherein step (c) is performed by incubating the RT reaction mixtures for at least 20 minutes at 42° C.

Example 33. The method, apparatus, and non-transitory computer readable medium according to any of Examples 23-32, wherein step (e) comprises subjecting the combined RT reaction product of step (d) to both DNA purification and digestion with Exonuclease I.

Example 34. The method, apparatus, and non-transitory computer readable medium according to any of Examples 23-33, wherein the PCR primer mix used in step (f) comprises one reverse primer and at least one forward primer and selected from Table 5.

Example 35. The method, apparatus, and non-transitory computer readable medium according to any of Examples 23-34, wherein at least one of the primers used in the PCR primer mix in step (f) comprises a sequencing adapter sequence.

Example 36. The method, apparatus, and non-transitory computer readable medium according to any of Examples 23-35, wherein the PCR reaction mixture of step (f) further comprises RNase H.

Example 37. The method, apparatus, and non-transitory computer readable medium according to any of Examples 23-36, wherein step (g) is performed using a single PCR thermocycler.

Example 38. A system for performing the method of Example 23 in an automated fashion, the system comprising at least one robotic liquid handler, a PCR thermocycler, and a next generation sequencer.

Example 39. The system of Example 38, wherein the system can be used to perform more than 1900 tests in a single day.

Example 40. The system of any of Example 38 or 39, wherein the system comprises at least five robotic liquid handlers.

Example 41. The system of any of Examples 38-40, wherein the system can be used to perform more than 19,000 tests in a single day.

Example 42. The system of any of Examples 38-41, wherein the system comprises at least forty robotic liquid handlers.

Example 43. The system of any of Examples 38-42, wherein the system can be used to perform more than 147,000 tests in a single day.

Primer sequences:

TABLE 1

RT primers for SARS-CoV-2 N1 amplicon.

| Well | Name | Sequence | SEQ ID NO: |
|---|---|---|---|
| A1 | N1_v3_5_001 | GGTTAATTCTGATGAGCGTACCATGTACCCTTCTTGTGCGTTCTCCATTCTGGTTACT | 1 |
| A2 | N1_v3_5_002 | GGTTAATTCTGATGAGCGTACCACACTTGAGGGTTTAGCGTTCTCCATTCTGGTTACT | 2 |
| A3 | N1_v3_5_003 | GGTTAATTCTGATGAGCGTACCCTAAGATGAGGTCTAGCGTTCTCCATTCTGGTTACT | 3 |
| A4 | N1_v3_5_004 | GGTTAATTCTGATGAGCGTACCCCTAGATAGTGCGTAGCGTTCTCCATTCTGGTTACT | 4 |
| A5 | N1_v3_5_005 | GGTTAATTCTGATGAGCGTACCCCCTGATTATAGTTAGCGTTCTCCATTCTGGTTACT | 5 |

TABLE 1-continued

RT primers for SARS-CoV-2 N1 amplicon.

| Well | Name | Sequence | SEQ ID NO: |
|---|---|---|---|
| A6 | N1_v3_5_006 | GGTTAATTCTGATGAGCGTACCTTAATTCCTACACTGGCGTTCTCCATTCTGGTTACT | 6 |
| A7 | N1_v3_5_007 | GGTTAATTCTGATGAGCGTACCCCTGTAAGAGTGTTAGCGTTCTCCATTCTGGTTACT | 7 |
| A8 | N1_v3_5_008 | GGTTAATTCTGATGAGCGTACCCCTTCACTTTGCGTAGCGTTCTCCATTCTGGTTACT | 8 |
| A9 | N1_v3_5_009 | GGTTAATTCTGATGAGCGTACCCTATGTGTGCGTGTAGCGTTCTCCATTCTGGTTACT | 9 |
| A10 | N1_v3_5_010 | GGTTAATTCTGATGAGCGTACCCTAACTTATGTGATAGCGTTCTCCATTCTGGTTACT | 10 |
| A11 | N1_v3_5_011 | GGTTAATTCTGATGAGCGTACCCCTGTTTATTCGTTAGCGTTCTCCATTCTGGTTACT | 11 |
| A12 | N1_v3_5_012 | GGTTAATTCTGATGAGCGTACCCTATTCGTTAGTATAGCGTTCTCCATTCTGGTTACT | 12 |
| B1 | N1_v3_5_013 | GGTTAATTCTGATGAGCGTACCCTAATATGTATCGTAGCGTTCTCCATTCTGGTTACT | 13 |
| B2 | N1_v3_5_014 | GGTTAATTCTGATGAGCGTACCCCACTAGCGTATTTAGCGTTCTCCATTCTGGTTACT | 14 |
| B3 | N1_v3_5_015 | GGTTAATTCTGATGAGCGTACCTTTATGTCGTGATCTGCGTTCTCCATTCTGGTTACT | 15 |
| B4 | N1_v3_5_016 | GGTTAATTCTGATGAGCGTACCTACTGAGAGGATAGTGCGTTCTCCATTCTGGTTACT | 16 |
| B5 | N1_v3_5_017 | GGTTAATTCTGATGAGCGTACCCCCTGCGTAATCTTAGCGTTCTCCATTCTGGTTACT | 17 |
| B6 | N1_v3_5_018 | GGTTAATTCTGATGAGCGTACCTTGATAGTTCACATAGCGTTCTCCATTCTGGTTACT | 18 |
| B7 | N1_v3_5_019 | GGTTAATTCTGATGAGCGTACCCCACCCTTATTTGTAGCGTTCTCCATTCTGGTTACT | 19 |
| B8 | N1_v3_5_020 | GGTTAATTCTGATGAGCGTACCCCTTATGTGTATGTAGCGTTCTCCATTCTGGTTACT | 20 |
| B9 | N1_v3_5_021 | GGTTAATTCTGATGAGCGTACCCTACTTGAAATCGTAGCGTTCTCCATTCTGGTTACT | 21 |
| B10 | N1_v3_5_022 | GGTTAATTCTGATGAGCGTACCCCAACATTTCTTATAGCGTTCTCCATTCTGGTTACT | 22 |
| B11 | N1_v3_5_023 | GGTTAATTCTGATGAGCGTACCCCATATAGATACTGAGCGTTCTCCATTCTGGTTACT | 23 |
| B12 | N1_v3_5_024 | GGTTAATTCTGATGAGCGTACCCCTAGTGTGTTATGAGCGTTCTCCATTCTGGTTACT | 24 |
| C1 | N1_v3_5_025 | GGTTAATTCTGATGAGCGTACCCTATTTGTCCTATGAGCGTTCTCCATTCTGGTTACT | 25 |
| C2 | N1_v3_5_026 | GGTTAATTCTGATGAGCGTACCCTATTGTATGTATGAGCGTTCTCCATTCTGGTTACT | 26 |
| C3 | N1_v3_5_027 | GGTTAATTCTGATGAGCGTACCCCATACTCCCTATGAGCGTTCTCCATTCTGGTTACT | 27 |
| C4 | N1_v3_5_028 | GGTTAATTCTGATGAGCGTACCCTAAACTTATGATGAGCGTTCTCCATTCTGGTTACT | 28 |
| C5 | N1_v3_5_029 | GGTTAATTCTGATGAGCGTACCCCCTAAATTGTATGAGCGTTCTCCATTCTGGTTACT | 29 |
| C6 | N1_v3_5_030 | GGTTAATTCTGATGAGCGTACCCGTAATTTGTGTATAGCGTTCTCCATTCTGGTTACT | 30 |
| C7 | N1_v3_5_031 | GGTTAATTCTGATGAGCGTACCATATCAATTACAAGGGCGTTCTCCATTCTGGTTACT | 31 |
| C8 | N1_v3_5_032 | GGTTAATTCTGATGAGCGTACCTGTGCGAAAGATATTGCGTTCTCCATTCTGGTTACT | 32 |
| C9 | N1_v3_5_033 | GGTTAATTCTGATGAGCGTACCCGTAGTGAGGATTAGCGTTCTCCATTCTGGTTACT | 33 |
| C10 | N1_v3_5_034 | GGTTAATTCTGATGAGCGTACCCCCGTGTTCCTATGAGCGTTCTCCATTCTGGTTACT | 34 |
| C11 | N1_v3_5_035 | GGTTAATTCTGATGAGCGTACCCGTGTGCGTAGGATAGCGTTCTCCATTCTGGTTACT | 35 |
| C12 | N1_v3_5_036 | GGTTAATTCTGATGAGCGTACCCGTGTAGTTATATGAGCGTTCTCCATTCTGGTTACT | 36 |
| D1 | N1_v3_5_037 | GGTTAATTCTGATGAGCGTACCTTCAATCTTATTCGGGCGTTCTCCATTCTGGTTACT | 37 |
| D2 | N1_v3_5_038 | GGTTAATTCTGATGAGCGTACCCGTAGATACTTGATAGCGTTCTCCATTCTGGTTACT | 38 |
| D3 | N1_v3_5_039 | GGTTAATTCTGATGAGCGTACCACATTTGATATATGAGCGTTCTCCATTCTGGTTACT | 39 |
| D4 | N1_v3_5_040 | GGTTAATTCTGATGAGCGTACCGTAGGGATCTTGTTAGCGTTCTCCATTCTGGTTACT | 40 |
| D5 | N1_v3_5_041 | GGTTAATTCTGATGAGCGTACCCGTGATGTATAGTTAGCGTTCTCCATTCTGGTTACT | 41 |
| D6 | N1_v3_5_042 | GGTTAATTCTGATGAGCGTACCCTATCGTTTCCTGTAGCGTTCTCCATTCTGGTTACT | 42 |
| D7 | N1_v3_5_043 | GGTTAATTCTGATGAGCGTACCCTAGTATATCTACAAGCGTTCTCCATTCTGGTTACT | 43 |

TABLE 1-continued

RT primers for SARS-CoV-2 N1 amplicon.

| Well | Name | Sequence | SEQ ID NO: |
|---|---|---|---|
| D8 | N1_v3_5_044 | GGTTAATTCTGATGAGCGTACCCCACCCTATTTACAAGCGTTCTCCATTCTGGTTACT | 44 |
| D9 | N1_v3_5_045 | GGTTAATTCTGATGAGCGTACCCCTATCGTCCTACAAGCGTTCTCCATTCTGGTTACT | 45 |
| D10 | N1_v3_5_046 | GGTTAATTCTGATGAGCGTACCCCCTGCGTACAACAAGCGTTCTCCATTCTGGTTACT | 46 |
| D11 | N1_v3_5_047 | GGTTAATTCTGATGAGCGTACCTTAGGACCCATACTAGCGTTCTCCATTCTGGTTACT | 47 |
| D12 | N1_v3_5_048 | GGTTAATTCTGATGAGCGTACCCCCGTTATGTCCCAAGCGTTCTCCATTCTGGTTACT | 48 |
| E1 | N1_v3_5_049 | GGTTAATTCTGATGAGCGTACCCCCGTTAGCGTACAAGCGTTCTCCATTCTGGTTACT | 49 |
| E2 | N1_v3_5_050 | GGTTAATTCTGATGAGCGTACCGTATTAGGACACTGAGCGTTCTCCATTCTGGTTACT | 50 |
| E3 | N1_v3_5_051 | GGTTAATTCTGATGAGCGTACCTTAGGACTGAGGGTTGCGTTCTCCATTCTGGTTACT | 51 |
| E4 | N1_v3_5_052 | GGTTAATTCTGATGAGCGTACCCGTGATTCCCTGATAGCGTTCTCCATTCTGGTTACT | 52 |
| E5 | N1_v3_5_053 | GGTTAATTCTGATGAGCGTACCGTTTCCTGACACTAAGCGTTCTCCATTCTGGTTACT | 53 |
| E6 | N1_v3_5_054 | GGTTAATTCTGATGAGCGTACCCCTGTTGTATGAATAGCGTTCTCCATTCTGGTTACT | 54 |
| E7 | N1_v3_5_055 | GGTTAATTCTGATGAGCGTACCCGTAAGTAGGACTAAGCGTTCTCCATTCTGGTTACT | 55 |
| E8 | N1_v3_5_056 | GGTTAATTCTGATGAGCGTACCCTATCCAACTATCTGGCGTTCTCCATTCTGGTTACT | 56 |
| E9 | N1_v3_5_057 | GGTTAATTCTGATGAGCGTACCCCTGTATTGCGTCTGGCGTTCTCCATTCTGGTTACT | 57 |
| E10 | N1_v3_5_058 | GGTTAATTCTGATGAGCGTACCCTAACTAAAGGTCTGGCGTTCTCCATTCTGGTTACT | 58 |
| E11 | N1_v3_5_059 | GGTTAATTCTGATGAGCGTACCATATTAAAGTAGAGTGCGTTCTCCATTCTGGTTACT | 59 |
| E12 | N1_v3_5_060 | GGTTAATTCTGATGAGCGTACCCCCTTCTAGCGTATAGCGTTCTCCATTCTGGTTACT | 60 |
| F1 | N1_v3_5_061 | GGTTAATTCTGATGAGCGTACCCCCGTTGAAAGATGAGCGTTCTCCATTCTGGTTACT | 61 |
| F2 | N1_v3_5_062 | GGTTAATTCTGATGAGCGTACCCTAAGTTAAATACAAGCGTTCTCCATTCTGGTTACT | 62 |
| F3 | N1_v3_5_063 | GGTTAATTCTGATGAGCGTACCCCCTGATCCAACTAAGCGTTCTCCATTCTGGTTACT | 63 |
| F4 | N1_v3_5_064 | GGTTAATTCTGATGAGCGTACCCCTGTGCGAATAGTAGCGTTCTCCATTCTGGTTACT | 64 |
| F5 | N1_v3_5_065 | GGTTAATTCTGATGAGCGTACCCGTGATAAGAGGATAGCGTTCTCCATTCTGGTTACT | 65 |
| F6 | N1_v3_5_066 | GGTTAATTCTGATGAGCGTACCCCTATATGTTTCAAAGCGTTCTCCATTCTGGTTACT | 66 |
| F7 | N1_v3_5_067 | GGTTAATTCTGATGAGCGTACCCTTGCGGACTGTAAAGCGTTCTCCATTCTGGTTACT | 67 |
| F8 | N1_v3_5_068 | GGTTAATTCTGATGAGCGTACCCCCTGAGTATGTAAAGCGTTCTCCATTCTGGTTACT | 68 |
| F9 | N1_v3_5_069 | GGTTAATTCTGATGAGCGTACCCCTAAGATGTTCAAAGCGTTCTCCATTCTGGTTACT | 69 |
| F10 | N1_v3_5_070 | GGTTAATTCTGATGAGCGTACCCTACTAAGCGATAAAGCGTTCTCCATTCTGGTTACT | 70 |
| F11 | N1_v3_5_071 | GGTTAATTCTGATGAGCGTACCCCCTAGAGTTCACAAAGCGTTCTCCATTCTGGTTACT | 71 |
| F12 | N1_v3_5_072 | GGTTAATTCTGATGAGCGTACCATATCGTAAGGTTGTGCGTTCTCCATTCTGGTTACT | 72 |
| G1 | N1_v3_5_073 | GGTTAATTCTGATGAGCGTACCTTCACTATTGATCCTGCGTTCTCCATTCTGGTTACT | 73 |
| G2 | N1_v3_5_074 | GGTTAATTCTGATGAGCGTACCGTATGTATAGATCGTGCGTTCTCCATTCTGGTTACT | 74 |
| G3 | N1_v3_5_075 | GGTTAATTCTGATGAGCGTACCCTAACTATGCTACTGGCGTTCTCCATTCTGGTTACT | 75 |
| G4 | N1_v3_5_076 | GGTTAATTCTGATGAGCGTACCGTAAACTTGCTAAATGCGTTCTCCATTCTGGTTACT | 76 |
| G5 | N1_v3_5_077 | GGTTAATTCTGATGAGCGTACCCCTGTGATGCTAAATGCGTTCTCCATTCTGGTTACT | 77 |
| G6 | N1_v3_5_078 | GGTTAATTCTGATGAGCGTACCTTCTATGAATAGTATGCGTTCTCCATTCTGGTTACT | 78 |
| G7 | N1_v3_5_079 | GGTTAATTCTGATGAGCGTACCCACCCATCCCAACTAGCGTTCTCCATTCTGGTTACT | 79 |
| G8 | N1_v3_5_080 | GGTTAATTCTGATGAGCGTACCTGCGATTTGAAACTGGCGTTCTCCATTCTGGTTACT | 80 |

TABLE 1-continued

RT primers for SARS-CoV-2 N1 amplicon.

| Well | Name | Sequence | SEQ ID NO: |
|---|---|---|---|
| G9 | N1_v3_5_081 | GGTTAATTCTGATGAGCGTACCCACCCTACAATCAAAGCGTTCTCCATTCTGGTTACT | 81 |
| G10 | N1_v3_5_082 | GGTTAATTCTGATGAGCGTACCCCCAACTAGATCAAAGCGTTCTCCATTCTGGTTACT | 82 |
| G11 | N1_v3_5_083 | GGTTAATTCTGATGAGCGTACCCCCTTCATAAATCTGGCGTTCTCCATTCTGGTTACT | 83 |
| G12 | N1_v3_5_084 | GGTTAATTCTGATGAGCGTACCTGTTGTAGTGAAATAGCGTTCTCCATTCTGGTTACT | 84 |
| H1 | N1_v3_5_085 | GGTTAATTCTGATGAGCGTACCACATACCACTAACAAGCGTTCTCCATTCTGGTTACT | 85 |
| H2 | N1_v3_5_086 | GGTTAATTCTGATGAGCGTACCTATCGGGATCTTCTAGCGTTCTCCATTCTGGTTACT | 86 |
| H3 | N1_v3_5_087 | GGTTAATTCTGATGAGCGTACCACATACCAACTTTAAGCGTTCTCCATTCTGGTTACT | 87 |
| H4 | N1_v3_5_088 | GGTTAATTCTGATGAGCGTACCTGTCGTGATTTGATAGCGTTCTCCATTCTGGTTACT | 88 |
| H5 | N1_v3_5_089 | GGTTAATTCTGATGAGCGTACCGTGACCTTCTACTAGGCGTTCTCCATTCTGGTTACT | 89 |
| H6 | N1_v3_5_090 | GGTTAATTCTGATGAGCGTACCCATTAAGTAGGATTAGCGTTCTCCATTCTGGTTACT | 90 |
| H7 | N1_v3_5_091 | GGTTAATTCTGATGAGCGTACCTTTAGCGTGTACTTAGCGTTCTCCATTCTGGTTACT | 91 |
| H8 | N1_v3_5_092 | GGTTAATTCTGATGAGCGTACCTGCGATTCCCTTTGAGCGTTCTCCATTCTGGTTACT | 92 |
| H9 | N1_v3_5_093 | GGTTAATTCTGATGAGCGTACCTACTAGGATTATCTGGCGTTCTCCATTCTGGTTACT | 93 |
| H10 | N1_v3_5_094 | GGTTAATTCTGATGAGCGTACCTTTATAGTGCGTGTAGCGTTCTCCATTCTGGTTACT | 94 |
| H11 | N1_v3_5_095 | GGTTAATTCTGATGAGCGTACCTTCCCTCCCACTTTAGCGTTCTCCATTCTGGTTACT | 95 |
| H12 | N1_v3_5_096 | GGTTAATTCTGATGAGCGTACCTTCTAACTCGGGATAGCGTTCTCCATTCTGGTTACT | 96 |

TABLE 2

RT primers for SARS-CoV-2 N2 amplicon.

| Well | Name | Sequence | SEQ ID NO: |
|---|---|---|---|
| A1 | N2_v03_001 | GGTTAATTCTGATGAGCGTACCCCACTATTTCACTTATGACTTCCATGCCAATGCG | 97 |
| A2 | N2_v03_002 | GGTTAATTCTGATGAGCGTACCCCACAATACAACTGATGACTTCCATGCCAATGCG | 98 |
| A3 | N2_v03_003 | GGTTAATTCTGATGAGCGTACCCTAAGATGAGGTCTATGACTTCCATGCCAATGCG | 99 |
| A4 | N2_v03_004 | GGTTAATTCTGATGAGCGTACCCCTAGATAGTGCGTATGACTTCCATGCCAATGCG | 100 |
| A5 | N2_v03_005 | GGTTAATTCTGATGAGCGTACCCCCTGATTATAGTTATGACTTCCATGCCAATGCG | 101 |
| A6 | N2_v03_006 | GGTTAATTCTGATGAGCGTACCCCATAACTAATCGTATGACTTCCATGCCAATGCG | 102 |
| A7 | N2_v03_007 | GGTTAATTCTGATGAGCGTACCCCTGTAAGAGTGTTATGACTTCCATGCCAATGCG | 103 |
| A8 | N2_v03_008 | GGTTAATTCTGATGAGCGTACCCCTTCACTTTGCGTATGACTTCCATGCCAATGCG | 104 |
| A9 | N2_v03_009 | GGTTAATTCTGATGAGCGTACCCTATGTGTGCGTATGACTTCCATGCCAATGCG | 105 |
| A10 | N2_v03_010 | GGTTAATTCTGATGAGCGTACCCTAACTTATGTGTATATGACTTCCATGCCAATGCG | 106 |
| A11 | N2_v03_011 | GGTTAATTCTGATGAGCGTACCCCTGTTTATTCGTTATGACTTCCATGCCAATGCG | 107 |
| A12 | N2_v03_012 | GGTTAATTCTGATGAGCGTACCCTATTCGTTAGTATATGACTTCCATGCCAATGCG | 108 |
| B1 | N2_v03_013 | GGTTAATTCTGATGAGCGTACCCTAATATGTATCGTATGACTTCCATGCCAATGCG | 109 |
| B2 | N2_v03_014 | GGTTAATTCTGATGAGCGTACCCCACTAGCGTATTTATGACTTCCATGCCAATGCG | 110 |
| B3 | N2_v03_015 | GGTTAATTCTGATGAGCGTACCCCCAACTTACACTGATGACTTCCATGCCAATGCG | 111 |
| B4 | N2_v03_016 | GGTTAATTCTGATGAGCGTACCCTAAACTCCCAACTATGACTTCCATGCCAATGCG | 112 |
| B5 | N2_v03_017 | GGTTAATTCTGATGAGCGTACCCCCTGCGTAATCTTATGACTTCCATGCCAATGCG | 113 |

TABLE 2-continued

RT primers for SARS-CoV-2 N2 amplicon.

| Well | Name | Sequence | SEQ ID NO: |
|---|---|---|---|
| B6 | N2_v03_018 | GGTTAATTCTGATGAGCGTACCCCTGCGTCCCTTGTATGACTTCCATGCCAATGCG | 114 |
| B7 | N2_v03_019 | GGTTAATTCTGATGAGCGTACCCCACCCTTATTTGTATGACTTCCATGCCAATGCG | 115 |
| B8 | N2_v03_020 | GGTTAATTCTGATGAGCGTACCCCTTATGTGTATGTATGACTTCCATGCCAATGCG | 116 |
| B9 | N2_v03_021 | GGTTAATTCTGATGAGCGTACCCTACTTGAAATCGTATGACTTCCATGCCAATGCG | 117 |
| B10 | N2_v03_022 | GGTTAATTCTGATGAGCGTACCCCAACATTTCTTATATGACTTCCATGCCAATGCG | 118 |
| B11 | N2_v03_023 | GGTTAATTCTGATGAGCGTACCCCATATAGATACTGATGACTTCCATGCCAATGCG | 119 |
| B12 | N2_v03_024 | GGTTAATTCTGATGAGCGTACCCCTAGTGTGTTATGATGACTTCCATGCCAATGCG | 120 |
| C1 | N2_v03_025 | GGTTAATTCTGATGAGCGTACCCTATTTGTCCTATGATGACTTCCATGCCAATGCG | 121 |
| C2 | N2_v03_026 | GGTTAATTCTGATGAGCGTACCCTATTGTATGTATGATGACTTCCATGCCAATGCG | 122 |
| C3 | N2_v03_027 | GGTTAATTCTGATGAGCGTACCCCATACTCCCTATGATGACTTCCATGCCAATGCG | 123 |
| C4 | N2_v03_028 | GGTTAATTCTGATGAGCGTACCCTAAACTTATGATGATGACTTCCATGCCAATGCG | 124 |
| C5 | N2_v03_029 | GGTTAATTCTGATGAGCGTACCCCCTAAATTGTATGATGACTTCCATGCCAATGCG | 125 |
| C6 | N2_v03_030 | GGTTAATTCTGATGAGCGTACCCGTAATTTGTGTATATGACTTCCATGCCAATGCG | 126 |
| C7 | N2_v03_031 | GGTTAATTCTGATGAGCGTACCCCCGTATGATGTTTATGACTTCCATGCCAATGCG | 127 |
| C8 | N2_v03_032 | GGTTAATTCTGATGAGCGTACCCGTGAGTGTGTAGTATGACTTCCATGCCAATGCG | 128 |
| C9 | N2_v03_033 | GGTTAATTCTGATGAGCGTACCCGTAGTGAGGATTTATGACTTCCATGCCAATGCG | 129 |
| C10 | N2_v03_034 | GGTTAATTCTGATGAGCGTACCCCCGTGTTCCTATGATGACTTCCATGCCAATGCG | 130 |
| C11 | N2_v03_035 | GGTTAATTCTGATGAGCGTACCCGTGTGCGTAGGATATGACTTCCATGCCAATGCG | 131 |
| C12 | N2_v03_036 | GGTTAATTCTGATGAGCGTACCCGTGTAGTTATATGATGACTTCCATGCCAATGCG | 132 |
| D1 | N2_v03_037 | GGTTAATTCTGATGAGCGTACCCGTTATTAGATACTATGACTTCCATGCCAATGCG | 133 |
| D2 | N2_v03_038 | GGTTAATTCTGATGAGCGTACCCGTAGATACTTGATATGACTTCCATGCCAATGCG | 134 |
| D3 | N2_v03_039 | GGTTAATTCTGATGAGCGTACCCGTTAGTTCGTGTTATGACTTCCATGCCAATGCG | 135 |
| D4 | N2_v03_040 | GGTTAATTCTGATGAGCGTACCCGTGAAATCTTCTTATGACTTCCATGCCAATGCG | 136 |
| D5 | N2_v03_041 | GGTTAATTCTGATGAGCGTACCCGTGATGTATAGTTATGACTTCCATGCCAATGCG | 137 |
| D6 | N2_v03_042 | GGTTAATTCTGATGAGCGTACCCTATCGTTTCCTGTATGACTTCCATGCCAATGCG | 138 |
| D7 | N2_v03_043 | GGTTAATTCTGATGAGCGTACCCTAGTATATCTACAATGACTTCCATGCCAATGCG | 139 |
| D8 | N2_v03_044 | GGTTAATTCTGATGAGCGTACCCCACCCTATTTACAATGACTTCCATGCCAATGCG | 140 |
| D9 | N2_v03_045 | GGTTAATTCTGATGAGCGTACCCCTATCGTCCTACAATGACTTCCATGCCAATGCG | 141 |
| D10 | N2_v03_046 | GGTTAATTCTGATGAGCGTACCCCCTGCGTACAACAATGACTTCCATGCCAATGCG | 142 |
| D11 | N2_v03_047 | GGTTAATTCTGATGAGCGTACCCCCTATAAACTATAATGACTTCCATGCCAATGCG | 143 |
| D12 | N2_v03_048 | GGTTAATTCTGATGAGCGTACCCCCGTTATGTCCCAATGACTTCCATGCCAATGCG | 144 |
| E1 | N2_v03_049 | GGTTAATTCTGATGAGCGTACCCCCGTTAGCGTACAATGACTTCCATGCCAATGCG | 145 |
| E2 | N2_v03_050 | GGTTAATTCTGATGAGCGTACCGTATTAGGACACTGATGACTTCCATGCCAATGCG | 146 |
| E3 | N2_v03_051 | GGTTAATTCTGATGAGCGTACCCGTGACAACAACTAATGACTTCCATGCCAATGCG | 147 |
| E4 | N2_v03_052 | GGTTAATTCTGATGAGCGTACCCGTGATTCCCTGATATGACTTCCATGCCAATGCG | 148 |
| E5 | N2_v03_053 | GGTTAATTCTGATGAGCGTACCGTTTCCTGACACTAATGACTTCCATGCCAATGCG | 149 |
| E6 | N2_v03_054 | GGTTAATTCTGATGAGCGTACCCCTGTTGTATGAATATGACTTCCATGCCAATGCG | 150 |

TABLE 2-continued

RT primers for SARS-CoV-2 N2 amplicon.

| Well | Name | Sequence | SEQ ID NO: |
|------|------|----------|------------|
| E7  | N2_v03_055 | GGTTAATTCTGATGAGCGTACCCGTAAGTAGGACTAATGACTTCCATGCCAATGCG | 151 |
| E8  | N2_v03_056 | GGTTAATTCTGATGAGCGTACCCTATCCAACTATCTGTGACTTCCATGCCAATGCG | 152 |
| E9  | N2_v03_057 | GGTTAATTCTGATGAGCGTACCCTGTATTGCGTCTGTGACTTCCATGCCAATGCG | 153 |
| E10 | N2_v03_058 | GGTTAATTCTGATGAGCGTACCCTAACTAAAGGTCTGTGACTTCCATGCCAATGCG | 154 |
| E11 | N2_v03_059 | GGTTAATTCTGATGAGCGTACCCTACCTACTCTATATTGACTTCCATGCCAATGCG | 155 |
| E12 | N2_v03_060 | GGTTAATTCTGATGAGCGTACCCCCTTCTAGCGTATATGACTTCCATGCCAATGCG | 156 |
| F1  | N2_v03_061 | GGTTAATTCTGATGAGCGTACCCCCGTTGAAAGATGATGACTTCCATGCCAATGCG | 157 |
| F2  | N2_v03_062 | GGTTAATTCTGATGAGCGTACCCTAAGTTAAATACAATGACTTCCATGCCAATGCG | 158 |
| F3  | N2_v03_063 | GGTTAATTCTGATGAGCGTACCCCCTGATCCAACTAATGACTTCCATGCCAATGCG | 159 |
| F4  | N2_v03_064 | GGTTAATTCTGATGAGCGTACCCCTGTGCGAATAGTATGACTTCCATGCCAATGCG | 160 |
| F5  | N2_v03_065 | GGTTAATTCTGATGAGCGTACCCGTGATAAGAGGATATGACTTCCATGCCAATGCG | 161 |
| F6  | N2_v03_066 | GGTTAATTCTGATGAGCGTACCCCTATATGTTTCAAATGACTTCCATGCCAATGCG | 162 |
| F7  | N2_v03_067 | GGTTAATTCTGATGAGCGTACCCTTGCGGACTGTAAATGACTTCCATGCCAATGCG | 163 |
| F8  | N2_v03_068 | GGTTAATTCTGATGAGCGTACCCCCTGAGTATGTAAATGACTTCCATGCCAATGCG | 164 |
| F9  | N2_v03_069 | GGTTAATTCTGATGAGCGTACCCCTAAGATGTTCAAATGACTTCCATGCCAATGCG | 165 |
| F10 | N2_v03_070 | GGTTAATTCTGATGAGCGTACCCTACTAAGCGATAAATGACTTCCATGCCAATGCG | 166 |
| F11 | N2_v03_071 | GGTTAATTCTGATGAGCGTACCCCCTAGAGTTCACAAATGACTTCCATGCCAATGCG | 167 |
| F12 | N2_v03_072 | GGTTAATTCTGATGAGCGTACCCCTGTGCGATGTAAATGACTTCCATGCCAATGCG | 168 |
| G1  | N2_v03_073 | GGTTAATTCTGATGAGCGTACCCTAAAGATTCCCAAATGACTTCCATGCCAATGCG | 169 |
| G2  | N2_v03_074 | GGTTAATTCTGATGAGCGTACCCCCTTTCAAATACTGTGACTTCCATGCCAATGCG | 170 |
| G3  | N2_v03_075 | GGTTAATTCTGATGAGCGTACCCTAACTATGCTACTGTGACTTCCATGCCAATGCG | 171 |
| G4  | N2_v03_076 | GGTTAATTCTGATGAGCGTACCGTAAACTTGCTAAATTGACTTCCATGCCAATGCG | 172 |
| G5  | N2_v03_077 | GGTTAATTCTGATGAGCGTACCCCTGTGATGCTAAATTGACTTCCATGCCAATGCG | 173 |
| G6  | N2_v03_078 | GGTTAATTCTGATGAGCGTACCCCCATACTATCACTATGACTTCCATGCCAATGCG | 174 |
| G7  | N2_v03_079 | GGTTAATTCTGATGAGCGTACCCACCCATCCCAACTATGACTTCCATGCCAATGCG | 175 |
| G8  | N2_v03_080 | GGTTAATTCTGATGAGCGTACCCGTTGTAAAGTGTTATGACTTCCATGCCAATGCG | 176 |
| G9  | N2_v03_081 | GGTTAATTCTGATGAGCGTACCCACCCTACAATCAAATGACTTCCATGCCAATGCG | 177 |
| G10 | N2_v03_082 | GGTTAATTCTGATGAGCGTACCCCCAACTAGATCAAATGACTTCCATGCCAATGCG | 178 |
| G11 | N2_v03_083 | GGTTAATTCTGATGAGCGTACCCCCTTCATAAATCTGTGACTTCCATGCCAATGCG | 179 |
| G12 | N2_v03_084 | GGTTAATTCTGATGAGCGTACCTGTTGTAGTGAAATATGACTTCCATGCCAATGCG | 180 |
| H1  | N2_v03_085 | GGTTAATTCTGATGAGCGTACCTTGTTCGTTATGTTATGACTTCCATGCCAATGCG | 181 |
| H2  | N2_v03_086 | GGTTAATTCTGATGAGCGTACCTATCGGGATCTTCTATGACTTCCATGCCAATGCG | 182 |
| H3  | N2_v03_087 | GGTTAATTCTGATGAGCGTACCTGTTCGTAAATCGTATGACTTCCATGCCAATGCG | 183 |
| H4  | N2_v03_088 | GGTTAATTCTGATGAGCGTACCTGTCGTGATTTGATATGACTTCCATGCCAATGCG | 184 |
| H5  | N2_v03_089 | GGTTAATTCTGATGAGCGTACCTAGTGTGTTTCTTGATGACTTCCATGCCAATGCG | 185 |
| H6  | N2_v03_090 | GGTTAATTCTGATGAGCGTACCCATTAAGTAGGATTATGACTTCCATGCCAATGCG | 186 |
| H7  | N2_v03_091 | GGTTAATTCTGATGAGCGTACCTTTAGCGTGTACTTATGACTTCCATGCCAATGCG | 187 |
| H8  | N2_v03_092 | GGTTAATTCTGATGAGCGTACCTGCGATTCCCTTTGATGACTTCCATGCCAATGCG | 188 |

TABLE 2-continued

RT primers for SARS-CoV-2 N2 amplicon.

| Well | Name | Sequence | SEQ ID NO: |
|---|---|---|---|
| H9 | N2_v03_093 | GGTTAATTCTGATGAGCGTACCTGTTTAATCTTTCTATGACTTCCATGCCAATGCG | 189 |
| H10 | N2_v03_094 | GGTTAATTCTGATGAGCGTACCTTTATAGTGCGTGTATGACTTCCATGCCAATGCG | 190 |
| H11 | N2_v03_095 | GGTTAATTCTGATGAGCGTACCTTCCCTCCCACTTTATGACTTCCATGCCAATGCG | 191 |
| H12 | N2_v03_096 | GGTTAATTCTGATGAGCGTACCTTCTAACTCGGGATATGACTTCCATGCCAATGCG | 192 |

TABLE 3

RT primers for human RNaseP amplicon.

| Well | Name | Sequence | SEQ ID NO: |
|---|---|---|---|
| A1 | RP_v3_5_001 | GGTTAATTCTGATGAGCGTACCATGTACCCTTCTTGTTGAGCGGCTGTCTCCAC | 193 |
| A2 | RP_v3_5_002 | GGTTAATTCTGATGAGCGTACCACACTTGAGGGTTTATGAGCGGCTGTCTCCAC | 194 |
| A3 | RP_v3_5_003 | GGTTAATTCTGATGAGCGTACCCTAAGATGAGGTCTATGAGCGGCTGTCTCCAC | 195 |
| A4 | RP_v3_5_004 | GGTTAATTCTGATGAGCGTACCCCTAGATAGTGCGTATGAGCGGCTGTCTCCAC | 196 |
| A5 | RP_v3_5_005 | GGTTAATTCTGATGAGCGTACCCCCTGATTATAGTTATGAGCGGCTGTCTCCAC | 197 |
| A6 | RP_v3_5_006 | GGTTAATTCTGATGAGCGTACCTTAATTCCTACACTGTGAGCGGCTGTCTCCAC | 198 |
| A7 | RP_v3_5_007 | GGTTAATTCTGATGAGCGTACCCCTGTAAGAGTGTTATGAGCGGCTGTCTCCAC | 199 |
| A8 | RP_v3_5_008 | GGTTAATTCTGATGAGCGTACCCCTTCACTTTGCGTATGAGCGGCTGTCTCCAC | 200 |
| A9 | RP_v3_5_009 | GGTTAATTCTGATGAGCGTACCCTATGTGTGCGTGTATGAGCGGCTGTCTCCAC | 201 |
| A10 | RP_v3_5_010 | GGTTAATTCTGATGAGCGTACCCTAACTTATGTGATATGAGCGGCTGTCTCCAC | 202 |
| A11 | RP_v3_5_011 | GGTTAATTCTGATGAGCGTACCCCTGTTTATTCGTTATGAGCGGCTGTCTCCAC | 203 |
| A12 | RP_v3_5_012 | GGTTAATTCTGATGAGCGTACCCTATTCGTTAGTATATGAGCGGCTGTCTCCAC | 204 |
| B1 | RP_v3_5_013 | GGTTAATTCTGATGAGCGTACCCTAATATGTATCGTATGAGCGGCTGTCTCCAC | 205 |
| B2 | RP_v3_5_014 | GGTTAATTCTGATGAGCGTACCCCACTAGCGTATTTATGAGCGGCTGTCTCCAC | 206 |
| B3 | RP_v3_5_015 | GGTTAATTCTGATGAGCGTACCTTTATGTCGTGATCTTGAGCGGCTGTCTCCAC | 207 |
| B4 | RP_v3_5_016 | GGTTAATTCTGATGAGCGTACCTACTGAGAGGATAGTTGAGCGGCTGTCTCCAC | 208 |
| B5 | RP_v3_5_017 | GGTTAATTCTGATGAGCGTACCCCCTGCGTAATCTTATGAGCGGCTGTCTCCAC | 209 |
| B6 | RP_v3_5_018 | GGTTAATTCTGATGAGCGTACCTTGATAGTTCACATATGAGCGGCTGTCTCCAC | 210 |
| B7 | RP_v3_5_019 | GGTTAATTCTGATGAGCGTACCCCACCCTTATTTGTATGAGCGGCTGTCTCCAC | 211 |
| B8 | RP_v3_5_020 | GGTTAATTCTGATGAGCGTACCCCCTTATGTGTATGTATGAGCGGCTGTCTCCAC | 212 |
| B9 | RP_v3_5_021 | GGTTAATTCTGATGAGCGTACCCCTACTTGAAATCGTATGAGCGGCTGTCTCCAC | 213 |
| B10 | RP_v3_5_022 | GGTTAATTCTGATGAGCGTACCCCAACATTTCTTATATGAGCGGCTGTCTCCAC | 214 |
| B11 | RP_v3_5_023 | GGTTAATTCTGATGAGCGTACCCCATATAGATACTGATGAGCGGCTGTCTCCAC | 215 |
| B12 | RP_v3_5_024 | GGTTAATTCTGATGAGCGTACCCCTAGTGTGTTATGATGAGCGGCTGTCTCCAC | 216 |
| C1 | RP_v3_5_025 | GGTTAATTCTGATGAGCGTACCCTATTTGTCCTATGATGAGCGGCTGTCTCCAC | 217 |
| C2 | RP_v3_5_026 | GGTTAATTCTGATGAGCGTACCCTATTGTATGTATGATGAGCGGCTGTCTCCAC | 218 |
| C3 | RP_v3_5_027 | GGTTAATTCTGATGAGCGTACCCCATACTCCCTATGATGAGCGGCTGTCTCCAC | 219 |
| C4 | RP_v3_5_028 | GGTTAATTCTGATGAGCGTACCCTAAACTTATGATGATGAGCGGCTGTCTCCAC | 220 |

TABLE 3-continued

RT primers for human RNaseP amplicon.

| Well | Name | Sequence | SEQ ID NO: |
|---|---|---|---|
| C5 | RP_v3_5_029 | GGTTAATTCTGATGAGCGTACCCCCTAAATTGTATGATGAGCGGCTGTCTCCAC | 221 |
| C6 | RP_v3_5_030 | GGTTAATTCTGATGAGCGTACCCGTAATTTGTGTATATGAGCGGCTGTCTCCAC | 222 |
| C7 | RP_v3_5_031 | GGTTAATTCTGATGAGCGTACCATATCAATTACAAGGTGAGCGGCTGTCTCCAC | 223 |
| C8 | RP_v3_5_032 | GGTTAATTCTGATGAGCGTACCTGTGCGAAAGATATTTGAGCGGCTGTCTCCAC | 224 |
| C9 | RP_v3_5_033 | GGTTAATTCTGATGAGCGTACCCGTAGTGAGGATTTATGAGCGGCTGTCTCCAC | 225 |
| C10 | RP_v3_5_034 | GGTTAATTCTGATGAGCGTACCCCCGTGTTCCTATGATGAGCGGCTGTCTCCAC | 226 |
| C11 | RP_v3_5_035 | GGTTAATTCTGATGAGCGTACCCGTGTGCGTAGGATATGAGCGGCTGTCTCCAC | 227 |
| C12 | RP_v3_5_036 | GGTTAATTCTGATGAGCGTACCCGTGTAGTTATATGATGAGCGGCTGTCTCCAC | 228 |
| D1 | RP_v3_5_037 | GGTTAATTCTGATGAGCGTACCTTCAATCTTATTCGGTGAGCGGCTGTCTCCAC | 229 |
| D2 | RP_v3_5_038 | GGTTAATTCTGATGAGCGTACCCGTAGATACTTGATATGAGCGGCTGTCTCCAC | 230 |
| D3 | RP_v3_5_039 | GGTTAATTCTGATGAGCGTACCACATTTGATATATGATGAGCGGCTGTCTCCAC | 231 |
| D4 | RP_v3_5_040 | GGTTAATTCTGATGAGCGTACCGTAGGGATCTTGTTATGAGCGGCTGTCTCCAC | 232 |
| D5 | RP_v3_5_041 | GGTTAATTCTGATGAGCGTACCCGTGATGTATAGTTATGAGCGGCTGTCTCCAC | 233 |
| D6 | RP_v3_5_042 | GGTTAATTCTGATGAGCGTACCCTATCGTTTCCTGTATGAGCGGCTGTCTCCAC | 234 |
| D7 | RP_v3_5_043 | GGTTAATTCTGATGAGCGTACCCTAGTATATCTACAATGAGCGGCTGTCTCCAC | 235 |
| D8 | RP_v3_5_044 | GGTTAATTCTGATGAGCGTACCCCACCCTATTTACAATGAGCGGCTGTCTCCAC | 236 |
| D9 | RP_v3_5_045 | GGTTAATTCTGATGAGCGTACCCCTATCGTCCTACAATGAGCGGCTGTCTCCAC | 237 |
| D10 | RP_v3_5_046 | GGTTAATTCTGATGAGCGTACCCCCTGCGTACAACAATGAGCGGCTGTCTCCAC | 238 |
| D11 | RP_v3_5_047 | GGTTAATTCTGATGAGCGTACCTTAGGACCCATACTATGAGCGGCTGTCTCCAC | 239 |
| D12 | RP_v3_5_048 | GGTTAATTCTGATGAGCGTACCCCCGTTATGTCCCAATGAGCGGCTGTCTCCAC | 240 |
| E1 | RP_v3_5_049 | GGTTAATTCTGATGAGCGTACCCCCGTTAGCGTACAATGAGCGGCTGTCTCCAC | 241 |
| E2 | RP_v3_5_050 | GGTTAATTCTGATGAGCGTACCGTATTAGGACACTGATGAGCGGCTGTCTCCAC | 242 |
| E3 | RP_v3_5_051 | GGTTAATTCTGATGAGCGTACCTTAGGACTGAGGGTTTGAGCGGCTGTCTCCAC | 243 |
| E4 | RP_v3_5_052 | GGTTAATTCTGATGAGCGTACCCGTGATTCCCTGATATGAGCGGCTGTCTCCAC | 244 |
| E5 | RP_v3_5_053 | GGTTAATTCTGATGAGCGTACCGTTTCCTGACACTAATGAGCGGCTGTCTCCAC | 245 |
| E6 | RP_v3_5_054 | GGTTAATTCTGATGAGCGTACCCCTGTTGTATGAATATGAGCGGCTGTCTCCAC | 246 |
| E7 | RP_v3_5_055 | GGTTAATTCTGATGAGCGTACCCGTAAGTAGGACTAATGAGCGGCTGTCTCCAC | 247 |
| E8 | RP_v3_5_056 | GGTTAATTCTGATGAGCGTACCCTATCCAACTATCTGTGAGCGGCTGTCTCCAC | 248 |
| E9 | RP_v3_5_057 | GGTTAATTCTGATGAGCGTACCCCTGTATTGCGTCTGTGAGCGGCTGTCTCCAC | 249 |
| E10 | RP_v3_5_058 | GGTTAATTCTGATGAGCGTACCCTAACTAAAGGTCTGTGAGCGGCTGTCTCCAC | 250 |
| E11 | RP_v3_5_059 | GGTTAATTCTGATGAGCGTACCATATTAAAGTAGAGTTGAGCGGCTGTCTCCAC | 251 |
| E12 | RP_v3_5_060 | GGTTAATTCTGATGAGCGTACCCCCTTCTAGCGTATATGAGCGGCTGTCTCCAC | 252 |
| F1 | RP_v3_5_061 | GGTTAATTCTGATGAGCGTACCCCCGTTGAAAGATGATGAGCGGCTGTCTCCAC | 253 |
| F2 | RP_v3_5_062 | GGTTAATTCTGATGAGCGTACCCTAAGTTAAATACAATGAGCGGCTGTCTCCAC | 254 |
| F3 | RP_v3_5_063 | GGTTAATTCTGATGAGCGTACCCCCTGATCCAACTAATGAGCGGCTGTCTCCAC | 255 |
| F4 | RP_v3_5_064 | GGTTAATTCTGATGAGCGTACCCCTGTGCGAATAGTATGAGCGGCTGTCTCCAC | 256 |
| F5 | RP_v3_5_065 | GGTTAATTCTGATGAGCGTACCCGTGATAAGAGGATATGAGCGGCTGTCTCCAC | 257 |
| F6 | RP_v3_5_066 | GGTTAATTCTGATGAGCGTACCCCCTATATGTTTCAAATGAGCGGCTGTCTCCAC | 258 |

TABLE 3-continued

RT primers for human RNaseP amplicon.

| Well | Name | Sequence | SEQ ID NO: |
|---|---|---|---|
| F7 | RP_v3_5_067 | GGTTAATTCTGATGAGCGTACCCTTGCGGACTGTAAATGAGCGGCTGTCTCCAC | 259 |
| F8 | RP_v3_5_068 | GGTTAATTCTGATGAGCGTACCCCCTGAGTATGTAAATGAGCGGCTGTCTCCAC | 260 |
| F9 | RP_v3_5_069 | GGTTAATTCTGATGAGCGTACCCCTAAGATGTTCAAATGAGCGGCTGTCTCCAC | 261 |
| F10 | RP_v3_5_070 | GGTTAATTCTGATGAGCGTACCCTACTAAGCGATAAATGAGCGGCTGTCTCCAC | 262 |
| F11 | RP_v3_5_071 | GGTTAATTCTGATGAGCGTACCCCTAGAGTTCACAAATGAGCGGCTGTCTCCAC | 263 |
| F12 | RP_v3_5_072 | GGTTAATTCTGATGAGCGTACCATATCGTAAGGTTGTTGAGCGGCTGTCTCCAC | 264 |
| G1 | RP_v3_5_073 | GGTTAATTCTGATGAGCGTACCTTCACTATTGATCCTTGAGCGGCTGTCTCCAC | 265 |
| G2 | RP_v3_5_074 | GGTTAATTCTGATGAGCGTACCGTATGTATAGATCGTTGAGCGGCTGTCTCCAC | 266 |
| G3 | RP_v3_5_075 | GGTTAATTCTGATGAGCGTACCCTAACTATGCTACTGTGAGCGGCTGTCTCCAC | 267 |
| G4 | RP_v3_5_076 | GGTTAATTCTGATGAGCGTACCGTAAACTTGCTAAATTGAGCGGCTGTCTCCAC | 268 |
| G5 | RP_v3_5_077 | GGTTAATTCTGATGAGCGTACCCCTGTGATGCTAAATTGAGCGGCTGTCTCCAC | 269 |
| G6 | RP_v3_5_078 | GGTTAATTCTGATGAGCGTACCTTCTATGAATAGTATTGAGCGGCTGTCTCCAC | 270 |
| G7 | RP_v3_5_079 | GGTTAATTCTGATGAGCGTACCCACCCATCCCAACTATGAGCGGCTGTCTCCAC | 271 |
| G8 | RP_v3_5_080 | GGTTAATTCTGATGAGCGTACCTGCGATTTGAAACTGTGAGCGGCTGTCTCCAC | 272 |
| G9 | RP_v3_5_081 | GGTTAATTCTGATGAGCGTACCCACCCTACAATCAAATGAGCGGCTGTCTCCAC | 273 |
| G10 | RP_v3_5_082 | GGTTAATTCTGATGAGCGTACCCCCAACTAGATCAAATGAGCGGCTGTCTCCAC | 274 |
| G11 | RP_v3_5_083 | GGTTAATTCTGATGAGCGTACCCCCTTCATAAATCTGTGAGCGGCTGTCTCCAC | 275 |
| G12 | RP_v3_5_084 | GGTTAATTCTGATGAGCGTACCTGTTGTAGTGAAATATGAGCGGCTGTCTCCAC | 276 |
| H1 | RP_v3_5_085 | GGTTAATTCTGATGAGCGTACCACATACCACTAACAATGAGCGGCTGTCTCCAC | 277 |
| H2 | RP_v3_5_086 | GGTTAATTCTGATGAGCGTACCTATCGGGATCTTCTATGAGCGGCTGTCTCCAC | 278 |
| H3 | RP_v3_5_087 | GGTTAATTCTGATGAGCGTACCACATACCAACTTTAATGAGCGGCTGTCTCCAC | 279 |
| H4 | RP_v3_5_088 | GGTTAATTCTGATGAGCGTACCTGTCGTGATTTGATATGAGCGGCTGTCTCCAC | 280 |
| H5 | RP_v3_5_089 | GGTTAATTCTGATGAGCGTACCGTGACCTTCTACTAGTGAGCGGCTGTCTCCAC | 281 |
| H6 | RP_v3_5_090 | GGTTAATTCTGATGAGCGTACCCATTAAGTAGGATTATGAGCGGCTGTCTCCAC | 282 |
| H7 | RP_v3_5_091 | GGTTAATTCTGATGAGCGTACCTTTAGCGTGTACTTATGAGCGGCTGTCTCCAC | 283 |
| H8 | RP_v3_5_092 | GGTTAATTCTGATGAGCGTACCTGCGATTCCCTTTGATGAGCGGCTGTCTCCAC | 284 |
| H9 | RP_v3_5_093 | GGTTAATTCTGATGAGCGTACCTACTAGGATTATCTGTGAGCGGCTGTCTCCAC | 285 |
| H10 | RP_v3_5_094 | GGTTAATTCTGATGAGCGTACCTTTATAGTGCGTGTATGAGCGGCTGTCTCCAC | 286 |
| H11 | RP_v3_5_095 | GGTTAATTCTGATGAGCGTACCTTCCCTCCCACTTTATGAGCGGCTGTCTCCAC | 287 |
| H12 | RP_v3_5_096 | GGTTAATTCTGATGAGCGTACCTTCTAACTCGGGATATGAGCGGCTGTCTCCAC | 288 |

TABLE 4

Well-specific barcodes included in the primers provided in Tables 1-3.

| Well | Well Barcode | SEQ ID NO: |
|---|---|---|
| A1 | ATGTACCCTTCTTGT | 289 |
| A2 | ACACTTGAGGGTTTA | 290 |
| A3 | CTAAGATGAGGTCTA | 291 |
| A4 | CCTAGATAGTGCGTA | 292 |
| A5 | CCCTGATTATAGTTA | 293 |
| A6 | TTAATTCCTACACTG | 294 |
| A7 | CCTGTAAGAGTGTTA | 295 |
| A8 | CCTTCACTTTGCGTA | 296 |
| A9 | CTATGTGTGCGTGTA | 297 |
| A10 | CTAACTTATGTGATA | 298 |
| A11 | CCTGTTTATTCGTTA | 299 |
| A12 | CTATTCGTTAGTATA | 300 |
| B1 | CTAATATGTATCGTA | 301 |
| B2 | CCACTAGCGTATTTA | 302 |
| B3 | TTTATGTCGTGATCT | 303 |
| B4 | TACTGAGAGGATAGT | 304 |
| B5 | CCCTGCGTAATCTTA | 305 |
| B6 | TTGATAGTTCACATA | 306 |
| B7 | CCACCCTTATTTGTA | 307 |
| B8 | CCTTATGTGTATGTA | 308 |
| B9 | CTACTTGAAATCGTA | 309 |
| B10 | CCAACATTTCTTATA | 310 |
| B11 | CCATATAGATACTGA | 311 |
| B12 | CCTAGTGTGTTATGA | 312 |
| C1 | CTATTTGTCCTATGA | 313 |
| C2 | CTATTGTATGTATGA | 314 |
| C3 | CCATACTCCCTATGA | 315 |
| C4 | CTAAACTTATGATGA | 316 |
| C5 | CCCTAAATTGTATGA | 317 |
| C6 | CGTAATTTGTGTATA | 318 |
| C7 | ATATCAATTACAAGG | 319 |
| C8 | TGTGCGAAAGATATT | 320 |
| C9 | CGTAGTGAGGATTTA | 321 |
| C10 | CCCGTGTTCCTATGA | 322 |
| C11 | CGTGTGCGTAGGATA | 323 |
| C12 | CGTGTAGTTATATGA | 324 |
| D1 | TTCAATCTTATTCGG | 325 |
| D2 | CGTAGATACTTGATA | 326 |
| D3 | ACATTTGATATATGA | 327 |
| D4 | GTAGGGATCTTGTTA | 328 |
| D5 | CGTGATGTATAGTTA | 329 |
| D6 | CTATCGTTTCCTGTA | 330 |
| D7 | CTAGTATATCTACAA | 331 |
| D8 | CCACCCTATTTACAA | 332 |
| D9 | CCTATCGTCCTACAA | 333 |
| D10 | CCCTGCGTACAACAA | 334 |
| D11 | TTAGGACCCATACTA | 335 |
| D12 | CCCGTTATGTCCCAA | 336 |
| E1 | CCCGTTAGCGTACAA | 337 |
| E2 | GTATTAGGACACTGA | 338 |
| E3 | TTAGGACTGAGGGTT | 339 |
| E4 | CGTGATTCCCTGATA | 340 |
| E5 | GTTTCCTGACACTAA | 341 |
| E6 | CCTGTTGTATGAATA | 342 |
| E7 | CGTAAGTAGGACTAA | 343 |
| E8 | CTATCCAACTATCTG | 344 |
| E9 | CCTGTATTGCGTCTG | 345 |
| E10 | CTAACTAAAGGTCTG | 346 |
| E11 | ATATTAAAGTAGAGT | 347 |
| E12 | CCCTTCTAGCGTATA | 348 |
| F1 | CCCGTTGAAAGATGA | 349 |
| F2 | CTAAGTTAAATACAA | 350 |
| F3 | CCCTGATCCAACTAA | 351 |
| F4 | CCTGTGCGAATAGTA | 352 |
| F5 | CGTGATAAGAGGATA | 353 |
| F6 | CCTATATGTTTCAAA | 354 |
| F7 | CTTGCGGACTGTAAA | 355 |
| F8 | CCCTGAGTATGTAAA | 356 |
| F9 | CCTAAGATGTTCAAA | 357 |
| F10 | CTACTAAGCGATAAA | 358 |
| F11 | CCTAGAGTTCACAAA | 359 |
| F12 | ATATCGTAAGGTTGT | 360 |
| G1 | TTCACTATTGATCCT | 361 |
| G2 | GTATGTATAGATCGT | 362 |

TABLE 4-continued

Well-specific barcodes included in the primers provided in Tables 1-3.

| Well | Well Barcode | SEQ ID NO: |
|---|---|---|
| G3 | CTAACTATGCTACTG | 363 |
| G4 | GTAAACTTGCTAAAT | 364 |
| G5 | CCTGTGATGCTAAAT | 365 |
| G6 | TTCTATGAATAGTAT | 366 |
| G7 | CACCCATCCCAACTA | 367 |
| G8 | TGCGATTTGAAACTG | 368 |
| G9 | CACCCTACAATCAAA | 369 |
| G10 | CCCAACTAGATCAAA | 370 |
| G11 | CCCTTCATAAATCTG | 371 |
| G12 | TGTTGTAGTGAAATA | 372 |
| H1 | ACATACCACTAACAA | 373 |
| H2 | TATCGGGATCTTCTA | 374 |
| H3 | ACATACCAACTTTAA | 375 |
| H4 | TGTCGTGATTTGATA | 376 |
| H5 | GTGACCTTCTACTAG | 377 |
| H6 | CATTAAGTAGGATTA | 378 |
| H7 | TTTAGCGTGTACTTA | 379 |
| H8 | TGCGATTCCCTTTGA | 380 |
| H9 | TACTAGGATTATCTG | 381 |
| H10 | TTTATAGTGCGTGTA | 382 |
| H11 | TTCCCTCCCACTTTA | 383 |
| H12 | TTCTAACTCGGGATA | 384 |

TABLE 5

Pooled PCR primers.

| Name | Sequence | SEQ ID: | Plate Barcode | SEQ ID: |
|---|---|---|---|---|
| N1-F-1PCR | AATGATACGGCGACCACCGAGATCTACACCGCTCCACGATCGTCGGCAGCGTCAGATGTGTATAAGAGACAGGACCCCAAAATCAGCGAAATG | 385 | N/A | N/A |
| N2-F-1PCR | AATGATACGGCGACCACCGAGATCTACACCGCTCCACGATCGTCGGCAGCGTCAGATGTGTATAAGAGACAGAAGGAACTGATTACAAACATTGGC | 386 | N/A | N/A |
| HSC-F-1PCR | AATGATACGGCGACCACCGAGATCTACACCGCTCCACGATCGTCGGCAGCGTCAGATGTGTATAAGAGACAGGATTTGGACCTGCGAGCG | 387 | N/A | N/A |
| v3_5-Plate-Reverse-001 | CAAGCAGAAGACGGCATACGAGATCGCTCAGTTCGTCTCGTGGGCTCGGAGATGTGTATAAGAGACAGAGACTGATATAGTACATAAAGGTTAATTCTGATGAGCGTACC | 388 | GATATAGTACATAAA | 484 |
| v3_5-Plate-Reverse-002 | CAAGCAGAAGACGGCATACGAGATCGCTCAGTTCGTCTCGTGGGCTCGGAGATGTGTATAAGAGACAGAGACTTAGCGTCGGGATATAGGTTAATTCTGATGAGCGTACC | 389 | TAGCGTCGGGATATA | 485 |
| v3_5-Plate-Reverse-003 | CAAGCAGAAGACGGCATACGAGATCGCTCAGTTCGTCTCGTGGGCTCGGAGATGTGTATAAGAGACAGAGACTTCCGTGAGTGAGTTAGGTTAATTCTGATGAGCGTACC | 390 | TCCGTGAGTGAGTTA | 486 |
| v3_5-Plate-Reverse-004 | CAAGCAGAAGACGGCATACGAGATCGCTCAGTTCGTCTCGTGGGCTCGGAGATGTGTATAAGAGACAGAGACTGGGTGAGTAGTGCGTGGTTAATTCTGATGAGCGTACC | 391 | GGGTGAGTAGTGCGT | 487 |
| v3_5-Plate-Reverse-005 | CAAGCAGAAGACGGCATACGAGATCGCTCAGTTCGTCTCGTGGGCTCGGAGATGTGTATAAGAGACAGAGACTCTCGGAATATATAAGGGTTAATTCTGATGAGCGTACC | 392 | CTCGGAATATATAAG | 488 |
| v3_5-Plate-Reverse-006 | CAAGCAGAAGACGGCATACGAGATCGCTCAGTTCGTCTCGTGGGCTCGGAGATGTGTATAAGAGACAGAGACTTGCGTCGTAGGGATTGGTTAATTCTGATGAGCGTACC | 393 | TGCGTCGTAGGGATT | 489 |
| v3_5-Plate-Reverse-007 | CAAGCAGAAGACGGCATACGAGATCGCTCAGTTCGTCTCGTGGGCTCGGAGATGTGTATAAGAGACAGAGACTTGATCGTAGTATGATGGTTAATTCTGATGAGCGTACC | 394 | TGATCGTAGTATGAT | 490 |
| v3_5-Plate-Reverse-008 | CAAGCAGAAGACGGCATACGAGATCGCTCAGTTCGTCTCGTGGGCTCGGAGATGTGTATAAGAGACAGAGACTGGATTATATTGATATGGTTAATTCTGATGAGCGTACC | 395 | GGATTATATTGATAT | 491 |
| v3_5-Plate-Reverse-009 | CAAGCAGAAGACGGCATACGAGATCGCTCAGTTCGTCTCGTGGGCTCGGAGATGTGTATAAGAGACAGAGACTTATCGGAAAGAAATAGGTTAATTCTGATGAGCGTACC | 396 | TATCGGAAAGAAATA | 492 |
| v3_5-Plate-Reverse-010 | CAAGCAGAAGACGGCATACGAGATCGCTCAGTTCGTCTCGTGGGCTCGGAGATGTGTATAAGAGACAGAGACTTCGTAAATCCAACTAGGTTAATTCTGATGAGCGTACC | 397 | TCGTAAATCCAACTA | 493 |
| v3_5-Plate-Reverse-011 | CAAGCAGAAGACGGCATACGAGATCGCTCAGTTCGTCTCGTGGGCTCGGAGATGTGTATAAGAGACAGAGACTGTGTTAAGAGGTCTAGGTTAATTCTGATGAGCGTACC | 398 | GTGTTAAGAGGTCTA | 494 |

TABLE 5-continued

Pooled PCR primers.

| Name | Sequence | SEQ ID: | Plate Barcode | SEQ ID: |
|---|---|---|---|---|
| v3_5-Plate-Reverse-012 | CAAGCAGAAGACGGCATACGAGATCGCTCAGTTCGTCTCGTGGGCTCGGAGATGTGTATAAGAGACAGAGACTCATTATTGCGTGTCGGGTTAATTCTGATGAGCGTACC | 399 | CATTATTGCGTGTCG | 495 |
| v3_5-Plate-Reverse-013 | CAAGCAGAAGACGGCATACGAGATCGCTCAGTTCGTCTCGTGGGCTCGGAGATGTGTATAAGAGACAGAGACTTCTACCCTATACTAAGGTTAATTCTGATGAGCGTACC | 400 | TCTACCCTATACTAA | 496 |
| v3_5-Plate-Reverse-014 | CAAGCAGAAGACGGCATACGAGATCGCTCAGTTCGTCTCGTGGGCTCGGAGATGTGTATAAGAGACAGAGACTTTTCACCTACAAACTGGTTAATTCTGATGAGCGTACC | 401 | TTTCACCTACAAACT | 497 |
| v3_5-Plate-Reverse-015 | CAAGCAGAAGACGGCATACGAGATCGCTCAGTTCGTCTCGTGGGCTCGGAGATGTGTATAAGAGACAGAGACTATGTGTAGCGTCCCTGGTTAATTCTGATGAGCGTACC | 402 | ATGTGTAGCGTCCCT | 498 |
| v3_5-Plate-Reverse-016 | CAAGCAGAAGACGGCATACGAGATCGCTCAGTTCGTCTCGTGGGCTCGGAGATGTGTATAAGAGACAGAGACTAAATAGTTGACATAAGGTTAATTCTGATGAGCGTACC | 403 | AAATAGTTGACATAA | 499 |
| v3_5-Plate-Reverse-017 | CAAGCAGAAGACGGCATACGAGATCGCTCAGTTCGTCTCGTGGGCTCGGAGATGTGTATAAGAGACAGAGACTTTTCTTGTGACCCTCGGTTAATTCTGATGAGCGTACC | 404 | TTTCTTGTGACCCTC | 500 |
| v3_5-Plate-Reverse-018 | CAAGCAGAAGACGGCATACGAGATCGCTCAGTTCGTCTCGTGGGCTCGGAGATGTGTATAAGAGACAGAGACTCGGATACTTAGTTAAGGTTAATTCTGATGAGCGTACC | 405 | CGGATACTTAGTTAA | 501 |
| v3_5-Plate-Reverse-019 | CAAGCAGAAGACGGCATACGAGATCGCTCAGTTCGTCTCGTGGGCTCGGAGATGTGTATAAGAGACAGAGACTTTTCACCCTTACATAGGTTAATTCTGATGAGCGTACC | 406 | TTTCACCCTTACATA | 502 |
| v3_5-Plate-Reverse-020 | CAAGCAGAAGACGGCATACGAGATCGCTCAGTTCGTCTCGTGGGCTCGGAGATGTGTATAAGAGACAGAGACTTGTACTCCTATTGTTGGTTAATTCTGATGAGCGTACC | 407 | TGTACTCCTATTGTT | 503 |
| v3_5-Plate-Reverse-021 | CAAGCAGAAGACGGCATACGAGATCGCTCAGTTCGTCTCGTGGGCTCGGAGATGTGTATAAGAGACAGAGACTCTCGTAAATCTATCGGGTTAATTCTGATGAGCGTACC | 408 | CTCGTAAATCTATCG | 504 |
| v3_5-Plate-Reverse-022 | CAAGCAGAAGACGGCATACGAGATCGCTCAGTTCGTCTCGTGGGCTCGGAGATGTGTATAAGAGACAGAGACTCCTAATTGATGATGCGGTTAATTCTGATGAGCGTACC | 409 | CCTAATTGATGATGC | 505 |
| v3_5-Plate-Reverse-023 | CAAGCAGAAGACGGCATACGAGATCGCTCAGTTCGTCTCGTGGGCTCGGAGATGTGTATAAGAGACAGAGACTGGGAATCTAATACTGGGTTAATTCTGATGAGCGTACC | 410 | GGGAATCTAATACTG | 506 |
| v3_5-Plate-Reverse-024 | CAAGCAGAAGACGGCATACGAGATCGCTCAGTTCGTCTCGTGGGCTCGGAGATGTGTATAAGAGACAGAGACTTAAAGGTTGAGGATTGGTTAATTCTGATGAGCGTACC | 411 | TAAAGGTTGAGGATT | 507 |
| v3_5-Plate-Reverse-025 | CAAGCAGAAGACGGCATACGAGATCGCTCAGTTCGTCTCGTGGGCTCGGAGATGTGTATAAGAGACAGAGACTACCGTGAGTATTTAAGGTTAATTCTGATGAGCGTACC | 412 | ACCGTGAGTATTTAA | 508 |
| v3_5-Plate-Reverse-026 | CAAGCAGAAGACGGCATACGAGATCGCTCAGTTCGTCTCGTGGGCTCGGAGATGTGTATAAGAGACAGAGACTTAGCGTATCCTTAGTGGTTAATTCTGATGAGCGTACC | 413 | TAGCGTATCCTTAGT | 509 |
| v3_5-Plate-Reverse-027 | CAAGCAGAAGACGGCATACGAGATCGCTCAGTTCGTCTCGTGGGCTCGGAGATGTGTATAAGAGACAGAGACTGGGTTCAATAAACTGGTTAATTCTGATGAGCGTACC | 414 | GGGTTCAATAAACTG | 510 |
| v3_5-Plate-Reverse-028 | CAAGCAGAAGACGGCATACGAGATCGCTCAGTTCGTCTCGTGGGCTCGGAGATGTGTATAAGAGACAGAGACTTAGGACAAGATTAGTGGTTAATTCTGATGAGCGTACC | 415 | TAGGACAAGATTAGT | 511 |
| v3_5-Plate-Reverse-029 | CAAGCAGAAGACGGCATACGAGATCGCTCAGTTCGTCTCGTGGGCTCGGAGATGTGTATAAGAGACAGAGACTTCGGACTAACTAACTGGTTAATTCTGATGAGCGTACC | 416 | TCGGACTAACTAACT | 512 |
| v3_5-Plate-Reverse-030 | CAAGCAGAAGACGGCATACGAGATCGCTCAGTTCGTCTCGTGGGCTCGGAGATGTGTATAAGAGACAGAGACTTAGGAATATCGGGTTGGTTAATTCTGATGAGCGTACC | 417 | TAGGAATATCGGGTT | 513 |
| v3_5-Plate-Reverse-031 | CAAGCAGAAGACGGCATACGAGATCGCTCAGTTCGTCTCGTGGGCTCGGAGATGTGTATAAGAGACAGAGACTGGGTGAGGTTTAAGTGGTTAATTCTGATGAGCGTACC | 418 | GGGTGAGGTTTAAGT | 514 |
| v3_5-Plate-Reverse-032 | CAAGCAGAAGACGGCATACGAGATCGCTCAGTTCGTCTCGTGGGCTCGGAGATGTGTATAAGAGACAGAGACTTTTAATAACTCCCTCGGTTAATTCTGATGAGCGTACC | 419 | TTTAATAACTCCCTC | 515 |
| v3_5-Plate-Reverse-033 | CAAGCAGAAGACGGCATACGAGATCGCTCAGTTCGTCTCGTGGGCTCGGAGATGTGTATAAGAGACAGAGACTCATATATAAGTGTCGGGTTAATTCTGATGAGCGTACC | 420 | CATATATAAGTGTCG | 516 |
| v3_5-Plate-Reverse-034 | CAAGCAGAAGACGGCATACGAGATCGCTCAGTTCGTCTCGTGGGCTCGGAGATGTGTATAAGAGACAGAGACTCGGAACTAAATTGATGGTTAATTCTGATGAGCGTACC | 421 | CGGAACTAAATTGAT | 517 |
| v3_5-Plate-Reverse-035 | CAAGCAGAAGACGGCATACGAGATCGCTCAGTTCGTCTCGTGGGCTCGGAGATGTGTATAAGAGACAGAGACTGTGTAGCGAGTTGATGGTTAATTCTGATGAGCGTACC | 422 | GTGTAGCGAGTTGAT | 518 |
| v3_5-Plate-Reverse-036 | CAAGCAGAAGACGGCATACGAGATCGCTCAGTTCGTCTCGTGGGCTCGGAGATGTGTATAAGAGACAGAGACTTTCTACATCGTATAGGGTTAATTCTGATGAGCGTACC | 423 | TTCTACATCGTATAG | 519 |

TABLE 5-continued

Pooled PCR primers.

| Name | Sequence | SEQ ID: | Plate Barcode | SEQ ID: |
|---|---|---|---|---|
| v3_5-Plate-Reverse-037 | CAAGCAGAAGACGGCATACGAGATCGCTCAGTTCGTCTCGTGGGCTCGGAGATGTGTATAAGAGACAGAGACTGGATAATGAGGGATTGGTTAATTCTGATGAGCGTACC | 424 | GGATAATGAGGGATT | 520 |
| v3_5-Plate-Reverse-038 | CAAGCAGAAGACGGCATACGAGATCGCTCAGTTCGTCTCGTGGGCTCGGAGATGTGTATAAGAGACAGAGACTTAAATCTAACTTTGCGGTTAATTCTGATGAGCGTACC | 425 | TAAATCTAACTTTGC | 521 |
| v3_5-Plate-Reverse-039 | CAAGCAGAAGACGGCATACGAGATCGCTCAGTTCGTCTCGTGGGCTCGGAGATGTGTATAAGAGACAGAGACTGAAATTAGCGAGTTAGGTTAATTCTGATGAGCGTACC | 426 | GAAATTAGCGAGTTA | 522 |
| v3_5-Plate-Reverse-040 | CAAGCAGAAGACGGCATACGAGATCGCTCAGTTCGTCTCGTGGGCTCGGAGATGTGTATAAGAGACAGAGACTAAGGTAATAGTGAGTGGTTAATTCTGATGAGCGTACC | 427 | AAGGTAATAGTGAGT | 523 |
| v3_5-Plate-Reverse-041 | CAAGCAGAAGACGGCATACGAGATCGCTCAGTTCGTCTCGTGGGCTCGGAGATGTGTATAAGAGACAGAGACTTGATCGTATATAAGTGGTTAATTCTGATGAGCGTACC | 428 | TGATCGTATATAAGT | 524 |
| v3_5-Plate-Reverse-042 | CAAGCAGAAGACGGCATACGAGATCGCTCAGTTCGTCTCGTGGGCTCGGAGATGTGTATAAGAGACAGAGACTCCATATAAACTTAGTGGTTAATTCTGATGAGCGTACC | 429 | CCATATAAACTTAGT | 525 |
| v3_5-Plate-Reverse-043 | CAAGCAGAAGACGGCATACGAGATCGCTCAGTTCGTCTCGTGGGCTCGGAGATGTGTATAAGAGACAGAGACTTACAAACATACTAAGGTTAATTCTGATGAGCGTACC | 430 | TACAAACATACTAAG | 526 |
| v3_5-Plate-Reverse-044 | CAAGCAGAAGACGGCATACGAGATCGCTCAGTTCGTCTCGTGGGCTCGGAGATGTGTATAAGAGACAGAGACTTAGCGTAAAGTGCGTGGTTAATTCTGATGAGCGTACC | 431 | TAGCGTAAAGTGCGT | 527 |
| v3_5-Plate-Reverse-045 | CAAGCAGAAGACGGCATACGAGATCGCTCAGTTCGTCTCGTGGGCTCGGAGATGTGTATAAGAGACAGAGACTTCTTTGATCTACACTGGTTAATTCTGATGAGCGTACC | 432 | TCTTTGATCTACACT | 528 |
| v3_5-Plate-Reverse-046 | CAAGCAGAAGACGGCATACGAGATCGCTCAGTTCGTCTCGTGGGCTCGGAGATGTGTATAAGAGACAGAGACTTCCCTATTAGTTGTTGGTTAATTCTGATGAGCGTACC | 433 | TCCCTATTAGTTGTT | 529 |
| v3_5-Plate-Reverse-047 | CAAGCAGAAGACGGCATACGAGATCGCTCAGTTCGTCTCGTGGGCTCGGAGATGTGTATAAGAGACAGAGACTCTATTTGATTCCCTCGGTTAATTCTGATGAGCGTACC | 434 | CTATTTGATTCCCTC | 530 |
| v3_5-Plate-Reverse-048 | CAAGCAGAAGACGGCATACGAGATCGCTCAGTTCGTCTCGTGGGCTCGGAGATGTGTATAAGAGACAGAGACTGGGATTACAATAAAGGGTTAATTCTGATGAGCGTACC | 435 | GGGATTACAATAAAG | 531 |
| v3_5-Plate-Reverse-049 | CAAGCAGAAGACGGCATACGAGATCGCTCAGTTCGTCTCGTGGGCTCGGAGATGTGTATAAGAGACAGAGACTGTAAGCGATATTATTGGTTAATTCTGATGAGCGTACC | 436 | GTAAGCGATATTATT | 532 |
| v3_5-Plate-Reverse-050 | CAAGCAGAAGACGGCATACGAGATCGCTCAGTTCGTCTCGTGGGCTCGGAGATGTGTATAAGAGACAGAGACTGGATAGTGTATTTGAGGTTAATTCTGATGAGCGTACC | 437 | GGATAGTGTATTTGA | 533 |
| v3_5-Plate-Reverse-051 | CAAGCAGAAGACGGCATACGAGATCGCTCAGTTCGTCTCGTGGGCTCGGAGATGTGTATAAGAGACAGAGACTGGATAAATGACACTTGGTTAATTCTGATGAGCGTACC | 438 | GGATAAATGACACTT | 534 |
| v3_5-Plate-Reverse-052 | CAAGCAGAAGACGGCATACGAGATCGCTCAGTTCGTCTCGTGGGCTCGGAGATGTGTATAAGAGACAGAGACTCCTTTCAAGATATGCGGTTAATTCTGATGAGCGTACC | 439 | CCTTTCAAGATATGC | 535 |
| v3_5-Plate-Reverse-053 | CAAGCAGAAGACGGCATACGAGATCGCTCAGTTCGTCTCGTGGGCTCGGAGATGTGTATAAGAGACAGAGACTTTAATCGTTAGGGTTGGTTAATTCTGATGAGCGTACC | 440 | TTAATCGTTAGGGTT | 536 |
| v3_5-Plate-Reverse-054 | CAAGCAGAAGACGGCATACGAGATCGCTCAGTTCGTCTCGTGGGCTCGGAGATGTGTATAAGAGACAGAGACTCACAAACATATATCGGGTTAATTCTGATGAGCGTACC | 441 | CACAAACATATATCG | 537 |
| v3_5-Plate-Reverse-055 | CAAGCAGAAGACGGCATACGAGATCGCTCAGTTCGTCTCGTGGGCTCGGAGATGTGTATAAGAGACAGAGACTCAAACAAACTACTCGGGTTAATTCTGATGAGCGTACC | 442 | CAAACAAACTACTCG | 538 |
| v3_5-Plate-Reverse-056 | CAAGCAGAAGACGGCATACGAGATCGCTCAGTTCGTCTCGTGGGCTCGGAGATGTGTATAAGAGACAGAGACTCTAGGACAATTTCTAGGTTAATTCTGATGAGCGTACC | 443 | CTAGGACAATTTCTA | 539 |
| v3_5-Plate-Reverse-057 | CAAGCAGAAGACGGCATACGAGATCGCTCAGTTCGTCTCGTGGGCTCGGAGATGTGTATAAGAGACAGAGACTGGGTTGCGTATAACTGGTTAATTCTGATGAGCGTACC | 444 | GGGTTGCGTATAACT | 540 |
| v3_5-Plate-Reverse-058 | CAAGCAGAAGACGGCATACGAGATCGCTCAGTTCGTCTCGTGGGCTCGGAGATGTGTATAAGAGACAGAGACTTCCGAAATGATATGTGGTTAATTCTGATGAGCGTACC | 445 | TCCGAAATGATATGT | 541 |
| v3_5-Plate-Reverse-059 | CAAGCAGAAGACGGCATACGAGATCGCTCAGTTCGTCTCGTGGGCTCGGAGATGTGTATAAGAGACAGAGACTCGGACTACAATTTAAGGTTAATTCTGATGAGCGTACC | 446 | CGGACTACAATTTAA | 542 |
| v3_5-Plate-Reverse-060 | CAAGCAGAAGACGGCATACGAGATCGCTCAGTTCGTCTCGTGGGCTCGGAGATGTGTATAAGAGACAGAGACTGGAACACTTACCCTTGGTTAATTCTGATGAGCGTACC | 447 | GGAACACTTACCCTT | 543 |
| v3_5-Plate-Reverse-061 | CAAGCAGAAGACGGCATACGAGATCGCTCAGTTCGTCTCGTGGGCTCGGAGATGTGTATAAGAGACAGAGACTCACAAAGCGTACACTGGTTAATTCTGATGAGCGTACC | 448 | CACAAAGCGTACACT | 544 |

TABLE 5-continued

Pooled PCR primers.

| Name | Sequence | SEQ ID: | Plate Barcode | SEQ ID: |
|---|---|---|---|---|
| v3_5-Plate-Reverse-062 | CAAGCAGAAGACGGCATACGAGATCGCTCAGTTCGTCTCGTGGGCTCGGAGATGTGTATAAGAGACAGAGACTTGATGATCGTACTTAGGTTAATTCTGATGAGCGTACC | 449 | TGATGATCGTACTTA | 545 |
| v3_5-Plate-Reverse-063 | CAAGCAGAAGACGGCATACGAGATCGCTCAGTTCGTCTCGTGGGCTCGGAGATGTGTATAAGAGACAGAGACTCTATAATTCGTATCGGGTTAATTCTGATGAGCGTACC | 450 | CTATAATTCGTATCG | 546 |
| v3_5-Plate-Reverse-064 | CAAGCAGAAGACGGCATACGAGATCGCTCAGTTCGTCTCGTGGGCTCGGAGATGTGTATAAGAGACAGAGACTCATAAGCGTAGAGGTGGTTAATTCTGATGAGCGTACC | 451 | CATAAGCGTAGAGGT | 547 |
| v3_5-Plate-Reverse-065 | CAAGCAGAAGACGGCATACGAGATCGCTCAGTTCGTCTCGTGGGCTCGGAGATGTGTATAAGAGACAGAGACTTCGTTATCGTATGAAGGTTAATTCTGATGAGCGTACC | 452 | TCGTTATCGTATGAA | 548 |
| v3_5-Plate-Reverse-066 | CAAGCAGAAGACGGCATACGAGATCGCTCAGTTCGTCTCGTGGGCTCGGAGATGTGTATAAGAGACAGAGACTAAGGTATTACAAGATGGTTAATTCTGATGAGCGTACC | 453 | AAGGTATTACAAGAT | 549 |
| v3_5-Plate-Reverse-067 | CAAGCAGAAGACGGCATACGAGATCGCTCAGTTCGTCTCGTGGGCTCGGAGATGTGTATAAGAGACAGAGACTAATCTTCAAATATCGGGTTAATTCTGATGAGCGTACC | 454 | AATCTTCAAATATCG | 550 |
| v3_5-Plate-Reverse-068 | CAAGCAGAAGACGGCATACGAGATCGCTCAGTTCGTCTCGTGGGCTCGGAGATGTGTATAAGAGACAGAGACTTAGTGAGTTATCGTCGGTTAATTCTGATGAGCGTACC | 455 | TAGTGAGTTATCGTC | 551 |
| v3_5-Plate-Reverse-069 | CAAGCAGAAGACGGCATACGAGATCGCTCAGTTCGTCTCGTGGGCTCGGAGATGTGTATAAGAGACAGAGACTTTCAACACTCGTATTGGTTAATTCTGATGAGCGTACC | 456 | TTCAACACTCGTATT | 552 |
| v3_5-Plate-Reverse-070 | CAAGCAGAAGACGGCATACGAGATCGCTCAGTTCGTCTCGTGGGCTCGGAGATGTGTATAAGAGACAGAGACTTAATATAAACTACTCGGTTAATTCTGATGAGCGTACC | 457 | TAATATAAACTACTC | 553 |
| v3_5-Plate-Reverse-071 | CAAGCAGAAGACGGCATACGAGATCGCTCAGTTCGTCTCGTGGGCTCGGAGATGTGTATAAGAGACAGAGACTGGGATAGCGATAGATGGTTAATTCTGATGAGCGTACC | 458 | GGGATAGCGATAGAT | 554 |
| v3_5-Plate-Reverse-072 | CAAGCAGAAGACGGCATACGAGATCGCTCAGTTCGTCTCGTGGGCTCGGAGATGTGTATAAGAGACAGAGACTCACAAGGATCTAAAGGTTAATTCTGATGAGCGTACC | 459 | CACAAGGATCTAAAG | 555 |
| v3_5-Plate-Reverse-073 | CAAGCAGAAGACGGCATACGAGATCGCTCAGTTCGTCTCGTGGGCTCGGAGATGTGTATAAGAGACAGAGACTTTGGACTATCTATGCGGTTAATTCTGATGAGCGTACC | 460 | TTGGACTATCTATGC | 556 |
| v3_5-Plate-Reverse-074 | CAAGCAGAAGACGGCATACGAGATCGCTCAGTTCGTCTCGTGGGCTCGGAGATGTGTATAAGAGACAGAGACTTCGTTAGCACTTTAAGGTTAATTCTGATGAGCGTACC | 461 | TCGTTAGCACTTTAA | 557 |
| v3_5-Plate-Reverse-075 | CAAGCAGAAGACGGCATACGAGATCGCTCAGTTCGTCTCGTGGGCTCGGAGATGTGTATAAGAGACAGAGACTACTCCCATACTTTCTGGTTAATTCTGATGAGCGTACC | 462 | ACTCCCATACTTTCT | 558 |
| v3_5-Plate-Reverse-076 | CAAGCAGAAGACGGCATACGAGATCGCTCAGTTCGTCTCGTGGGCTCGGAGATGTGTATAAGAGACAGAGACTCAACTAGAGGACTAAGGTTAATTCTGATGAGCGTACC | 463 | CAACTAGAGGACTAA | 559 |
| v3_5-Plate-Reverse-077 | CAAGCAGAAGACGGCATACGAGATCGCTCAGTTCGTCTCGTGGGCTCGGAGATGTGTATAAGAGACAGAGACTTGGTGTAAATGATTAGGTTAATTCTGATGAGCGTACC | 464 | TGGTGTAAATGATTA | 560 |
| v3_5-Plate-Reverse-078 | CAAGCAGAAGACGGCATACGAGATCGCTCAGTTCGTCTCGTGGGCTCGGAGATGTGTATAAGAGACAGAGACTCGTACTACCCTATGCGGTTAATTCTGATGAGCGTACC | 465 | CGTACTACCCTATGC | 561 |
| v3_5-Plate-Reverse-079 | CAAGCAGAAGACGGCATACGAGATCGCTCAGTTCGTCTCGTGGGCTCGGAGATGTGTATAAGAGACAGAGACTTAGAGGGCTATACTTGGTTAATTCTGATGAGCGTACC | 466 | TAGAGGGCTATACTT | 562 |
| v3_5-Plate-Reverse-080 | CAAGCAGAAGACGGCATACGAGATCGCTCAGTTCGTCTCGTGGGCTCGGAGATGTGTATAAGAGACAGAGACTATATATCGGGTGAGTGGTTAATTCTGATGAGCGTACC | 467 | ATATATCGGGTGAGT | 563 |
| v3_5-Plate-Reverse-081 | CAAGCAGAAGACGGCATACGAGATCGCTCAGTTCGTCTCGTGGGCTCGGAGATGTGTATAAGAGACAGAGACTTCCCTAAGTAGAGTAGGTTAATTCTGATGAGCGTACC | 468 | TCCCTAAGTAGAGTA | 564 |
| v3_5-Plate-Reverse-082 | CAAGCAGAAGACGGCATACGAGATCGCTCAGTTCGTCTCGTGGGCTCGGAGATGTGTATAAGAGACAGAGACTGGGATAGATTACAAGGTTAATTCTGATGAGCGTACC | 469 | GGGATAGATTACAAA | 565 |
| v3_5-Plate-Reverse-083 | CAAGCAGAAGACGGCATACGAGATCGCTCAGTTCGTCTCGTGGGCTCGGAGATGTGTATAAGAGACAGAGACTGAGGGACTATAATGTGGTTAATTCTGATGAGCGTACC | 470 | GAGGGACTATAATGT | 566 |
| v3_5-Plate-Reverse-084 | CAAGCAGAAGACGGCATACGAGATCGCTCAGTTCGTCTCGTGGGCTCGGAGATGTGTATAAGAGACAGAGACTGATAGCGTAGGTCTTGGTTAATTCTGATGAGCGTACC | 471 | GATAGCGTAGGTCTT | 567 |
| v3_5-Plate-Reverse-085 | CAAGCAGAAGACGGCATACGAGATCGCTCAGTTCGTCTCGTGGGCTCGGAGATGTGTATAAGAGACAGAGACTTTACAAACTCTATCGGGTTAATTCTGATGAGCGTACC | 472 | TTACAAACTCTATCG | 568 |
| v3_5-Plate-Reverse-086 | CAAGCAGAAGACGGCATACGAGATCGCTCAGTTCGTCTCGTGGGCTCGGAGATGTGTATAAGAGACAGAGACTCGTAGGAAAGATCGTGGTTAATTCTGATGAGCGTACC | 473 | CGTAGGAAAGATCGT | 569 |

TABLE 5-continued

Pooled PCR primers.

| Name | Sequence | SEQ ID: | Plate Barcode | SEQ ID: |
|---|---|---|---|---|
| v3_5-Plate-Reverse-087 | CAAGCAGAAGACGGCATACGAGATCGCTCAGTTCGTCTCGTGGGCTCGGAGATGTGTATAAGAGACAGAGACTCCCGTGAAAGATATAGGTTAATTCTGATGAGCGTACC | 474 | CCCGTGAAAGATATA | 570 |
| v3_5-Plate-Reverse-088 | CAAGCAGAAGACGGCATACGAGATCGCTCAGTTCGTCTCGTGGGCTCGGAGATGTGTATAAGAGACAGAGACTCGGATTCGTTTAAGTGGTTAATTCTGATGAGCGTACC | 475 | CGGATTCGTTTAAGT | 571 |
| v3_5-Plate-Reverse-089 | CAAGCAGAAGACGGCATACGAGATCGCTCAGTTCGTCTCGTGGGCTCGGAGATGTGTATAAGAGACAGAGACTTATGATCGGTTGCGTGGTTAATTCTGATGAGCGTACC | 476 | TATGATCGGTTGCGT | 572 |
| v3_5-Plate-Reverse-090 | CAAGCAGAAGACGGCATACGAGATCGCTCAGTTCGTCTCGTGGGCTCGGAGATGTGTATAAGAGACAGAGACTTTAAGTATAGAGTATGGTTAATTCTGATGAGCGTACC | 477 | TTAAGTATAGAGTAT | 573 |
| v3_5-Plate-Reverse-091 | CAAGCAGAAGACGGCATACGAGATCGCTCAGTTCGTCTCGTGGGCTCGGAGATGTGTATAAGAGACAGAGACTTCTTTGATCGGACTAGGTTAATTCTGATGAGCGTACC | 478 | TCTTTGATCGGACTA | 574 |
| v3_5-Plate-Reverse-092 | CAAGCAGAAGACGGCATACGAGATCGCTCAGTTCGTCTCGTGGGCTCGGAGATGTGTATAAGAGACAGAGACTTTAGTGTGAATCCTCGGTTAATTCTGATGAGCGTACC | 479 | TTAGTGTGAATCCTC | 575 |
| v3_5-Plate-Reverse-093 | CAAGCAGAAGACGGCATACGAGATCGCTCAGTTCGTCTCGTGGGCTCGGAGATGTGTATAAGAGACAGAGACTTTACATTTATGATCGGGTTAATTCTGATGAGCGTACC | 480 | TTACATTTATGATCG | 576 |
| v3_5-Plate-Reverse-094 | CAAGCAGAAGACGGCATACGAGATCGCTCAGTTCGTCTCGTGGGCTCGGAGATGTGTATAAGAGACAGAGACTTCTAATCTAGTATCGGGTTAATTCTGATGAGCGTACC | 481 | TCTAATCTAGTATCG | 577 |
| v3_5-Plate-Reverse-095 | CAAGCAGAAGACGGCATACGAGATCGCTCAGTTCGTCTCGTGGGCTCGGAGATGTGTATAAGAGACAGAGACTTTGAAGCGAAATAGTGGTTAATTCTGATGAGCGTACC | 482 | TTGAAGCGAAATAGT | 578 |
| v3_5-Plate-Reverse-096 | CAAGCAGAAGACGGCATACGAGATCGCTCAGTTCGTCTCGTGGGCTCGGAGATGTGTATAAGAGACAGAGACTGGAATCTAAGTAGTAGGTTAATTCTGATGAGCGTACC | 483 | GGAATCTAAGTAGTA | 579 |

What is claimed:

1. A method for parallel detection, comprising:
   obtaining a plurality of samples;
   preparing a plurality of reverse transcription (RT) primers corresponding to the plurality of samples, wherein each RT primer of the plurality of RT primers comprises a sample-specific barcode comprising a sample-specific barcode sequence comprising random nucleotides, wherein no two RT primers have a common sample-specific barcode sequence and each sample-specific barcode sequence is distinguishable from the sample-specific barcodes of each other RT primer, based on a predetermined edit distance;
   performing reverse transcription based on the plurality of samples and the plurality of RT primers;
   generating a plurality of RT reaction products corresponding to the plurality of RT primers based on the performed reverse transcription, wherein each RT reaction product of the plurality of RT reaction products comprises a cDNA with a respective sample-specific barcode, the cDNA of each RT reaction product corresponding to a respective sample of the plurality of samples;
   combining a portion of each RT reaction product of the plurality of RT reaction products in a single container to form a combined RT reaction product;
   performing polymerase chain reaction (PCR) based on the combined RT reaction product;
   generating a plurality sets of amplified cDNAs based on the performed PCR, the plurality sets corresponding to the plurality of RT reaction products, each amplified cDNA of the plurality sets of amplified cDNAs comprising the sample-specific barcode and a pool-specific barcode, the pool-specific barcode corresponding to the combined RT reaction product;
   obtaining a plurality sets of sequencing reads based on the plurality sets of amplified cDNAs, the plurality sets of sequencing reads corresponding to the plurality sets of amplified CDNAs;
   quantifying the plurality sets of sequencing reads; and
   determine a diagnostic outcome of each sample of the plurality of samples based on the quantified plurality of sequencing reads,
   wherein the plurality of samples comprises a sample number greater than 384 and less than or equal to 19,200.

2. The method of claim 1, wherein each sample of the plurality of samples comprises an extracted RNA.

3. The method of claim 1, wherein an RT primer of the plurality of RT primers is selected from Table 1, Table 2, or Table 3.

4. The method of claim 1, wherein an RT primer of the plurality of RT primers hybridizes with a positive control RNA.

5. The method of claim 1, further comprising:
   purifying the combined RT reaction product,
   wherein the performing polymerase chain reaction (PCR) is based on the purified combined RT reaction product.

6. The method of claim 5, wherein the purifying the combined RT reaction product comprises: removing an unused RT primer in the combined RT reaction product.

7. The method of claim 1, wherein a plurality of different sets of amplified cDNAs with a different pool-specific barcode are generated, and
   wherein each amplified cDNA of the plurality of different sets of amplified cDNAs comprises a different sample-specific barcode and the different pool-specific barcode.

8. The method of claim 7, further comprising:
   preparing a first sequencing library from the plurality sets of amplified cDNAs;
   preparing a second sequencing library from the plurality of different sets of amplified CDNAs;
   generating a pooled sequencing library by pooling the first sequencing library and the second sequencing library; and
   obtaining, from a sequencer, a plurality of sequencing reads based on the pooled sequencing library, the plurality of sequencing reads including the sequencing read corresponding based on the first sequencing library and a different sequencing read corresponding to the second sequencing library.

9. The method of claim 1, wherein a Hamming distance between a first sample-specific barcode of a first RT reaction product of the plurality of RT reaction products and a second sample-specific barcode of a second RT reaction product of the plurality of RT reaction products is greater than a predetermined distance.

10. The method of claim 9, wherein the predetermined distance is 2.

11. The method of claim 9, wherein performing PCR comprises using a PCR thermocycler and obtaining a plurality sets of sequencing reads comprises using a next generation sequencer, and wherein the length of the sample-specific barcode and the predetermined distance are based in part on (a) the sample number of the plurality and (b) the error rate of the PCR thermocycler and/or the next generation sequencer.

12. The method of claim 1, wherein a set of the plurality sets of sequencing reads corresponding to a sample of the plurality of samples comprise a plurality subsets of sequencing reads mapped to a plurality of predetermined genes.

13. The method of claim 12, wherein the plurality subsets of sequencing reads comprise N1 mapped reads and RP mapped reads.

14. The method of claim 13, wherein the diagnostic outcome of each sample of the plurality of samples is based on a N1 score of a respective set of the plurality sets of sequencing reads divided by an RP score of the respective set of the plurality sets of sequencing reads,
   wherein the N1 score=(N1−N1 min)/(N1 max−N1 min),
   wherein the RP score=(RP−RP min)/(RP max−RP min),
   where N1 is a number of the N1 mapped reads, RP is a number of the RP mapped reads, N1 min is a minimum number of the N1 mapped reads specific to a RT primer of the plurality of RT primer corresponding to the respective set of the plurality sets of sequencing reads, N1 max is a maximum number of the N1 mapped reads specific to the RT primer, RP min is a minimum number of the RP mapped reads specific to the RT primer, RP max is a maximum number of the RP mapped reads specific to the RT primer.

15. The method of claim 1, wherein in each amplified cDNA of the plurality sets of amplified cDNAs, a primer binding site is disposed between the sample-specific barcode and the pool-specific barcode.

16. A method for parallel detection, comprising:
   obtaining a plurality of samples, wherein the plurality of samples comprises a sample number greater than 384 and less than or equal to 19,200;
   preparing a plurality of reverse transcription (RT) primers corresponding to the plurality of samples, wherein each RT primer of the plurality of RT primers comprises a sample-specific barcode comprising a sample-specific barcode sequence comprising random nucleotides, wherein no two RT primers have a common sample-specific barcode sequence and each sample-specific barcode sequence is distinguishable from the sample-specific barcodes of each other RT primer, based on a predetermined edit distance;

performing reverse transcription based on the plurality of samples and the plurality of RT primers;

generating a plurality of RT reaction products corresponding to the plurality of RT primers based on the performed reverse transcription, wherein each RT reaction product of the plurality of RT reaction products comprises a cDNA with a respective sample-specific barcode, the cDNA of each RT reaction product corresponding to a respective sample of the plurality of samples;

combining a portion of each RT reaction product of the plurality of RT reaction products in a single container to form a combined RT reaction product;

performing polymerase chain reaction (PCR) based on the combined RT reaction product;

generating a plurality sets of amplified cDNAs based on the performed PCR, the plurality sets corresponding to the plurality of RT reaction products, each amplified cDNA of the plurality sets of amplified cDNAs comprising the sample-specific barcode and a pool-specific barcode, the pool-specific barcode corresponding to the combined RT reaction products;

obtaining a plurality sets of sequencing reads based on the plurality sets of amplified cDNAs, the plurality sets of sequencing reads corresponding to the plurality sets of amplified CDNAs;

quantifying the plurality sets of sequencing reads; and determining a diagnostic outcome of each sample of the plurality of samples based on the quantified plurality of sequencing reads, wherein a plurality of different sets of amplified cDNAs with a different pool-specific barcode are generated, wherein each amplified cDNA of the plurality of different sets of amplified cDNAs comprises a different sample-specific barcode and the different pool-specific barcode, and wherein at least one different sample-specific barcode with the different pool-specific barcode reuses a sample-specific barcode of a RT reaction product of the plurality of RT reaction products.

17. A method for parallel detection, comprising:

obtaining a plurality of samples, wherein the plurality of samples comprises a sample number greater than 384 and less than or equal to 19,200;

preparing a plurality of reverse transcription (RT) primers corresponding to the plurality of samples, wherein each RT primer of the plurality of RT primers comprises a sample-specific barcode comprising a sample-specific barcode sequence comprising random nucleotides, wherein no two RT primers have a common sample-specific barcode sequence and each sample-specific barcode sequence is distinguishable from the sample-specific barcodes of each other RT primer, based on a predetermined edit distance;

performing reverse transcription based on the plurality of samples and the plurality of RT primers;

generating a plurality of RT reaction products corresponding to the plurality of RT primers based on the performed reverse transcription, wherein each RT reaction product of the plurality of RT reaction products comprises a cDNA with a respective sample-specific barcode, the cDNA of each RT reaction product corresponding to a respective sample of the plurality of samples;

combining a portion of each RT reaction product of the plurality of RT reaction products in a single container to form a combined RT reaction product;

performing polymerase chain reaction (PCR) based on the combined RT reaction product;

generating a plurality sets of amplified cDNAs based on the performed PCR, the plurality sets corresponding to the plurality of RT reaction products, each amplified cDNA of the plurality sets of amplified cDNAs comprising the sample-specific barcode and a pool-specific barcode, the pool-specific barcode corresponding to the combined RT reaction product;

obtaining a plurality sets of sequencing reads based on the plurality sets of amplified cDNAs, the plurality sets of sequencing reads corresponding to the plurality sets of amplified cDNAs, wherein a set of the plurality sets of sequencing reads corresponding to a sample of the plurality of samples comprise a plurality subsets of sequencing reads mapped to a plurality of predetermined genes, and wherein the plurality subsets of sequencing reads comprise N1 mapped reads and RP mapped reads;

quantifying the plurality sets of sequencing reads; and determining a diagnostic outcome of each sample of the plurality of samples based on the quantified plurality of sequencing reads, wherein the diagnostic outcome of each sample of the plurality of samples is based on a N1 score of a respective set of the plurality sets of sequencing reads divided by an RP score of the respective set of the plurality sets of sequencing reads;

wherein the N1 score=(N1−N1 min)/(N1 max−N1 min), wherein the RP score=(RP−RP min)/(RP max−RP min), where N1 is a number of the N1 mapped reads, RP is a number of the RP mapped reads, N1 min is a minimum number of the N1 mapped reads specific to a RT primer of the plurality of RT primer corresponding to the respective set of the plurality sets of sequencing reads, N1 max is a maximum number of the N1 mapped reads specific to the RT primer, RP min is a minimum number of the RP mapped reads specific to the RT primer, RP max is a maximum number of the RP mapped reads specific to the RT primer, and wherein the diagnostic outcome of each sample of the plurality of samples indicates that a viral RNA is present in a respective sample of the plurality of samples when the N1 score of the respective set of the plurality sets of sequencing reads divided by the RP score of the respective set of the plurality sets of sequencing reads is equal to or more than 1.

* * * * *

SEQUENCE LISTING

<160> NUMBER OF SEQ ID NOS: 582

<210> SEQ ID NO 1
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 1
ggttaattct gatgagcgta ccatgtaccc ttcttgtgcg ttctccattc tggttact          58

<210> SEQ ID NO 2
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 2
ggttaattct gatgagcgta ccacacttga gggtttagcg ttctccattc tggttact          58

<210> SEQ ID NO 3
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 3

```
ggttaattct gatgagcgta ccctaagatg aggtctagcg ttctccattc tggttact      58

<210> SEQ ID NO 4
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 4
ggttaattct gatgagcgta cccctagata gtgcgtagcg ttctccattc tggttact      58

<210> SEQ ID NO 5
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 5
ggttaattct gatgagcgta cccccctgatt atagttagcg ttctccattc tggttact      58

<210> SEQ ID NO 6
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 6
ggttaattct gatgagcgta ccttaattcc tacactggcg ttctccattc tggttact      58

<210> SEQ ID NO 7
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 7
ggttaattct gatgagcgta ccctgtaag agtgttagcg ttctccattc tggttact      58

<210> SEQ ID NO 8
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 8
ggttaattct gatgagcgta ccccttcact ttgcgtagcg ttctccattc tggttact      58

<210> SEQ ID NO 9
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 9
ggttaattct gatgagcgta ccctatgtgt g

<210> SEQ ID NO 10
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 10
ggttaattct gatgagcgta ccctaactta tgtgatagcg ttctccattc tggttact      58

<210> SEQ ID NO 11
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 11
ggttaattct gatgagcgta cccctgttta ttcgttagcg ttctccattc tggttact      58

<210> SEQ ID NO 12
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 12
ggttaattct gatgagcgta ccctattcgt tagtatagcg ttctccattc tggttact      58

<210> SEQ ID NO 13
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 13
ggttaattct gatgagcgta ccctaatatg tatcgtagcg ttctccattc tggttact      58

<210> SEQ ID NO 14
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 14
ggttaattct gatgagcgta ccccactagc gtatttagcg ttctccattc tggttact      58

<210> SEQ ID NO 15
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 15
ggttaattct gatgagcgta cctttatgtc gtgatctgcg ttctccattc tggttact      58

```
<210> SEQ ID NO 16
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 16
ggttaattct gatgagcgta cctactgaga ggatagtgcg ttctccattc tggttact        58

<210> SEQ ID NO 17
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 17
ggttaattct gatgagcgta cccccTgcgt aatcttagcg ttctccattc tggttact        58

<210> SEQ ID NO 18
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 18
ggttaattct gatgagcgta ccttgatagt tcacatagcg ttctccattc tggttact        58

<210> SEQ ID NO 19
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 19
ggttaattct gatgagcgta ccccaccctt atttgtagcg ttctccattc tggttact        58

<210> SEQ ID NO 20
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 20
ggttaattct gatgagcgta cccCttatgt gtatgtagcg ttctccattc tggttact        58

<210> SEQ ID NO 21
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 21
ggttaattct gatgagcgta ccctacttga aatcgtagcg ttctccattc tggttact        58
```

<210> SEQ ID NO 22
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 22
ggttaattct gatgagcgta ccccaacatt tcttatagcg ttctccattc tggttact        58

<210> SEQ ID NO 23
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 23
ggttaattct gatgagcgta ccccatatag atactgagcg ttctccattc tggttact        58

<210> SEQ ID NO 24
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 24
ggttaattct gatgagcgta cccctagtgt gttatgagcg ttctccattc tggttact        58

<210> SEQ ID NO 25
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 25
ggttaattct gatgagcgta ccctatttgt cctatgagcg ttctccattc tggttact        58

<210> SEQ ID NO 26
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 26
ggttaattct gatgagcgta ccctattgta tgtatgagcg ttctccattc tggttact        58

<210> SEQ ID NO 27
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 27
ggttaattct gatgagcgta ccccatactc cctatgagcg ttctccattc tggttact        58

<210> SEQ ID NO 28

```
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 28
ggttaattct gatgagcgta ccctaaactt atgatgagcg ttctccattc tggttact        58

<210> SEQ ID NO 29
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 29
ggttaattct gatgagcgta cccccctaaat tgtatgagcg ttctccattc tggttact       58

<210> SEQ ID NO 30
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 30
ggttaattct gatgagcgta cccgtaattt gtgtatagcg ttctccattc tggttact        58

<210> SEQ ID NO 31
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 31
ggttaattct gatgagcgta ccatatcaat tacaagggcg ttctccattc tggttact        58

<210> SEQ ID NO 32
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 32
ggttaattct gatgagcgta cctgtgcgaa agatattgcg ttctccattc tggttact        58

<210> SEQ ID NO 33
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 33
ggttaattct gatgagcgta cccgtagtga ggatttagcg ttctccattc tggttact        58

<210> SEQ ID NO 34
<211> LENGTH: 58
```

<212> TYPE: DNA
<213> ORGANISM: Artificial Sequence
<220> FEATURE:
<223> OTHER INFORMATION: Synthetic - RT primer for S

```
<213> ORGANISM: Artificial Sequence
<220> FEATURE:
<223> OTHER INFORMATION: Synthetic - RT primer for SARS-CoV-2 N1
      amplicon

<400> SEQUENCE: 40
ggttaattct gatgagcgta ccgtagggat cttgttagcg ttctccattc tggttact      58

<210> SEQ ID NO 41
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 41
ggttaattct gatgagcgta cccgtgatgt atagttagcg ttctccattc tggttact      58

<210> SEQ ID NO 42
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 42
ggttaattct gatgagcgta ccctatcgtt cctgtagcg ttctccattc tggttact       58

<210> SEQ ID NO 43
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 43
ggttaattct gatgagcgta ccctagtata tctacaagcg ttctccattc tggttact      58

<210> SEQ ID NO 44
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 44
ggttaattct gatgagcgta ccccacccta tttacaagcg ttctccattc tggttact      58

<210> SEQ ID NO 45
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 45
ggttaattct gatgagcgta ccctatcgt cctacaagcg ttctccattc tggttact       58

<210> SEQ ID NO 46
<211> LENGTH: 58
<212> TYPE: DNA
<213> ORGANISM: Artificial Sequence
```

<220> FEATURE:
<223> OTHER INFORMATION: Synthetic - RT primer for SARS-CoV-2 N1
      amplicon

<400> SEQUENCE: 46
ggttaattct gatgagcgta ccccctgcgt acaacaagcg ttctccattc tggttact        58

<210> SEQ ID NO 47
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 47
ggttaattct gatgagcgta ccttaggacc catactagcg ttctccattc tggttact        58

<210> SEQ ID NO 48
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 48
ggttaattct gatgagcgta cccccgttat gtcccaagcg ttctccattc tggttact        58

<210> SEQ ID NO 49
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 49
ggttaattct gatgagcgta cccccgttag cgtacaagcg ttctccattc tggttact        58

<210> SEQ ID NO 50
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 50
ggttaattct gatgagcgta ccgtattagg acactgagcg ttctccattc tggttact        58

<210> SEQ ID NO 51
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 51
ggttaattct gatgagcgta ccttaggact gagggttgcg ttctccattc tggttact        58

<210> SEQ ID NO 52
<211> LENGTH: 58
<212> TYPE: DNA
<213> ORGANISM: Artificial Sequence
<220> FEATURE:

<223> OTHER INFORMATION: Synthetic - RT primer for SARS-CoV-2 N1
      amplicon

<400> SEQUENCE: 52
ggttaattct gatgagcgta cccgtgattc cctgatagcg ttctccattc tggttact         58

<210> SEQ ID NO 53
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 53
ggttaattct gatgagcgta ccgtttcctg acactaagcg ttctccattc tggttact         58

<210> SEQ ID NO 54
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 54
ggttaattct gatgagcgta cccctgttgt atgaatagcg ttctccattc tggttact         58

<210> SEQ ID NO 55
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 55
ggttaattct gatgagcgta cccgtaagta ggactaagcg ttctccattc tggttact         58

<210> SEQ ID NO 56
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 56
ggttaattct gatgagcgta ccctatccaa ctatctggcg ttctccattc tggttact         58

<210> SEQ ID NO 57
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 57
ggttaattct gatgagcgta cccctgtatt gcgtctggcg ttctccattc tggttact         58

<210> SEQ ID NO 58
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1 amplicon

<400> SEQUENCE: 58
ggttaattct gatgagcgta ccctaactaa aggtctggcg ttctccattc tggttact    58

<210> SEQ ID NO 59
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 59
ggttaattct gatgagcgta ccatattaaa gtagagtgcg ttctccattc tggttact    58

<210> SEQ ID NO 60
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 60
ggttaattct gatgagcgta cccccttcta gcgtatagcg ttctccattc tggttact    58

<210> SEQ ID NO 61
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 61
ggttaattct gatgagcgta cccccgttga aagatgagcg ttctccattc tggttact    58

<210> SEQ ID NO 62
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 62
ggttaattct gatgagcgta ccctaagtta aatacaagcg ttctccattc tggttact    58

<210> SEQ ID NO 63
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 63
ggttaattct gatgagcgta cccccctgatc caactaagcg ttctccattc tggttact    58

<210> SEQ ID NO 64
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

```
<400> SEQUENCE: 64
ggttaattct gatgagcgta cccctgtgcg aatagtagcg ttctccattc tggttact        58

<210> SEQ ID NO 65
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 65
ggttaattct gatgagcgta cccgtgataa gaggatagcg ttctccattc tggttact        58

<210> SEQ ID NO 66
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 66
ggttaattct gatgagcgta cccctatatg tttcaaagcg ttctccattc tggttact        58

<210> SEQ ID NO 67
<211> LENGTH: 58
<212> TYPE: DNA
<213> ORGANISM: Artificial Sequence
<220> FEATURE -continued

<400> SEQUENCE: 70
ggttaattct gatgagcgta ccctactaag cgataaagcg ttctccattc tggttact        58

<210> SEQ ID NO 71
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 71
ggttaattct gatgagcgta cccctagagt tcacaaagcg ttctccattc tggttact        58

<210> SEQ ID NO 72
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 72
ggttaattct gatgagcgta ccatatcgta aggttgtgcg ttctccattc tggttact        58

<210> SEQ ID NO 73
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 73
ggttaattct gatgagcgta ccttcactat tgatcctgcg ttctccattc tggttact        58

<210> SEQ ID NO 74
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 74
ggttaattct gatgagcgta ccgtatgtat agatcgtgcg ttctccattc tggttact        58

<210> SEQ ID NO 75
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 75
ggttaattct gatgagcgta ccctaactat gctactggcg ttctccattc tggttact        58

<210> SEQ ID NO 76
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 76
ggttaattct gatgagcgta ccgtaaactt gctaaatgcg ttctccattc tggttact        58

<210> SEQ ID NO 77
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 77
ggttaattct gatgagcgta ccctgtgat gctaaatgcg ttctccattc tggttact        58

<210> SEQ ID NO 78
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 78
ggttaattct gatgagcgta ccttctatga atagtatgcg ttctccattc tggttact        58

<210> SEQ ID NO 79
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 79
ggttaattct gatgagcgta cccacccatc ccaactagcg ttctccattc tggttact        58

<210> SEQ ID NO 80
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 80
ggttaattct gatgagcgta cctgcgattt gaaactggcg ttctccattc tggttact        58

<210> SEQ ID NO 81
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 81
ggttaattct gatgagcgta cccaccctac aatcaaagcg ttctccattc tggttact        58

<210> SEQ ID NO 82
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 82

```
ggttaattct gatgagcgta cccccaacta gatcaaagcg ttctccattc tggttact        58

<210> SEQ ID NO 83
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 83
ggttaattct gatgagcgta cccccttcat aaatctggcg ttctccattc tggttact        58

<210> SEQ ID NO 84
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 84
ggttaattct gatgagcgta cctgttgtag tgaaatagcg ttctccattc tggttact        58

<210> SEQ ID NO 85
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 85
ggttaattct gatgagcgta ccacatacca ctaacaagcg ttctccattc tggttact        58

<210> SEQ ID NO 86
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 86
ggttaattct gatgagcgta cctatcggga tcttctagcg ttctccattc tggttact        58

<210> SEQ ID NO 87
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 87
ggttaattct gatgagcgta ccacatacca actttaagcg ttctccattc tggttact        58

<210> SEQ ID NO 88
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 88
ggttaattct gatgagcgta cctgtcgtga tttgatagcg ttctccattc tggttact        58
```

<210> SEQ ID NO 89
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 89
ggttaattct gatgagcgta ccgtgacctt ctactaggcg ttctccattc tggttact         58

<210> SEQ ID NO 90
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 90
ggttaattct gatgagcgta cccattaagt aggattagcg ttctccattc tggttact         58

<210> SEQ ID NO 91
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 91
ggttaattct gatgagcgta cctttagcgt gtacttagcg ttctccattc tggttact         58

<210> SEQ ID NO 92
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 92
ggttaattct gatgagcgta cctgcgattc cctttgagcg ttctccattc tggttact         58

<210> SEQ ID NO 93
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 93
ggttaattct gatgagcgta cctactagga ttatctggcg ttctccattc tggttact         58

<210> SEQ ID NO 94
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 94
ggttaattct gatgagcgta cctttatagt gcgtgtagcg ttctccattc tggttact         58

<210> SEQ ID NO 95
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 95
ggttaattct gatgagcgta ccttccctcc cactttagcg ttctccattc tggttact          58

<210> SEQ ID NO 96
<211> LENGTH: 58
<212> TYPE: DNA
<213> ORGANISM: Artificial Sequence
<220> FEATURE:
<223> OTHER INFORMATION: Synthetic - RT primer for SARS-CoV-2 N1
      amplicon

<400> SEQUENCE: 96
ggttaattct gatgagcgta ccttctaact cgggatagcg ttctccattc tggttact          58

<210> SEQ ID NO 97
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 97
ggttaattct gatgagcgta ccccactatt tcacttatga cttccatgcc aatgcg          56

<210> SEQ ID NO 98
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 98
ggttaattct gatgagcgta ccccacaata caactgatga cttccatgcc aatgcg          56

<210> SEQ ID NO 99
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 99
ggttaattct gatgagcgta ccctaagatg aggtctatga cttccatgcc aatgcg          56

<210> SEQ ID NO 100
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 100
ggttaattct gatgagcgta cccctagata gtgcgtatga cttccatgcc aatgcg          56

```
<210> SEQ ID NO 101
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 101
ggttaattct gatgagcgta cccctgatt atagttatga cttccatgcc aatgcg         56

<210> SEQ ID NO 102
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 102
ggttaattct gatgagcgta ccccataact aatcgtatga cttccatgcc aatgcg         56

<210> SEQ ID NO 103
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 103
ggttaattct gatgagcgta cccctgtaag agtgttatga cttccatgcc aatgcg         56

<210> SEQ ID NO 104
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 104
ggttaattct gatgagcgta cccttcact ttgcgtatga cttccatgcc aatgcg         56

<210> SEQ ID NO 105
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 105
ggttaattct gatgagcgta ccctatgtgt gcgtgtatga cttccatgcc aatgcg         56

<210> SEQ ID NO 106
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 106
ggttaattct gatgagcgta ccctaactta tgtgatatga cttccatgcc aatgcg         56

<210> SEQ ID NO 107
```

```
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 107
ggttaattct gatgagcgta cccctgttta ttcgttatga cttccatgcc aatgcg      56

<210> SEQ ID NO 108
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 108
ggttaattct gatgagcgta ccctattcgt tagtatatga cttccatgcc aatgcg      56

<210> SEQ ID NO 109
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 109
ggttaattct gatgagcgta ccctaatatg tatcgtatga cttccatgcc aatgcg      56

<210> SEQ ID NO 110
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 110
ggttaattct gatgagcgta ccccactagc gtatttatga cttccatgcc aatgcg      56

<210> SEQ ID NO 111
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 111
ggttaattct gatgagcgta cccccaactt acactgatga cttccatgcc aatgcg      56

<210> SEQ ID NO 112
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 112
ggttaattct gatgagcgta ccctaaactc caactatga cttccatgcc aatgcg       56

<210> SEQ ID NO 113
<211> LENGTH: 56
```

```
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 113
ggttaattct gatgagcgta cccsctgcgt aatcttatga cttccatgcc aatgcg        56

<210> SEQ ID NO 114
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 114
ggttaattct gatgagcgta cccctgcgtc ccttgtatga cttccatgcc aatgcg        56

<210> SEQ ID NO 115
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 115
ggttaattct gatgagcgta ccccaccctt atttgtatga cttccatgcc aatgcg        56

<210> SEQ ID NO 116
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 116
ggttaattct gatgagcgta cccsttatgt gtatgtatga cttccatgcc aatgcg        56

<210> SEQ ID NO 117
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 117
ggttaattct gatgagcgta ccctacttga aatcgtatga cttccatgcc aatgcg        56

<210> SEQ ID NO 118
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 118
ggttaattct gatgagcgta ccccaacatt tcttatatga cttccatgcc aatgcg        56

<210> SEQ ID NO 119
<211> LENGTH: 56
<212> TYPE: DNA
```

<213> ORGANISM: Artificial Sequence
<220> FEATURE:
<223> OTHER INFORMATION: Synthetic - RT primer for SARS-CoV-2 N2
      amplicon

<400> SEQUENCE: 119
ggttaattct gatgagcgta ccccatatag atactgatga cttccatgcc aatgcg      56

<210> SEQ ID NO 120
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 120
ggttaattct gatgagcgta cccctagtgt gttatgatga cttccatgcc aatgcg      56

<210> SEQ ID NO 121
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 121
ggttaattct gatgagcgta ccctatttgt cctatgatga cttccatgcc aatgcg      56

<210> SEQ ID NO 122
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 122
ggttaattct gatgagcgta ccctattgta tgtatgatga cttccatgcc aatgcg      56

<210> SEQ ID NO 123
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 123
ggttaattct gatgagcgta ccccatactc cctatgatga cttccatgcc aatgcg      56

<210> SEQ ID NO 124
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 124
ggttaattct gatgagcgta ccctaaactt atgatgatga cttccatgcc aatgcg      56

<210> SEQ ID NO 125
<211> LENGTH: 56
<212> TYPE: DNA
<213> ORGANISM: Artificial Sequence

```
<220> FEATURE:
<223> OTHER INFORMATION: Synthetic - RT primer for SARS-CoV-2 N2
      amplicon

<400> SEQUENCE: 125
ggttaattct gatgagcgta cccccctaaat tgtatgatga cttccatgcc aatgcg       56

<210> SEQ ID NO 126
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 126
ggttaattct gatgagcgta cccgtaattt gtgtatatga cttccatgcc aatgcg       56

<210> SEQ ID NO 127
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 127
ggttaattct gatgagcgta cccccgtatg atgtttatga cttccatgcc aatgcg       56

<210> SEQ ID NO 128
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 128
ggttaattct gatgagcgta cccgtgagtg tgtagtatga cttccatgcc aatgcg       56

<210> SEQ ID NO 129
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 129
ggttaattct gatgagcgta cccgtagtga ggatttatga cttccatgcc aatgcg       56

<210> SEQ ID NO 130
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 130
ggttaattct gatgagcgta cccccgtgtt cctatgatga cttccatgcc aatgcg       56

<210> SEQ ID NO 131
<211> LENGTH: 56
<212> TYPE: DNA
<213> ORGANISM: Artificial Sequence
<220> FEATURE:
```

<223> OTHER INFORMATION: Synthetic - RT primer for SARS-CoV-2 N2
      amplicon

<400> SEQUENCE: 131
ggttaattct gatgagcgta cccgtgtgcg taggatatga cttccatgcc aatgcg        56

<210> SEQ ID NO 132
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 132
ggttaattct gatgagcgta cccgtgtagt tatatgatga cttccatgcc aatgcg        56

<210> SEQ ID NO 133
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 133
ggttaattct gatgagcgta cccgttatta gatactatga cttccatgcc aatgcg        56

<210> SEQ ID NO 134
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 134
ggttaattct gatgagcgta cccgtagata cttgatatga cttccatgcc aatgcg        56

<210> SEQ ID NO 135
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 135
ggttaattct gatgagcgta cccgttagtt cgtgttatga cttccatgcc aatgcg        56

<210> SEQ ID NO 136
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 136
ggttaattct gatgagcgta cccgtgaaat cttcttatga cttccatgcc aatgcg        56

<210> SEQ ID NO 137
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2 amplicon

<400> SEQUENCE: 137
ggttaattct gatgagcgta cccgtgatgt atagttatga cttccatgcc aatgcg        56

<210> SEQ ID NO 138
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 138
ggttaattct gatgagcgta ccctatcgtt tcctgtatga cttccatgcc aatgcg        56

<210> SEQ ID NO 139
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 139
ggttaattct gatgagcgta ccctagtata tctacaatga cttccatgcc aatgcg        56

<210> SEQ ID NO 140
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 140
ggttaattct gatgagcgta ccccacccta tttacaatga cttccatgcc aatgcg        56

<210> SEQ ID NO 141
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 141
ggttaattct gatgagcgta cccctatcgt cctacaatga cttccatgcc aatgcg        56

<210> SEQ ID NO 142
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 142
ggttaattct gatgagcgta ccccctgcgt acaacaatga cttccatgcc aatgcg        56

<210> SEQ ID NO 143
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 143
ggttaattct gatgagcgta cccctataa actataatga cttccatgcc aatgcg        56

<210> SEQ ID NO 144
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 144
ggttaattct gatgagcgta ccccgttat gtcccaatga cttccatgcc aatgcg        56

<210> SEQ ID NO 145
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 145
ggttaattct gatgagcgta ccccgttag cgtacaatga cttccatgcc aatgcg        56

<210> SEQ ID NO 146
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 146
ggttaattct gatgagcgta ccgtattagg acactgatga cttccatgcc aatgcg        56

<210> SEQ ID NO 147
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 147
ggttaattct gatgagcgta cccgtgacaa caactaatga cttccatgcc aatgcg        56

<210> SEQ ID NO 148
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 148
ggttaattct gatgagcgta cccgtgattc cctgatatga cttccatgcc aatgcg        56

<210> SEQ ID NO 149
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 149
ggttaattct gatgagcgta ccgtttcctg acactaatga cttccatgcc aatgcg        56

<210> SEQ ID NO 150
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 150
ggttaattct gatgagcgta cccctgttgt atgaatatga cttccatgcc aatgcg        56

<210> SEQ ID NO 151
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 151
ggttaattct gatgagcgta cccgtaagta ggactaatga cttccatgcc aatgcg        56

<210> SEQ ID NO 152
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 152
ggttaattct gatgagcgta ccctatccaa ctatctgtga cttccatgcc aatgcg        56

<210> SEQ ID NO 153
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 153
ggttaattct gatgagcgta cccctgtatt gcgtctgtga cttccatgcc aatgcg        56

<210> SEQ ID NO 154
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 154
ggttaattct gatgagcgta ccctaactaa aggtctgtga cttccatgcc aatgcg        56

<210> SEQ ID NO 155
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 155
ggttaattct gatgagcgta ccctacctac tctatattga cttccatgcc aatgcg        56

<210> SEQ ID NO 156
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 156
ggttaattct gatgagcgta ccccttcta gcgtatatga cttccatgcc aatgcg         56

<210> SEQ ID NO 157
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 157
ggttaattct gatgagcgta cccccgttga aagatgatga cttccatgcc aatgcg        56

<210> SEQ ID NO 158
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 158
ggttaattct gatgagcgta ccctaagtta aatacaatga cttccatgcc aatgcg        56

<210> SEQ ID NO 159
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 159
ggttaattct gatgagcgta cccctgatc caactaatga cttccatgcc aatgcg         56

<210> SEQ ID NO 160
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 160
ggttaattct gatgagcgta ccctgtgcg aatagtatga cttccatgcc aatgcg         56

<210> SEQ ID NO 161
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 161
ggttaattct gatgagcgta cccgtgataa gaggatatga cttccatgcc aatgcg       56

<210> SEQ ID NO 162
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 162
ggttaattct gatgagcgta cccctatatg tttcaaatga cttccatgcc aatgcg       56

<210> SEQ ID NO 163
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 163
ggttaattct gatgagcgta cccttgcgga ctgtaaatga cttccatgcc aatgcg       56

<210> SEQ ID NO 164
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 164
ggttaattct gatgagcgta cccccctgagt atgtaaatga cttccatgcc aatgcg       56

<210> SEQ ID NO 165
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 165
ggttaattct gatgagcgta cccctaagat gttcaaatga cttccatgcc aatgcg       56

<210> SEQ ID NO 166
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 166
ggttaattct gatgagcgta ccctactaag cgataaatga cttccatgcc aatgcg       56

<210> SEQ ID NO 167
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 167
ggttaattct gatgagcgta cccctagagt tcacaaatga cttccatgcc aatgcg       56

<210> SEQ ID NO 168
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 168
ggttaattct gatgagcgta cccctgtgcg atgtaaatga cttccatgcc aatgcg        56

<210> SEQ ID NO 169
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 169
ggttaattct gatgagcgta ccctaaagat tcccaaatga cttccatgcc aatgcg        56

<210> SEQ ID NO 170
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 170
ggttaattct gatgagcgta cccccttca aatactgtga cttccatgcc aatgcg         56

<210> SEQ ID NO 171
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 171
ggttaattct gatgagcgta ccctaactat gctactgtga cttccatgcc aatgcg        56

<210> SEQ ID NO 172
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 172
ggttaattct gatgagcgta ccgtaaactt gctaaattga cttccatgcc aatgcg        56

<210> SEQ ID NO 173
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 173
ggttaattct gatgagcgta cccctgtgat gctaaattga cttccatgcc aatgcg        56

<210> SEQ ID NO 174
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 174
ggttaattct gatgagcgta cccccatact atcactatga cttccatgcc aatgcg        56

<210> SEQ ID NO 175
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 175
ggttaattct gatgagcgta cccacccatc ccaactatga cttccatgcc aatgcg        56

<210> SEQ ID NO 176
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 176
ggttaattct gatgagcgta cccgttgtaa agtgttatga cttccatgcc aatgcg        56

<210> SEQ ID NO 177
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 177
ggttaattct gatgagcgta cccaccctac aatcaaatga cttccatgcc aatgcg        56

<210> SEQ ID NO 178
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 178
ggttaattct gatgagcgta cccccaacta gatcaaatga cttccatgcc aatgcg        56

<210> SEQ ID NO 179
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 179
ggttaattct gatgagcgta cccccttcat aaatctgtga cttccatgcc aatgcg        56

-continued

<210> SEQ ID NO 180
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 180
ggttaattct gatgagcgta cctgttgtag tgaaatatga cttccatgcc aatgcg            56

<210> SEQ ID NO 181
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 181
ggttaattct gatgagcgta ccttgttcgt tatgttatga cttccatgcc aatgcg            56

<210> SEQ ID NO 182
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 182
ggttaattct gatgagcgta cctatcggga tcttctatga cttccatgcc aatgcg            56

<210> SEQ ID NO 183
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 183
ggttaattct gatgagcgta cctgttcgta aatcgtatga cttccatgcc aatgcg            56

<210> SEQ ID NO 184
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 184
ggttaattct gatgagcgta cctgtcgtga tttgatatga cttccatgcc aatgcg            56

<210> SEQ ID NO 185
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 185
ggttaattct gatgagcgta cctagtgtgt ttcttgatga cttccatgcc aatgcg            56

<210> SEQ ID NO 186

```
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 186
ggttaattct gatgagcgta cccattaagt aggattatga cttccatgcc aatgcg          56

<210> SEQ ID NO 187
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 187
ggttaattct gatgagcgta cctttagcgt gtacttatga cttccatgcc aatgcg          56

<210> SEQ ID NO 188
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 188
ggttaattct gatgagcgta cctgcgattc cctttgatga cttccatgcc aatgcg          56

<210> SEQ ID NO 189
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 189
ggttaattct gatgagcgta cctgtttaat cttctatga cttccatgcc aatgcg           56

<210> SEQ ID NO 190
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 190
ggttaattct gatgagcgta cctttatagt gcgtgtatga cttccatgcc aatgcg          56

<210> SEQ ID NO 191
<211> LENGTH: 56
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 191
ggttaattct gatgagcgta ccttccctcc cactttatga cttccatgcc aatgcg          56

<210> SEQ ID NO 192
<211> LENGTH: 56
```

```
<212> TYPE: DNA
<213> ORGANISM: Artificial Sequence
<220> FEATURE:
<223> OTHER INFORMATION: Synthetic - RT primer for SARS-CoV-2 N2
      amplicon

<400> SEQUENCE: 192
ggttaattct gatgagcgta ccttctaact cgggatatga cttccatgcc aatgcg        56

<210> SEQ ID NO 193
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 193
ggttaattct gatgagcgta ccatgtaccc ttcttgttga gcggctgtct ccac           54

<210> SEQ ID NO 194
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 194
ggttaattct gatgagcgta ccacacttga gggtttatga gcggctgtct ccac           54

<210> SEQ ID NO 195
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 195
ggttaattct gatgagcgta ccctaagatg aggtctatga gcggctgtct ccac           54

<210> SEQ ID NO 196
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 196
ggttaattct gatgagcgta cccctagata gtgcgtatga gcggctgtct ccac           54

<210> SEQ ID NO 197
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 197
ggttaattct gatgagcgta cccccctgatt atagttatga gcggctgtct ccac          54

<210> SEQ ID NO 198
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 198
```

```
ggttaattct gatgagcgta ccttaattcc tacactgtga gcggctgtct ccac        54

<210> SEQ ID NO 199
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 199
ggttaattct gatgagcgta cccctgtaag agtgttatga gcggctgtct ccac        54

<210> SEQ ID NO 200
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 200
ggttaattct gatgagcgta cccccttcact ttgcgtatga gcggctgtct ccac       54

<210> SEQ ID NO 201
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 201
ggttaattct gatgagcgta ccctatgtgt gcgtgtatga gcggctgtct ccac        54

<210> SEQ ID NO 202
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 202
ggttaattct gatgagcgta ccctaactta tgtgatatga gcggctgtct ccac        54

<210> SEQ ID NO 203
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 203
ggttaattct gatgagcgta ccctgttta ttcgttatga gcggctgtct ccac         54

<210> SEQ ID NO 204
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 204
ggttaattct gatgagcgta ccctattcgt tagtatatga gcggctgtct ccac        54

<210> SEQ ID NO 205
<211> LENGTH: 54
<212> TYPE: DNA
```

```
<213> ORGANISM: Artificial Sequence
<220> FEATURE:
<223> OTHER INFORMATION: Synthetic - RT primer for human RNaseP amplicon

<400> SEQUENCE: 205
ggttaattct gatgagcgta ccctaatatg tatcgtatga gcggctgtct ccac        54

<210> SEQ ID NO 206
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 206
ggttaattct gatgagcgta ccccactagc gtatttatga gcggctgtct ccac        54

<210> SEQ ID NO 207
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 207
ggttaattct gatgagcgta cctttatgtc gtgatcttga gcggctgtct ccac        54

<210> SEQ ID NO 208
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 208
ggttaattct gatgagcgta cctactgaga ggatagttga gcggctgtct ccac        54

<210> SEQ ID NO 209
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 209
ggttaattct gatgagcgta cccccctgcgt aatcttatga gcggctgtct ccac       54

<210> SEQ ID NO 210
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 210
ggttaattct gatgagcgta ccttgatagt tcacatatga gcggctgtct ccac        54

<210> SEQ ID NO 211
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 211
ggttaattct gatgagcgta ccccaccctt atttgtatga gcggctgtct ccac        54
```

<210> SEQ ID NO 212
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 212
ggttaattct gatgagcgta cccettatgt gtatgtatga gcggctgtct ccac        54

<210> SEQ ID NO 213
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 213
ggttaattct gatgagcgta ccctacttga aatcgtatga gcggctgtct ccac        54

<210> SEQ ID NO 214
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 214
ggttaattct gatgagcgta ccccaacatt tcttatatga gcggctgtct ccac        54

<210> SEQ ID NO 215
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 215
ggttaattct gatgagcgta ccccatatag atactgatga gcggctgtct ccac        54

<210> SEQ ID NO 216
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 216
ggttaattct gatgagcgta ccccctagtgt gttatgatga gcggctgtct ccac       54

<210> SEQ ID NO 217
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 217
ggttaattct gatgagcgta ccctatttgt cctatgatga gcggctgtct ccac        54

<210> SEQ ID NO 218
<211> LENGTH: 54
<212> TYPE: DNA
<213> ORGANISM: Artificial Sequence
<220> FEATURE:

-continued

<223> OTHER INFORMATION: Synthetic - RT primer for human RNaseP amplicon

<400> SEQUENCE: 218
ggttaattct gatgagcgta ccctattgta tgtatgatga gcggctgtct ccac    54

<210> SEQ ID NO 219
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 219
ggttaattct gatgagcgta ccccatactc cctatgatga gcggctgtct ccac    54

<210> SEQ ID NO 220
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 220
ggttaattct gatgagcgta ccctaaactt atgatgatga gcggctgtct ccac    54

<210> SEQ ID NO 221
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 221
ggttaattct gatgagcgta cccctaaat tgtatgatga gcggctgtct ccac    54

<210> SEQ ID NO 222
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 222
ggttaattct gatgagcgta cccgtaattt gtgtatatga gcggctgtct ccac    54

<210> SEQ ID NO 223
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 223
ggttaattct gatgagcgta ccatatcaat tacaaggtga gcggctgtct ccac    54

<210> SEQ ID NO 224
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 224
ggttaattct gatgagcgta cctgtgcgaa agatatttga gcggctgtct ccac    54

```
<210> SEQ ID NO 225
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 225
ggttaattct gatgagcgta cccgtagtga ggatttatga gcggctgtct ccac          54

<210> SEQ ID NO 226
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 226
ggttaattct gatgagcgta cccccgtgtt cctatgatga gcggctgtct ccac          54

<210> SEQ ID NO 227
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 227
ggttaattct gatgagcgta cccgtgtgcg taggatatga gcggctgtct ccac          54

<210> SEQ ID NO 228
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 228
ggttaattct gatgagcgta cccgtgtagt tatatgatga gcggctgtct ccac          54

<210> SEQ ID NO 229
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 229
ggttaattct gatgagcgta ccttcaatct tattcggtga gcggctgtct ccac          54

<210> SEQ ID NO 230
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 230
ggttaattct gatgagcgta cccgtagata cttgatatga gcggctgtct ccac          54

<210> SEQ ID NO 231
<211> LENGTH: 54
<212> TYPE: DNA
<213> ORGANISM: Artificial Sequence
<220> FEATURE:
<223> OTHER INFORMATION: Synthetic - RT primer for human RNaseP amplicon
```

<400> SEQUENCE: 231
ggttaattct gatgagcgta ccacatttga tatatgatga gcggctgtct ccac    54

<210> SEQ ID NO 232
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 232
ggttaattct gatgagcgta ccgtagggat cttgttatga gcggctgtct ccac    54

<210> SEQ ID NO 233
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 233
ggttaattct gatgagcgta cccgtgatgt atagttatga gcggctgtct ccac    54

<210> SEQ ID NO 234
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 234
ggttaattct gatgagcgta ccctatcgtt cctgtatga gcggctgtct ccac    54

<210> SEQ ID NO 235
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 235
ggttaattct gatgagcgta ccctagtata tctacaatga gcggctgtct ccac    54

<210> SEQ ID NO 236
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 236
ggttaattct gatgagcgta ccccacccta tttacaatga gcggctgtct ccac    54

<210> SEQ ID NO 237
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 237
ggttaattct gatgagcgta cccctatcgt cctacaatga gcggctgtct ccac    54

<210> SEQ ID NO 238
<211> LENGTH: 54

```
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 238
ggttaattct gatgagcgta cccctgcgt acaacaatga gcggctgtct ccac            54

<210> SEQ ID NO 239
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 239
ggttaattct gatgagcgta ccttaggacc catactatga gcggctgtct ccac            54

<210> SEQ ID NO 240
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 240
ggttaattct gatgagcgta cccccgttat gtcccaatga gcggctgtct ccac            54

<210> SEQ ID NO 241
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 241
ggttaattct gatgagcgta cccccgttag cgtacaatga gcggctgtct ccac            54

<210> SEQ ID NO 242
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 242
ggttaattct gatgagcgta ccgtattagg acactgatga gcggctgtct ccac            54

<210> SEQ ID NO 243
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 243
ggttaattct gatgagcgta ccttaggact gagggtttga gcggctgtct ccac            54

<210> SEQ ID NO 244
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 244
```
ggttaattct gatgagcgta cccgtgattc cctgatatga gcggctgtct ccac    54

<210> SEQ ID NO 245
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 245
ggttaattct gatgagcgta ccgtttcctg acactaatga gcggctgtct ccac    54

<210> SEQ ID NO 246
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 246
ggttaattct gatgagcgta cccctgttgt atgaatatga gcggctgtct ccac    54

<210> SEQ ID NO 247
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 247
ggttaattct gatgagcgta cccgtaagta ggactaatga gcggctgtct ccac    54

<210> SEQ ID NO 248
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 248
ggttaattct gatgagcgta ccctatccaa ctatctgtga gcggctgtct ccac    54

<210> SEQ ID NO 249
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 249
ggttaattct gatgagcgta cccctgtatt gcgtctgtga gcggctgtct ccac    54

<210> SEQ ID NO 250
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 250
ggttaattct gatgagcgta ccctaactaa aggtctgtga gcggctgtct ccac    54

<210> SEQ ID NO 251
<211> LENGTH: 54
<212> TYPE: DNA
<213> ORGANISM: Artificial Sequence

```
<220> FEATURE:
<223> OTHER INFORMATION: Synthetic - RT primer for human RNaseP amplicon

<400> SEQUENCE: 251
ggttaattct gatgagcgta ccatattaaa gtagagttga gcggctgtct ccac          54

<210> SEQ ID NO 252
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 252
ggttaattct gatgagcgta ccccttcta gcgtatatga gcggctgtct ccac           54

<210> SEQ ID NO 253
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 253
ggttaattct gatgagcgta cccccgttga aagatgatga gcggctgtct ccac          54

<210> SEQ ID NO 254
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 254
ggttaattct gatgagcgta ccctaagtta aatacaatga gcggctgtct ccac          54

<210> SEQ ID NO 255
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 255
ggttaattct gatgagcgta cccccctgatc caactaatga gcggctgtct ccac         54

<210> SEQ ID NO 256
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 256
ggttaattct gatgagcgta ccctgtgcg aatagtatga gcggctgtct ccac           54

<210> SEQ ID NO 257
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 257
ggttaattct gatgagcgta cccgtgataa gaggatatga gcggctgtct ccac          54
```

<210> SEQ ID NO 258
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 258
ggttaattct gatgagcgta cccctatatg tttcaaatga gcggctgtct ccac        54

<210> SEQ ID NO 259
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 259
ggttaattct gatgagcgta cccttgcgga ctgtaaatga gcggctgtct ccac        54

<210> SEQ ID NO 260
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 260
ggttaattct gatgagcgta cccctgagt atgtaaatga gcggctgtct ccac        54

<210> SEQ ID NO 261
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 261
ggttaattct gatgagcgta cccctaagat gttcaaatga gcggctgtct ccac        54

<210> SEQ ID NO 262
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 262
ggttaattct gatgagcgta ccctactaag cgataaatga gcggctgtct ccac        54

<210> SEQ ID NO 263
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 263
ggttaattct gatgagcgta ccctagagt tcacaaatga gcggctgtct ccac        54

<210> SEQ ID NO 264
<211> LENGTH: 54
<212> TYPE: DNA
<213> ORGANISM: Artificial Sequence
<220> FEATURE:
<223> OTHER INFORMATION: Synthetic - RT primer for human RNaseP amplicon -continued

<400> SEQUENCE: 264
ggttaattct gatgagcgta ccatatcgta aggttgttga gcggctgtct ccac    54

<210> SEQ ID NO 265
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 265
ggttaattct gatgagcgta ccttcactat tgatccttga gcggctgtct ccac    54

<210> SEQ ID NO 266
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 266
ggttaattct gatgagcgta ccgtatgtat agatcgttga gcggctgtct ccac    54

<210> SEQ ID NO 267
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 267
ggttaattct gatgagcgta ccctaactat gctactgtga gcggctgtct ccac    54

<210> SEQ ID NO 268
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 268
ggttaattct gatgagcgta ccgtaaactt gctaaattga gcggctgtct ccac    54

<210> SEQ ID NO 269
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 269
ggttaattct gatgagcgta cccctgtgat gctaaattga gcggctgtct ccac    54

<210> SEQ ID NO 270
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 270
ggttaattct gatgagcgta ccttctatga atagtattga gcggctgtct ccac    54

<210> SEQ ID NO 271

```
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 271
ggttaattct gatgagcgta cccacccatc ccaactatga gcggctgtct ccac       54

<210> SEQ ID NO 272
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 272
ggttaattct gatgagcgta cctgcgattt gaaactgtga gcggctgtct ccac       54

<210> SEQ ID NO 273
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 273
ggttaattct gatgagcgta cccaccctac aatcaaatga gcggctgtct ccac       54

<210> SEQ ID NO 274
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 274
ggttaattct gatgagcgta cccccaacta gatcaaatga gcggctgtct ccac       54

<210> SEQ ID NO 275
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 275
ggttaattct gatgagcgta cccccttcat aaatctgtga gcggctgtct ccac       54

<210> SEQ ID NO 276
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 276
ggttaattct gatgagcgta cctgttgtag tgaaatatga gcggctgtct ccac       54

<210> SEQ ID NO 277
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 277
```

```
ggttaattct gatgagcgta ccacatacca ctaacaatga gcggctgtct ccac         54
```

<210> SEQ ID NO 278
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 278

```
ggttaattct gatgagcgta cctatcggga tcttctatga gcggctgtct ccac         54
```

<210> SEQ ID NO 279
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 279

```
ggttaattct gatgagcgta ccacatacca actttaatga gcggctgtct ccac         54
```

<210> SEQ ID NO 280
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 280

```
ggttaattct gatgagcgta cctgtcgtga tttgatatga gcggctgtct ccac         54
```

<210> SEQ ID NO 281
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 281

```
ggttaattct gatgagcgta ccgtgacctt ctactagtga gcggctgtct ccac         54
```

<210> SEQ ID NO 282
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 282

```
ggttaattct gatgagcgta cccattaagt aggattatga gcggctgtct ccac         54
```

<210> SEQ ID NO 283
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 283

```
ggttaattct gatgagcgta cctttagcgt gtacttatga gcggctgtct ccac         54
```

<210> SEQ ID NO 284
<211> LENGTH: 54
<212> TYPE: DNA

```
<213> ORGANISM: Artificial Sequence
<220> FEATURE:
<223> OTHER INFORMATION: Synthetic - RT primer for human RNaseP amplicon

<400> SEQUENCE: 284
ggttaattct gatgagcgta cctgcgattc cctttgatga gcggctgtct ccac        54

<210> SEQ ID NO 285
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 285
ggttaattct gatgagcgta cctactagga ttatctgtga gcggctgtct ccac        54

<210> SEQ ID NO 286
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 286
ggttaattct gatgagcgta cctttatagt gcgtgtatga gcggctgtct ccac        54

<210> SEQ ID NO 287
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 287
ggttaattct gatgagcgta ccttccctcc cactttatga gcggctgtct ccac        54

<210> SEQ ID NO 288
<211> LENGTH: 54
<212> TYPE: DNA
<213> ORGANISM: Artificial Sequence
<220> FEATURE:
<223> OTHER INFORMATION: Synthetic - RT primer for human RNaseP amplicon

<400> SEQUENCE: 288
ggttaattct gatgagcgta ccttctaact cgggatatga gcggctgtct ccac        54

<210> SEQ ID NO 289
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 289
atgtaccctt cttgt                                                   15

<210> SEQ ID NO 290
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 290
acacttgagg gttta                                                   15
```

```
<210> SEQ ID NO 291
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 291
ctaagatgag gtcta                                                    15

<210> SEQ ID NO 292
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 292
cctagatagt gcgta                                                    15

<210> SEQ ID NO 293
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 293
ccctgattat agtta                                                    15

<210> SEQ ID NO 294
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 294
ttaattccta cactg                                                    15

<210> SEQ ID NO 295
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 295
cctgtaagag tgtta                                                    15

<210> SEQ ID NO 296
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 296
ccttcacttt gcgta                                                    15

<210> SEQ ID NO 297
<211> LENGTH: 15
<212> TYPE: DNA
<213> ORGANISM: Artificial Sequence
<220> FEATURE:
```

```
<223> OTHER INFORMATION: Synthetic - Well-specific barcode

<400> SEQUENCE: 297
ctatgtgtgc gtgta                                                15

<210> SEQ ID NO 298
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 298
ctaacttatg tgata                                                15

<210> SEQ ID NO 299
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 299
cctgtttatt cgtta                                                15

<210> SEQ ID NO 300
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 300
ctattcgtta gtata                                                15

<210> SEQ ID NO 301
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 301
ctaatatgta tcgta                                                15

<210> SEQ ID NO 302
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 302
ccactagcgt attta                                                15

<210> SEQ ID NO 303
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 303
tttatgtcgt gatct                                                15
```

```
<210> SEQ ID NO 304
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 304
tactgagagg atagt                                                    15

<210> SEQ ID NO 305
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 305
ccctgcgtaa tctta                                                    15

<210> SEQ ID NO 306
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 306
ttgatagttc acata                                                    15

<210> SEQ ID NO 307
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 307
ccacccttat ttgta                                                    15

<210> SEQ ID NO 308
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 308
ccttatgtgt atgta                                                    15

<210> SEQ ID NO 309
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 309
ctacttgaaa tcgta                                                    15

<210> SEQ ID NO 310
<211> LENGTH: 15
<212> TYPE: DNA
<213> ORGANISM: Artificial Sequence
<220> FEATURE:
<223> OTHER INFORMATION: Synthetic - Well-specific barcode
```

<400> SEQUENCE: 310
ccaacatttc ttata                                                        15

<210> SEQ ID NO 311
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 311
ccatatagat actga                                                        15

<210> SEQ ID NO 312
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 312
cctagtgtgt tatga                                                        15

<210> SEQ ID NO 313
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 313
ctatttgtcc tatga                                                        15

<210> SEQ ID NO 314
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 314
ctattgtatg tatga                                                        15

<210> SEQ ID NO 315
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 315
ccatactccc tatga                                                        15

<210> SEQ ID NO 316
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 316
ctaaacttat gatga                                                        15

<210> SEQ ID NO 317
<211> LENGTH: 15

-continued

```
<212> TYPE: DNA
<213> ORGANISM: Artificial Sequence
<220> FEATURE:
<223> OTHER INFORMATION: Synthetic - Well-specific barcode

<400> SEQUENCE: 317
ccctaaattg tatga                                                    15

<210> SEQ ID NO 318
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 318
cgtaatttgt gtata                                                    15

<210> SEQ ID NO 319
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 319
atatcaatta caagg                                                    15

<210> SEQ ID NO 320
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 320
tgtgcgaaag atatt                                                    15

<210> SEQ ID NO 321
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 321
cgtagtgagg attta                                                    15

<210> SEQ ID NO 322
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 322
cccgtgttcc tatga                                                    15

<210> SEQ ID NO 323
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 323
```
cgtgtgcgta ggata                                                    15

<210> SEQ ID NO 324
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 324
cgtgtagtta tatga                                                    15

<210> SEQ ID NO 325
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 325
ttcaatctta ttcgg                                                    15

<210> SEQ ID NO 326
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 326
cgtagatact tgata                                                    15

<210> SEQ ID NO 327
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 327
acatttgata tatga                                                    15

<210> SEQ ID NO 328
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 328
gtagggatct tgtta                                                    15

<210> SEQ ID NO 329
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 329
cgtgatgtat agtta                                                    15

<210> SEQ ID NO 330
<211> LENGTH: 15
<212> TYPE: DNA
<213> ORGANISM: Artificial Sequence

```
<220> FEATURE:
<223> OTHER INFORMATION: Synthetic - Well-specific barcode

<400> SEQUENCE: 330
ctatcgtttc ctgta                                                          15

<210> SEQ ID NO 331
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 331
ctagtatatc tacaa                                                          15

<210> SEQ ID NO 332
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 332
ccaccctatt tacaa                                                          15

<210> SEQ ID NO 333
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 333
cctatcgtcc tacaa                                                          15

<210> SEQ ID NO 334
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 334
ccctgcgtac aacaa                                                          15

<210> SEQ ID NO 335
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 335
ttaggaccca tacta                                                          15

<210> SEQ ID NO 336
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 336
cccgttatgt cccaa                                                          15
```

```
<210> SEQ ID NO 337
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 337
cccgttagcg tacaa                                                    15

<210> SEQ ID NO 338
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 338
gtattaggac actga                                                    15

<210> SEQ ID NO 339
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 339
ttaggactga gggtt                                                    15

<210> SEQ ID NO 340
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 340
cgtgattccc tgata                                                    15

<210> SEQ ID NO 341
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 341
gtttcctgac actaa                                                    15

<210> SEQ ID NO 342
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 342
cctgttgtat gaata                                                    15

<210> SEQ ID NO 343
<211> LENGTH: 15
<212> TYPE: DNA
<213> ORGANISM: Artificial Sequence
<220> FEATURE:
<223> OTHER INFORMATION: Synthetic - Well-specific barcode
```

```
<400> SEQUENCE: 343
cgtaagtagg actaa                                                     15

<210> SEQ ID NO 344
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 344
ctatccaact atctg                                                     15

<210> SEQ ID NO 345
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 345
cctgtattgc gtctg                                                     15

<210> SEQ ID NO 346
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 346
ctaactaaag gtctg                                                     15

<210> SEQ ID NO 347
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 347
atattaaagt agagt                                                     15

<210> SEQ ID NO 348
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 348
cccttctagc gtata                                                     15

<210> SEQ ID NO 349
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 349
cccgttgaaa gatga                                                     15

<210> SEQ ID NO 350
```

```
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 350
ctaagttaaa tacaa                                                      15

<210> SEQ ID NO 351
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 351
ccctgatcca actaa                                                      15

<210> SEQ ID NO 352
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 352
cctgtgcgaa tagta                                                      15

<210> SEQ ID NO 353
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 353
cgtgataaga ggata                                                      15

<210> SEQ ID NO 354
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 354
cctatatgtt tcaaa                                                      15

<210> SEQ ID NO 355
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 355
cttgcggact gtaaa                                                      15

<210> SEQ ID NO 356
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 356
```
ccctgagtat gtaaa                                                    15

<210> SEQ ID NO 357
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 357
cctaagatgt tcaaa                                                    15

<210> SEQ ID NO 358
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 358
ctactaagcg ataaa                                                    15

<210> SEQ ID NO 359
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 359
cctagagttc acaaa                                                    15

<210> SEQ ID NO 360
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 360
atatcgtaag gttgt                                                    15

<210> SEQ ID NO 361
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 361
ttcactattg atcct                                                    15

<210> SEQ ID NO 362
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 362
gtatgtatag atcgt                                                    15

<210> SEQ ID NO 363
<211> LENGTH: 15
<212> TYPE: DNA

```
<213> ORGANISM: Artificial Sequence
<220> FEATURE:
<223> OTHER INFORMATION: Synthetic - Well-specific barcode

<400> SEQUENCE: 363
ctaactatgc tactg                                              15

<210> SEQ ID NO 364
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 364
gtaaacttgc taaat                                              15

<210> SEQ ID NO 365
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 365
cctgtgatgc taaat                                              15

<210> SEQ ID NO 366
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 366
ttctatgaat agtat                                              15

<210> SEQ ID NO 367
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 367
cacccatccc aacta                                              15

<210> SEQ ID NO 368
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 368
tgcgatttga aactg                                              15

<210> SEQ ID NO 369
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 369
caccctacaa tcaaa                                              15
```

<210> SEQ ID NO 370
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 370
cccaactaga tcaaa                                                    15

<210> SEQ ID NO 371
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 371
cccttcataa atctg                                                    15

<210> SEQ ID NO 372
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 372
tgttgtagtg aaata                                                    15

<210> SEQ ID NO 373
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 373
acataccact aacaa                                                    15

<210> SEQ ID NO 374
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 374
tatcgggatc ttcta                                                    15

<210> SEQ ID NO 375
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 375
acataccaac tttaa                                                    15

<210> SEQ ID NO 376
<211> LENGTH: 15
<212> TYPE: DNA
<213> ORGANISM: Artificial Sequence
<220> FEATURE:

-continued

<223> OTHER INFORMATION: Synthetic - Well-specific barcode

<400> SEQUENCE: 376
tgtcgtgatt tgata                                      15

<210> SEQ ID NO 377
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 377
gtgaccttct actag                                      15

<210> SEQ ID NO 378
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 378
cattaagtag gatta                                      15

<210> SEQ ID NO 379
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 379
tttagcgtgt actta                                      15

<210> SEQ ID NO 380
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 380
tgcgattccc tttga                                      15

<210> SEQ ID NO 381
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 381
tactaggatt atctg                                      15

<210> SEQ ID NO 382
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 382
tttatagtgc gtgta                                      15

<210> SEQ ID NO 383
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 383
ttccctccca cttta                                                    15

<210> SEQ ID NO 384
<211> LENGTH: 15
<212> TYPE: DNA
<213> ORGANISM: Artificial Sequence
<220> FEATURE:
<223> OTHER INFORMATION: Synthetic - Well-specific barcode

<400> SEQUENCE: 384
ttctaactcg ggata                                                    15

<210> SEQ ID NO 385
<211> LENGTH: 93
<212> TYPE: DNA
<213> ORGANISM: Artificial Sequence
<220> FEATURE:
<223> OTHER INFORMATION: Synthetic - Pooled PCR primer

<400> SEQUENCE: 385
aatgatacgg cgaccaccga gatctacacc gctccacgat cgtcggcagc gtcagatgtg   60
tataagagac aggaccccaa atcagcgaa atg                                 93

<210> SEQ ID NO 386
<211> LENGTH: 96
<212> TYPE: DNA
<213> ORGANISM: Artificial Sequence
<220> FEATURE:
<223> OTHER INFORMATION: Synthetic - Pooled PCR primer

<400> SEQUENCE: 386
aatgatacgg cgaccaccga gatctacacc gctccacgat cgtcggcagc gtcagatgtg   60
tataagagac agaaggaact gattacaaac attggc                             96

<210> SEQ ID NO 387
<211> LENGTH: 90
<212> TYPE: DNA
<213> ORGANISM: Artificial Sequence
<220> FEATURE:
<223> OTHER INFORMATION: Synthetic - Pooled PCR primer

<400> SEQUENCE: 387
aatgatacgg cgaccaccga gatctacacc gctccacgat cgtcggcagc gtcagatgtg   60
tataagagac aggatttgga cctgcgagcg                                    90

<210> SEQ ID NO 388
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 388
caagcagaag acggcatacg agatcgctca gttcgtctcg tgggctcgga gatgtgtata   60
agagacagag actgatatag tacataaagg ttaattctga tgagcgtacc              110

<210> SEQ ID NO 389
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 389
caagcagaag acggcatacg agatcgctca gttcgtctcg tgggctcgga gatgtgtata    60
agagacagag acttagcgtc gggatatagg ttaattctga tgagcgtacc              110

<210> SEQ ID NO 390
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 390
caagcagaag acggcatacg agatcgctca gttcgtctcg tgggctcgga gatgtgtata    60
agagacagag acttccgtga gtgagttagg ttaattctga tgagcgtacc              110

<210> SEQ ID NO 391
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 391
caagcagaag acggcatacg agatcgctca gttcgtctcg tgggctcgga gatgtgtata    60
agagacagag actgggtgag tagtgcgtgg ttaattctga tgagcgtacc              110

<210> SEQ ID NO 392
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 392
caagcagaag acggcatacg agatcgctca gttcgtctcg tgggctcgga gatgtgtata    60
agagacagag actctcggaa tatataaggg ttaattctga tgagcgtacc              110

<210> SEQ ID NO 393
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 393
caagcagaag acggcatacg agatcgctca gttcgtctcg tgggctcgga gatgtgtata    60
agagacagag acttgcgtcg tagggattgg ttaattctga tgagcgtacc              110

<210> SEQ ID NO 394
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 394

```
caagcagaag acggcatacg agatcgctca gttcgtctcg tgggctcgga gatgtgtata    60
agagacagag acttgatcgt agtatgatgg ttaattctga tgagcgtacc             110

<210> SEQ ID NO 395
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 395
caagcagaag acggcatacg agatcgctca gttcgtctcg tgggctcgga gatgtgtata    60
agagacagag actggattat attgatatgg ttaattctga tgagcgtacc             110

<210> SEQ ID NO 396
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 396
caagcagaag acggcatacg agatcgctca gttcgtctcg tgggctcgga gatgtgtata    60
agagacagag acttatcgga aagaaatagg ttaattctga tgagcgtacc             110

<210> SEQ ID NO 397
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 397
caagcagaag acggcatacg agatcgctca gttcgtctcg tgggctcgga gatgtgtata    60
agagacagag acttcgtaaa tccaactagg ttaattctga tgagcgtacc             110

<210> SEQ ID NO 398
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 398
caagcagaag acggcatacg agatcgctca gttcgtctcg tgggctcgga gatgtgtata    60
agagacagag actgtgttaa gaggtctagg ttaattctga tgagcgtacc             110

<210> SEQ ID NO 399
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 399
caagcagaag acggcatacg agatcgctca gttcgtctcg tgggctcgga gatgtgtata    60
agagacagag actcattatt gcgtgtcggg ttaattctga tgagcgtacc             110

<210> SEQ ID NO 400
<211> LENGTH: 110
<212> TYPE: DNA
```

```
<213> ORGANISM: Artificial Sequence
<220> FEATURE:
<223> OTHER INFORMATION: Synthetic - Pooled PCR primer

<400> SEQUENCE: 400
caagcagaag acggcatacg agatcgctca gttcgtctcg tgggctcgga gatgtgtata      60
agagacagag acttctaccc tatactaagg ttaattctga tgagcgtacc                 110

<210> SEQ ID NO 401
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 401
caagcagaag acggcatacg agatcgctca gttcgtctcg tgggctcgga gatgtgtata      60
agagacagag acttttcacc tacaaactgg ttaattctga tgagcgtacc                 110

<210> SEQ ID NO 402
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 402
caagcagaag acggcatacg agatcgctca gttcgtctcg tgggctcgga gatgtgtata      60
agagacagag actatgtgta gcgtccctgg ttaattctga tgagcgtacc                 110

<210> SEQ ID NO 403
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 403
caagcagaag acggcatacg agatcgctca gttcgtctcg tgggctcgga gatgtgtata      60
agagacagag actaaatagt tgacataagg ttaattctga tgagcgtacc                 110

<210> SEQ ID NO 404
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 404
caagcagaag acggcatacg agatcgctca gttcgtctcg tgggctcgga gatgtgtata      60
agagacagag acttttcttg tgaccctcgg ttaattctga tgagcgtacc                 110

<210> SEQ ID NO 405
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 405
caagcagaag acggcatacg agatcgctca gttcgtctcg tgggctcgga gatgtgtata      60
agagacagag actcggatac ttagttaagg ttaattctga tgagcgtacc                 110
```

<210> SEQ ID NO 406
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 406
caagcagaag acggcatacg agatcgctca gttcgtctcg tgggctcgga gatgtgtata    60
agagacagag acttttcacc cttacatagg ttaattctga tgagcgtacc              110

<210> SEQ ID NO 407
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 407
caagcagaag acggcatacg agatcgctca gttcgtctcg tgggctcgga gatgtgtata    60
agagacagag acttgtactc ctattgttgg ttaattctga tgagcgtacc              110

<210> SEQ ID NO 408
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 408
caagcagaag acggcatacg agatcgctca gttcgtctcg tgggctcgga gatgtgtata    60
agagacagag actctcgtaa atctatcggg ttaattctga tgagcgtacc              110

<210> SEQ ID NO 409
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 409
caagcagaag acggcatacg agatcgctca gttcgtctcg tgggctcgga gatgtgtata    60
agagacagag actcctaatt gatgatgcgg ttaattctga tgagcgtacc              110

<210> SEQ ID NO 410
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 410
caagcagaag acggcatacg agatcgctca gttcgtctcg tgggctcgga gatgtgtata    60
agagacagag actgggaatc taatactggg ttaattctga tgagcgtacc              110

<210> SEQ ID NO 411
<211> LENGTH: 110
<212> TYPE: DNA
<213> ORGANISM: Artificial Sequence
<220> FEATURE:
<223> OTHER INFORMATION: Synthetic - Pooled PCR primer

```
<400> SEQUENCE: 411
caagcagaag acggcatacg agatcgctca gttcgtctcg tgggctcgga gatgtgtata      60
agagacagag acttaaaggt tgaggattgg ttaattctga tgagcgtacc                110

<210> SEQ ID NO 412
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 412
caagcagaag acggcatacg agatcgctca gttcgtctcg tgggctcgga gatgtgtata      60
agagacagag actaccgtga gtatttaagg ttaattctga tgagcgtacc                110

<210> SEQ ID NO 413
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 413
caagcagaag acggcatacg agatcgctca gttcgtctcg tgggctcgga gatgtgtata      60
agagacagag acttagcgta tccttagtgg ttaattctga tgagcgtacc                110

<210> SEQ ID NO 414
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 414
caagcagaag acggcatacg agatcgctca gttcgtctcg tgggctcgga gatgtgtata      60
agagacagag actgggttca ataaactggg ttaattctga tgagcgtacc                110

<210> SEQ ID NO 415
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 415
caagcagaag acggcatacg agatcgctca gttcgtctcg tgggctcgga gatgtgtata      60
agagacagag acttaggaca agattagtgg ttaattctga tgagcgtacc                110

<210> SEQ ID NO 416
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 416
caagcagaag acggcatacg agatcgctca gttcgtctcg tgggctcgga gatgtgtata      60
agagacagag acttcggact aactaactgg ttaattctga tgagcgtacc                110

<210> SEQ ID NO 417
<211> LENGTH: 110
```

```
<212> TYPE: DNA
<213> ORGANISM: Artificial Sequence
<220> FEATURE:
<223> OTHER INFORMATION: Synthetic - Pooled PCR primer

<400> SEQUENCE: 417
caagcagaag acggcatacg agatcgctca gttcgtctcg tgggctcgga gatgtgtata    60
agagacagag acttaggaat atcgggttgg ttaattctga tgagcgtacc              110

<210> SEQ ID NO 418
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 418
caagcagaag acggcatacg agatcgctca gttcgtctcg tgggctcgga gatgtgtata    60
agagacagag actgggtgag gtttaagtgg ttaattctga tgagcgtacc              110

<210> SEQ ID NO 419
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 419
caagcagaag acggcatacg agatcgctca gttcgtctcg tgggctcgga gatgtgtata    60
agagacagag acttttaata actccctcgg ttaattctga tgagcgtacc              110

<210> SEQ ID NO 420
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 420
caagcagaag acggcatacg agatcgctca gttcgtctcg tgggctcgga gatgtgtata    60
agagacagag actcatatat aagtgtcggg ttaattctga tgagcgtacc              110

<210> SEQ ID NO 421
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 421
caagcagaag acggcatacg agatcgctca gttcgtctcg tgggctcgga gatgtgtata    60
agagacagag actcggaact aaattgatgg ttaattctga tgagcgtacc              110

<210> SEQ ID NO 422
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 422
caagcagaag acggcatacg agatcgctca gttcgtctcg tgggctcgga gatgtgtata    60
```
agagacagag actgtgtagc gagttgatgg ttaattctga tgagcgtacc          110

<210> SEQ ID NO 423
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 423
caagcagaag acggcatacg agatcgctca gttcgtctcg tgggctcgga gatgtgtata    60
agagacagag actttctaca tcgtataggg ttaattctga tgagcgtacc          110

<210> SEQ ID NO 424
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 424
caagcagaag acggcatacg agatcgctca gttcgtctcg tgggctcgga gatgtgtata    60
agagacagag actggataat gagggattgg ttaattctga tgagcgtacc          110

<210> SEQ ID NO 425
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 425
caagcagaag acggcatacg agatcgctca gttcgtctcg tgggctcgga gatgtgtata    60
agagacagag acttaaatct aactttgcgg ttaattctga tgagcgtacc          110

<210> SEQ ID NO 426
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 426
caagcagaag acggcatacg agatcgctca gttcgtctcg tgggctcgga gatgtgtata    60
agagacagag actgaaatta gcgagttagg ttaattctga tgagcgtacc          110

<210> SEQ ID NO 427
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 427
caagcagaag acggcatacg agatcgctca gttcgtctcg tgggctcgga gatgtgtata    60
agagacagag actaaggtaa tagtgagtgg ttaattctga tgagcgtacc          110

<210> SEQ ID NO 428
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 428
caagcagaag acggcatacg agatcgctca gttcgtctcg tgggctcgga gatgtgtata    60
agagacagag acttgatcgt atataagtgg ttaattctga tgagcgtacc              110

<210> SEQ ID NO 429
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 429
caagcagaag acggcatacg agatcgctca gttcgtctcg tgggctcgga gatgtgtata    60
agagacagag actccatata aacttagtgg ttaattctga tgagcgtacc              110

<210> SEQ ID NO 430
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 430
caagcagaag acggcatacg agatcgctca gttcgtctcg tgggctcgga gatgtgtata    60
agagacagag acttacaaac atactaaggg ttaattctga tgagcgtacc              110

<210> SEQ ID NO 431
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 431
caagcagaag acggcatacg agatcgctca gttcgtctcg tgggctcgga gatgtgtata    60
agagacagag acttagcgta aagtgcgtgg ttaattctga tgagcgtacc              110

<210> SEQ ID NO 432
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 432
caagcagaag acggcatacg agatcgctca gttcgtctcg tgggctcgga gatgtgtata    60
agagacagag acttctttga tctacactgg ttaattctga tgagcgtacc              110

<210> SEQ ID NO 433
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 433
caagcagaag acggcatacg agatcgctca gttcgtctcg tgggctcgga gatgtgtata    60
agagacagag acttccctat tagttgttgg ttaattctga tgagcgtacc              110

<210> SEQ ID NO 434

```
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 434
caagcagaag acggcatacg agatcgctca gttcgtctcg tgggctcgga gatgtgtata        60
agagacagag actctatttg attccctcgg ttaattctga tgagcgtacc                  110

<210> SEQ ID NO 435
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 435
caagcagaag acggcatacg agatcgctca gttcgtctcg tgggctcgga gatgtgtata        60
agagacagag actgggatta caataaaggg ttaattctga tgagcgtacc                  110

<210> SEQ ID NO 436
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 436
caagcagaag acggcatacg agatcgctca gttcgtctcg tgggctcgga gatgtgtata        60
agagacagag actgtaagcg atattattgg ttaattctga tgagcgtacc                  110

<210> SEQ ID NO 437
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 437
caagcagaag acggcatacg agatcgctca gttcgtctcg tgggctcgga gatgtgtata        60
agagacagag actggatagt gtatttgagg ttaattctga tgagcgtacc                  110

<210> SEQ ID NO 438
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 438
caagcagaag acggcatacg agatcgctca gttcgtctcg tgggctcgga gatgtgtata        60
agagacagag actggataaa tgacacttgg ttaattctga tgagcgtacc                  110

<210> SEQ ID NO 439
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 439
caagcagaag acggcatacg agatcgctca gttcgtctcg tgggctcgga gatgtgtata        60
```
agagacagag actcctttca agatatgcgg ttaattctga tgagcgtacc         110

<210> SEQ ID NO 440
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 440
caagcagaag acggcatacg agatcgctca gttcgtctcg tgggctcgga gatgtgtata    60
agagacagag actttaatcg ttagggttgg ttaattctga tgagcgtacc         110

<210> SEQ ID NO 441
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 441
caagcagaag acggcatacg agatcgctca gttcgtctcg tgggctcgga gatgtgtata    60
agagacagag actcacaaac atatatcggg ttaattctga tgagcgtacc         110

<210> SEQ ID NO 442
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 442
caagcagaag acggcatacg agatcgctca gttcgtctcg tgggctcgga gatgtgtata    60
agagacagag actcaaacaa actactcggg ttaattctga tgagcgtacc         110

<210> SEQ ID NO 443
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 443
caagcagaag acggcatacg agatcgctca gttcgtctcg tgggctcgga gatgtgtata    60
agagacagag actctaggac aatttctagg ttaattctga tgagcgtacc         110

<210> SEQ ID NO 444
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 444
caagcagaag acggcatacg agatcgctca gttcgtctcg tgggctcgga gatgtgtata    60
agagacagag actgggttgc gtataactgg ttaattctga tgagcgtacc         110

<210> SEQ ID NO 445
<211> LENGTH: 110
<212> TYPE: DNA
<213> ORGANISM: Artificial Sequence
<220> FEATURE:

<223> OTHER INFORMATION: Synthetic - Pooled PCR primer

<400> SEQUENCE: 445
caagcagaag acggcatacg agatcgctca gttcgtctcg tgggctcgga gatgtgtata    60
agagacagag acttccgaaa tgatatgtgg ttaattctga tgagcgtacc              110

<210> SEQ ID NO 446
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 446
caagcagaag acggcatacg agatcgctca gttcgtctcg tgggctcgga gatgtgtata    60
agagacagag actcggacta caatttaagg ttaattctga tgagcgtacc              110

<210> SEQ ID NO 447
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 447
caagcagaag acggcatacg agatcgctca gttcgtctcg tgggctcgga gatgtgtata    60
agagacagag actggaacac ttacccttgg ttaattctga tgagcgtacc              110

<210> SEQ ID NO 448
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 448
caagcagaag acggcatacg agatcgctca gttcgtctcg tgggctcgga gatgtgtata    60
agagacagag actcacaaag cgtacactgg ttaattctga tgagcgtacc              110

<210> SEQ ID NO 449
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 449
caagcagaag acggcatacg agatcgctca gttcgtctcg tgggctcgga gatgtgtata    60
agagacagag acttgatgat cgtacttagg ttaattctga tgagcgtacc              110

<210> SEQ ID NO 450
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 450
caagcagaag acggcatacg agatcgctca gttcgtctcg tgggctcgga gatgtgtata    60
agagacagag actctataat tcgtatcggg ttaattctga tgagcgtacc              110

```
<210> SEQ ID NO 451
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 451
caagcagaag acggcatacg agatcgctca gttcgtctcg tgggctcgga gatgtgtata      60
agagacagag actcataagc gtagaggtgg ttaattctga tgagcgtacc                110

<210> SEQ ID NO 452
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 452
caagcagaag acggcatacg agatcgctca gttcgtctcg tgggctcgga gatgtgtata      60
agagacagag acttcgttat cgtatgaagg ttaattctga tgagcgtacc                110

<210> SEQ ID NO 453
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 453
caagcagaag acggcatacg agatcgctca gttcgtctcg tgggctcgga gatgtgtata      60
agagacagag actaaggtat tacaagatgg ttaattctga tgagcgtacc                110

<210> SEQ ID NO 454
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 454
caagcagaag acggcatacg agatcgctca gttcgtctcg tgggctcgga gatgtgtata      60
agagacagag actaatcttc aaatatcggg ttaattctga tgagcgtacc                110

<210> SEQ ID NO 455
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 455
caagcagaag acggcatacg agatcgctca gttcgtctcg tgggctcgga gatgtgtata      60
agagacagag acttagtgag ttatcgtcgg ttaattctga tgagcgtacc                110

<210> SEQ ID NO 456
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 456
```

```
caagcagaag acggcatacg agatcgctca gttcgtctcg tgggctcgga gatgtgtata      60
agagacagag actttcaaca ctcgtattgg ttaattctga tgagcgtacc                110
```

<210> SEQ ID NO 457
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 457

```
caagcagaag acggcatacg agatcgctca gttcgtctcg tgggctcgga gatgtgtata      60
agagacagag acttaatata aactactcgg ttaattctga tgagcgtacc                110
```

<210> SEQ ID NO 458
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 458

```
caagcagaag acggcatacg agatcgctca gttcgtctcg tgggctcgga gatgtgtata      60
agagacagag actgggatag cgatagatgg ttaattctga tgagcgtacc                110
```

<210> SEQ ID NO 459
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 459

```
caagcagaag acggcatacg agatcgctca gttcgtctcg tgggctcgga gatgtgtata      60
agagacagag actcacaagg atctaaaggg ttaattctga tgagcgtacc                110
```

<210> SEQ ID NO 460
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 460

```
caagcagaag acggcatacg agatcgctca gttcgtctcg tgggctcgga gatgtgtata      60
agagacagag actttggact atctatgcgg ttaattctga tgagcgtacc                110
```

<210> SEQ ID NO 461
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 461

```
caagcagaag acggcatacg agatcgctca gttcgtctcg tgggctcgga gatgtgtata      60
agagacagag acttcgttag cactttaagg ttaattctga tgagcgtacc                110
```

<210> SEQ ID NO 462
<211> LENGTH: 110
<212> TYPE: DNA
<213> ORGANISM: Artificial Sequence -continued

```
<220> FEATURE:
<223> OTHER INFORMATION: Synthetic - Pooled PCR primer

<400> SEQUENCE: 462
caagcagaag acggcatacg agatcgctca gttcgtctcg tgggctcgga gatgtgtata      60
agagacagag actactccca tactttctgg ttaattctga tgagcgtacc                110

<210> SEQ ID NO 463
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 463
caagcagaag acggcatacg agatcgctca gttcgtctcg tgggctcgga gatgtgtata      60
agagacagag actcaactag aggactaagg ttaattctga tgagcgtacc                110

<210> SEQ ID NO 464
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 464
caagcagaag acggcatacg agatcgctca gttcgtctcg tgggctcgga gatgtgtata      60
agagacagag acttggtgta aatgattagg ttaattctga tgagcgtacc                110

<210> SEQ ID NO 465
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 465
caagcagaag acggcatacg agatcgctca gttcgtctcg tgggctcgga gatgtgtata      60
agagacagag actcgtacta ccctatgcgg ttaattctga tgagcgtacc                110

<210> SEQ ID NO 466
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 466
caagcagaag acggcatacg agatcgctca gttcgtctcg tgggctcgga gatgtgtata      60
agagacagag acttagaggg ctatacttgg ttaattctga tgagcgtacc                110

<210> SEQ ID NO 467
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 467
caagcagaag acggcatacg agatcgctca gttcgtctcg tgggctcgga gatgtgtata      60
agagacagag actatatatc gggtgagtgg ttaattctga tgagcgtacc                110
```

<210> SEQ ID NO 468
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 468
caagcagaag acggcatacg agatcgctca gttcgtctcg tgggctcgga gatgtgtata      60
agagacagag acttccctaa gtagagtagg ttaattctga tgagcgtacc                110

<210> SEQ ID NO 469
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 469
caagcagaag acggcatacg agatcgctca gttcgtctcg tgggctcgga gatgtgtata      60
agagacagag actgggatag attacaaagg ttaattctga tgagcgtacc                110

<210> SEQ ID NO 470
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 470
caagcagaag acggcatacg agatcgctca gttcgtctcg tgggctcgga gatgtgtata      60
agagacagag actgagggac tataatgtgg ttaattctga tgagcgtacc                110

<210> SEQ ID NO 471
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 471
caagcagaag acggcatacg agatcgctca gttcgtctcg tgggctcgga gatgtgtata      60
agagacagag actgatagcg taggtcttgg ttaattctga tgagcgtacc                110

<210> SEQ ID NO 472
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 472
caagcagaag acggcatacg agatcgctca gttcgtctcg tgggctcgga gatgtgtata      60
agagacagag actttacaaa ctctatcggg ttaattctga tgagcgtacc                110

<210> SEQ ID NO 473
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 473

```
caagcagaag acggcatacg agatcgctca gttcgtctcg tgggctcgga gatgtgtata      60
agagacagag actcgtagga aagatcgtgg ttaattctga tgagcgtacc                110

<210> SEQ ID NO 474
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 474
caagcagaag acggcatacg agatcgctca gttcgtctcg tgggctcgga gatgtgtata      60
agagacagag actcccgtga aagatatagg ttaattctga tgagcgtacc                110

<210> SEQ ID NO 475
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 475
caagcagaag acggcatacg agatcgctca gttcgtctcg tgggctcgga gatgtgtata      60
agagacagag actcggattc gtttaagtgg ttaattctga tgagcgtacc                110

<210> SEQ ID NO 476
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 476
caagcagaag acggcatacg agatcgctca gttcgtctcg tgggctcgga gatgtgtata      60
agagacagag acttatgatc ggttgcgtgg ttaattctga tgagcgtacc                110

<210> SEQ ID NO 477
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 477
caagcagaag acggcatacg agatcgctca gttcgtctcg tgggctcgga gatgtgtata      60
agagacagag actttaagta tagagtatgg ttaattctga tgagcgtacc                110

<210> SEQ ID NO 478
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 478
caagcagaag acggcatacg agatcgctca gttcgtctcg tgggctcgga gatgtgtata      60
agagacagag acttctttga tcggactagg ttaattctga tgagcgtacc                110

<210> SEQ ID NO 479
<211> LENGTH: 110
<212> TYPE: DNA
```

```
<213> ORGANISM: Artificial Sequence
<220> FEATURE:
<223> OTHER INFORMATION: Synthetic - Pooled PCR primer

<400> SEQUENCE: 479
caagcagaag acggcatacg agatcgctca gttcgtctcg tgggctcgga gatgtgtata      60
agagacagag actttagtgt gaatcctcgg ttaattctga tgagcgtacc                110

<210> SEQ ID NO 480
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 480
caagcagaag acggcatacg agatcgctca gttcgtctcg tgggctcgga gatgtgtata      60
agagacagag actttacatt tatgatcggg ttaattctga tgagcgtacc                110

<210> SEQ ID NO 481
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 481
caagcagaag acggcatacg agatcgctca gttcgtctcg tgggctcgga gatgtgtata      60
agagacagag acttctaatc tagtatcggg ttaattctga tgagcgtacc                110

<210> SEQ ID NO 482
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 482
caagcagaag acggcatacg agatcgctca gttcgtctcg tgggctcgga gatgtgtata      60
agagacagag actttgaagc gaaatagtgg ttaattctga tgagcgtacc                110

<210> SEQ ID NO 483
<211> LENGTH: 110
<212> TYPE: DNA
<213> ORGANISM: Artificial Sequence
<220> FEATURE:
<223> OTHER INFORMATION: Synthetic - Pooled PCR primer

<400> SEQUENCE: 483
caagcagaag acggcatacg agatcgctca gttcgtctcg tgggctcgga gatgtgtata      60
agagacagag actggaatct aagtagtagg ttaattctga tgagcgtacc                110

<210> SEQ ID NO 484
<211> LENGTH: 14
<212> TYPE: DNA
<213> ORGANISM: Artificial Sequence
<220> FEATURE:
<223> OTHER INFORMATION: Synthetic - Plate barcode

<400> SEQUENCE: 484
gatatagtac ataa                                                        14
```

```
<210> SEQ ID NO 485
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 485
tagcgtcggg atata                                                    15

<210> SEQ ID NO 486
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 486
tccgtgagtg agtta                                                    15

<210> SEQ ID NO 487
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 487
gggtgagtag tgcgt                                                    15

<210> SEQ ID NO 488
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 488
ctcggaatat ataag                                                    15

<210> SEQ ID NO 489
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 489
tgcgtcgtag ggatt                                                    15

<210> SEQ ID NO 490
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 490
tgatcgtagt atgat                                                    15

<210> SEQ ID NO 491
<211> LENGTH: 15
<212> TYPE: DNA
<213> ORGANISM: Artificial Sequence
<220> FEATURE:
<223> OTHER INFORMATION: Synthetic - Plate barcode
```

```
<400> SEQUENCE: 491
ggattatatt gatat                                                    15

<210> SEQ ID NO 492
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 492
tatcggaaag aaata                                                    15

<210> SEQ ID NO 493
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 493
tcgtaaatcc aacta                                                    15

<210> SEQ ID NO 494
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 494
gtgttaagag gtcta                                                    15

<210> SEQ ID NO 495
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 495
cattattgcg tgtcg                                                    15

<210> SEQ ID NO 496
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 496
tctaccctat actaa                                                    15

<210> SEQ ID NO 497
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 497
tttcacctac aaact                                                    15

<210> SEQ ID NO 498
<211> LENGTH: 15
```

```
<212> TYPE: DNA
<213> ORGANISM: Artificial Sequence
<220> FEATURE:
<223> OTHER INFORMATION: Synthetic - Plate barcode

<400> SEQUENCE: 498
atgtgtagcg tccct                                                    15

<210> SEQ ID NO 499
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 499
aaatagttga cataa                                                    15

<210> SEQ ID NO 500
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 500
tttcttgtga ccctc                                                    15

<210> SEQ ID NO 501
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 501
cggatactta gttaa                                                    15

<210> SEQ ID NO 502
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 502 tttcacccttt acata                                                   15

<210> SEQ ID NO 503
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 503
tgtactccta ttgtt                                                    15

<210> SEQ ID NO 504
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 504
```
ctcgtaaatc tatcg                                              15

<210> SEQ ID NO 505
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 505
cctaattgat gatgc                                              15

<210> SEQ ID NO 506
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 506
gggaatctaa tactg                                              15

<210> SEQ ID NO 507
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 507
taaaggttga ggatt                                              15

<210> SEQ ID NO 508
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 508
accgtgagta tttaa                                              15

<210> SEQ ID NO 509
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 509
tagcgtatcc ttagt                                              15

<210> SEQ ID NO 510
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 510
gggttcaata aactg                                              15

<210> SEQ ID NO 511
<211> LENGTH: 15
<212> TYPE: DNA
<213> ORGANISM: Artificial Sequence -continued

```
<220> FEATURE:
<223> OTHER INFORMATION: Synthetic - Plate barcode

<400> SEQUENCE: 511
taggacaaga ttagt                                                    15

<210> SEQ ID NO 512
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 512
tcggactaac taact                                                    15

<210> SEQ ID NO 513
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 513
taggaatatc gggtt                                                    15

<210> SEQ ID NO 514
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 514
gggtgaggtt taagt                                                    15

<210> SEQ ID NO 515
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 515
tttaataact ccctc                                                    15

<210> SEQ ID NO 516
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 516
catatataag tgtcg                                                    15

<210> SEQ ID NO 517
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 517
cggaactaaa ttgat                                                    15
```

```
<210> SEQ ID NO 518
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 518
gtgtagcgag ttgat                                                     15

<210> SEQ ID NO 519
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 519
ttctacatcg tatag                                                     15

<210> SEQ ID NO 520
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 520
ggataatgag ggatt                                                     15

<210> SEQ ID NO 521
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 521
taaatctaac tttgc                                                     15

<210> SEQ ID NO 522
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 522
gaaattagcg agtta                                                     15

<210> SEQ ID NO 523
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 523
aaggtaatag tgagt                                                     15

<210> SEQ ID NO 524
<211> LENGTH: 15
<212> TYPE: DNA
<213> ORGANISM: Artificial Sequence
<220> FEATURE:
<223> OTHER INFORMATION: Synthetic - Plate barcode
```

```
<400> SEQUENCE: 524
tgatcgtata taagt                                              15

<210> SEQ ID NO 525
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 525
ccatataaac ttagt                                              15

<210> SEQ ID NO 526
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 526
tacaaacata ctaag                                              15

<210> SEQ ID NO 527
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 527
tagcgtaaag tgcgt                                              15

<210> SEQ ID NO 528
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 528
tctttgatct acact                                              15

<210> SEQ ID NO 529
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 529
tccctattag ttgtt                                              15

<210> SEQ ID NO 530
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 530
ctatttgatt ccctc                                              15

<210> SEQ ID NO 531
```

```
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 531
gggattacaa taaag                                                    15

<210> SEQ ID NO 532
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 532
gtaagcgata ttatt                                                    15

<210> SEQ ID NO 533
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 533
ggatagtgta tttga                                                    15

<210> SEQ ID NO 534
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 534
ggataaatga cactt                                                    15

<210> SEQ ID NO 535
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 535
cctttcaaga tatgc                                                    15

<210> SEQ ID NO 536
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 536
ttaatcgtta gggtt                                                    15

<210> SEQ ID NO 537
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 537
```
cacaaacata tatcg        15

<210> SEQ ID NO 538
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 538
caaacaaact actcg        15

<210> SEQ ID NO 539
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 539
ctaggacaat ttcta        15

<210> SEQ ID NO 540
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 540
gggttgcgta taact        15

<210> SEQ ID NO 541
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 541
tccgaaatga tatgt        15

<210> SEQ ID NO 542
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 542
cggactacaa tttaa        15

<210> SEQ ID NO 543
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 543
ggaacactta ccctt        15

<210> SEQ ID NO 544
<211> LENGTH: 15
<212> TYPE: DNA

```
<213> ORGANISM: Artificial Sequence
<220> FEATURE:
<223> OTHER INFORMATION: Synthetic - Plate barcode

<400> SEQUENCE: 544
cacaaagcgt acact                                                     15

<210> SEQ ID NO 545
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 545
tgatgatcgt actta                                                     15

<210> SEQ ID NO 546
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 546
ctataattcg tatcg                                                     15

<210> SEQ ID NO 547
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 547
cataagcgta gaggt                                                     15

<210> SEQ ID NO 548
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 548
tcgttatcgt atgaa                                                     15

<210> SEQ ID NO 549
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 549
aaggtattac aagat                                                     15

<210> SEQ ID NO 550
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 550
aatcttcaaa tatcg                                                     15
```

<210> SEQ ID NO 551
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 551
tagtgagtta tcgtc                                                        15

<210> SEQ ID NO 552
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 552
ttcaacactc gtatt                                                        15

<210> SEQ ID NO 553
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 553
taatataaac tactc                                                        15

<210> SEQ ID NO 554
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 554
gggatagcga tagat                                                        15

<210> SEQ ID NO 555
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 555
cacaaggatc taaag                                                        15

<210> SEQ ID NO 556
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 556
ttggactatc tatgc                                                        15

<210> SEQ ID NO 557
<211> LENGTH: 15
<212> TYPE: DNA
<213> ORGANISM: Artificial Sequence
<220> FEATURE:

```
<223> OTHER INFORMATION: Synthetic - Plate barcode

<400> SEQUENCE: 557
tcgttagcac tttaa                                                          15

<210> SEQ ID NO 558
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 558
actcccatac tttct                                                          15

<210> SEQ ID NO 559
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 559
caactagagg actaa                                                          15

<210> SEQ ID NO 560
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 560
tggtgtaaat gatta                                                          15

<210> SEQ ID NO 561
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 561
cgtactaccc tatgc                                                          15

<210> SEQ ID NO 562
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 562
tagagggcta tactt                                                          15

<210> SEQ ID NO 563
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 563
atatatcggg tgagt                                                          15
```

```
<210> SEQ ID NO 564
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 564
tccctaagta gagta                                                    15

<210> SEQ ID NO 565
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 565
gggatagatt acaaa                                                    15

<210> SEQ ID NO 566
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 566
gagggactat aatgt                                                    15

<210> SEQ ID NO 567
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 567
gatagcgtag gtctt                                                    15

<210> SEQ ID NO 568
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 568
ttacaaactc tatcg                                                    15

<210> SEQ ID NO 569
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 569
cgtaggaaag atcgt                                                    15

<210> SEQ ID NO 570
<211> LENGTH: 15
<212> TYPE: DNA
<213> ORGANISM: Artificial Sequence
<220> FEATURE:
<223> OTHER INFORMATION: Synthetic - Plate barcode
```

<400> SEQUENCE: 570
cccgtgaaag atata                                          15

<210> SEQ ID NO 571
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 571
cggattcgtt taagt                                          15

<210> SEQ ID NO 572
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 572
tatgatcggt tgcgt                                          15

<210> SEQ ID NO 573
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 573
ttaagtatag agtat                                          15

<210> SEQ ID NO 574
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 574
tctttgatcg gacta                                          15

<210> SEQ ID NO 575
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 575
ttagtgtgaa tcctc                                          15

<210> SEQ ID NO 576
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 576
ttacatttat gatcg                                          15

<210> SEQ ID NO 577
<211> LENGTH: 15

```
<212> TYPE: DNA
<213> ORGANISM: Artificial Sequence
<220> FEATURE:
<223> OTHER INFORMATION: Synthetic - Plate barcode

<400> SEQUENCE: 577
tctaatctag tatcg                                                          15

<210> SEQ ID NO 578
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 578
ttgaagcgaa atagt                                                          15

<210> SEQ ID NO 579
<211> LENGTH: 15
<212> TYPE: DNA
<213> ORGANISM: Artificial Sequence
<220> FEATURE:
<223> OTHER INFORMATION: Synthetic - Plate barcode

<400> SEQUENCE: 579
ggaatctaag tagta                                                          15

<210> SEQ ID NO 580
<211> LENGTH: 15
<212> TYPE: DNA
<213> ORGANISM: Artificial Sequence
<220> FEATURE:
<223> OTHER INFORMATION: Synthetic - Representative sequence shown in
      Figure 3

<400> SEQUENCE: 580
tacagggtag gaggt                                                          15

<210> SEQ ID NO 581
<211> LENGTH: 15
<212> TYPE: DNA
<213> ORGANISM: Artificial Sequence
<220> FEATURE:
<223> OTHER INFORMATION: Synthetic - Representative sequence shown in
      Figure 3

<400> SEQUENCE: 581
aaaactaaac tagga                                                          15

<210> SEQ ID NO 582
<211> LENGTH: 15
<212> TYPE: DNA
<213> ORGANISM: Artificial Sequence
<220> FEATURE:
<223> OTHER INFORMATION: Synthetic - Representative sequence shown in
      Figure 3

<400> SEQUENCE: 582
gctgggcacc tttac                                                          15
```